United States Patent
Nagai et al.

(10) Patent No.: US 7,903,700 B2
(45) Date of Patent: Mar. 8, 2011

(54) NARROW-SPECTRUM LASER DEVICE

(75) Inventors: Shinji Nagai, Kanagawa (JP); Osamu Wakabayashi, Kanagawa (JP); Koji Kakizaki, Kanagawa (JP); Takayuki Yabu, Kanagawa (JP); Takahito Kumazaki, Kanagawa (JP)

(73) Assignee: Komatsu Ltd, Tokyo (JP)

( * ) Notice: Subject to any disclaimer, the term of this patent is extended or adjusted under 35 U.S.C. 154(b) by 404 days.

(21) Appl. No.: 11/631,463

(22) PCT Filed: Jul. 7, 2005

(86) PCT No.: PCT/JP2005/012590
§ 371 (c)(1),
(2), (4) Date: Jan. 3, 2007

(87) PCT Pub. No.: WO2006/006499
PCT Pub. Date: Jan. 19, 2006

(65) Prior Publication Data
US 2008/0285602 A1    Nov. 20, 2008

(30) Foreign Application Priority Data
Jul. 9, 2004    (JP) ................................. 2004-203549

(51) Int. Cl.
*H01S 3/10*    (2006.01)
*H01S 3/22*    (2006.01)

(52) U.S. Cl. ............................................ 372/20; 372/55
(58) Field of Classification Search ................... 372/20, 372/55
See application file for complete search history.

(56) References Cited

U.S. PATENT DOCUMENTS

| | | | |
|---|---|---|---|
| 6,721,340 B1 | 4/2004 | Fomenkov et al. | |
| 2001/0004371 A1* | 6/2001 | Kakizaki et al. | 372/57 |
| 2002/0006148 A1* | 1/2002 | Govorkov et al. | 372/55 |
| 2004/0042521 A1* | 3/2004 | Ariga et al. | 372/55 |

FOREIGN PATENT DOCUMENTS

| | | |
|---|---|---|
| JP | 2000-114627 | 4/2000 |
| JP | 2001-177172 | 6/2001 |
| JP | 2001-267673 | 9/2001 |
| JP | 2003-086874 | 3/2003 |
| JP | 2003-198020 | 7/2003 |
| JP | 2003-332661 | 11/2003 |

* cited by examiner

*Primary Examiner* — Minsun Harvey
*Assistant Examiner* — Patrick Stafford
(74) *Attorney, Agent, or Firm* — Husch Blackwell LLP

(57) ABSTRACT

A spectral purity range (E95) of a laser beam output from an amplifying laser device (300) is measured by spectral purity range measuring means. To have the measured spectral purity range (E95) within an allowable range E950±dE95 of a target spectral purity range (E950), discharge timing from a time when discharge is started by an oscillating laser device (100) to a time when discharge is started by the amplifying laser device (300) is controlled, and the spectral purity range (E95) is controlled to be stabilized.

3 Claims, 47 Drawing Sheets

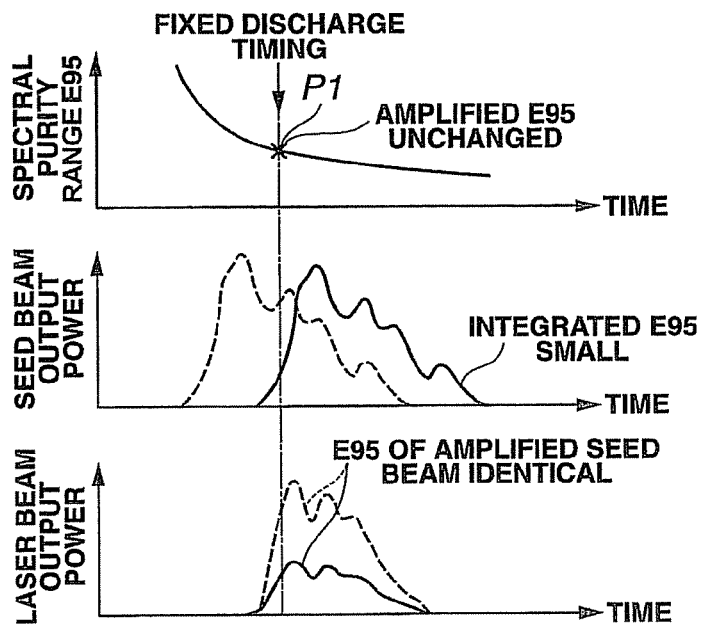
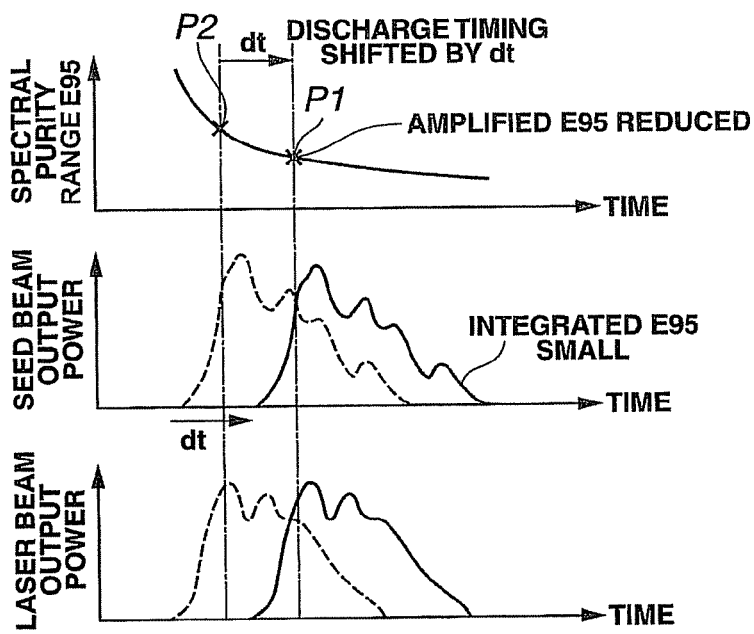

EXAMPLE

REFERENCE EXAMPLE

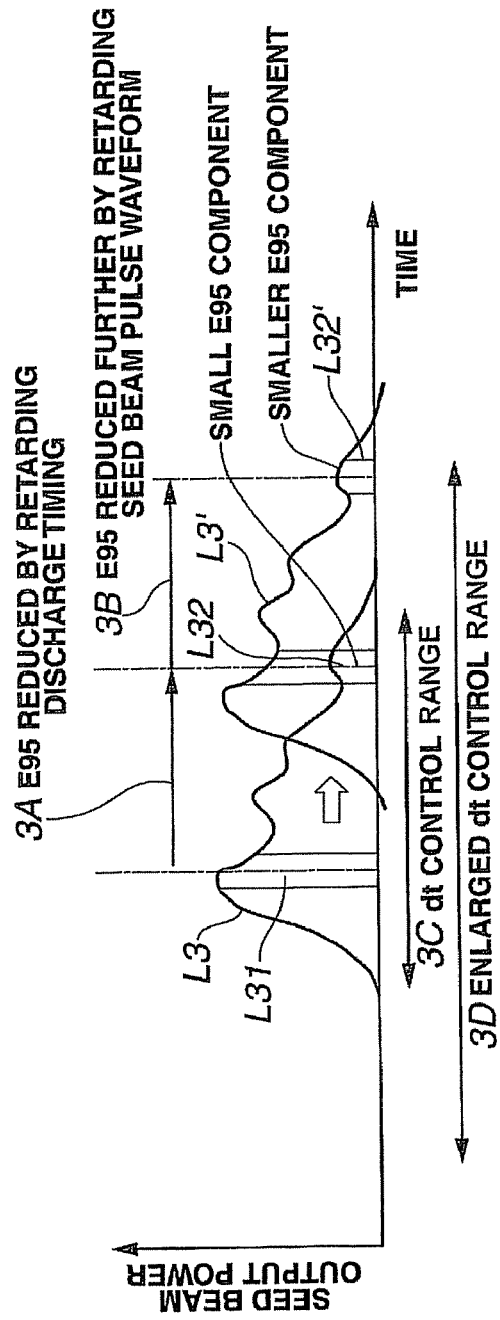
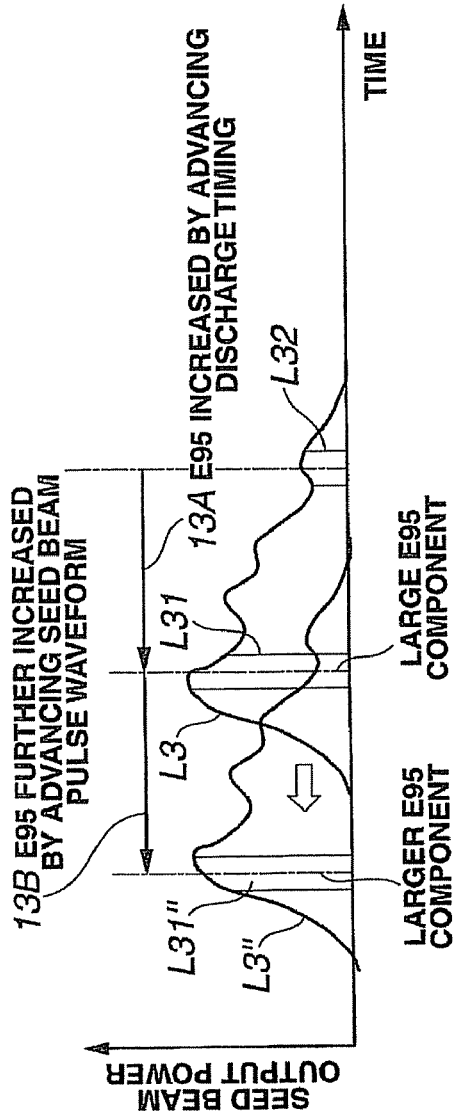
FIG.56A
FIG.56B

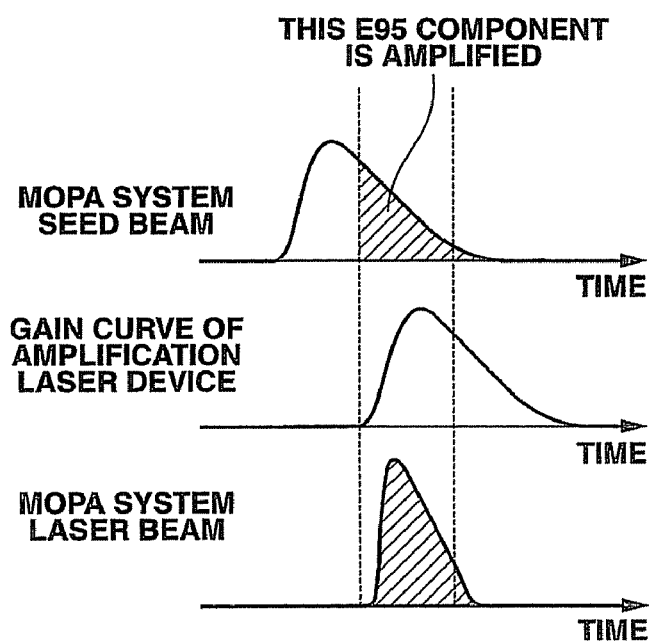
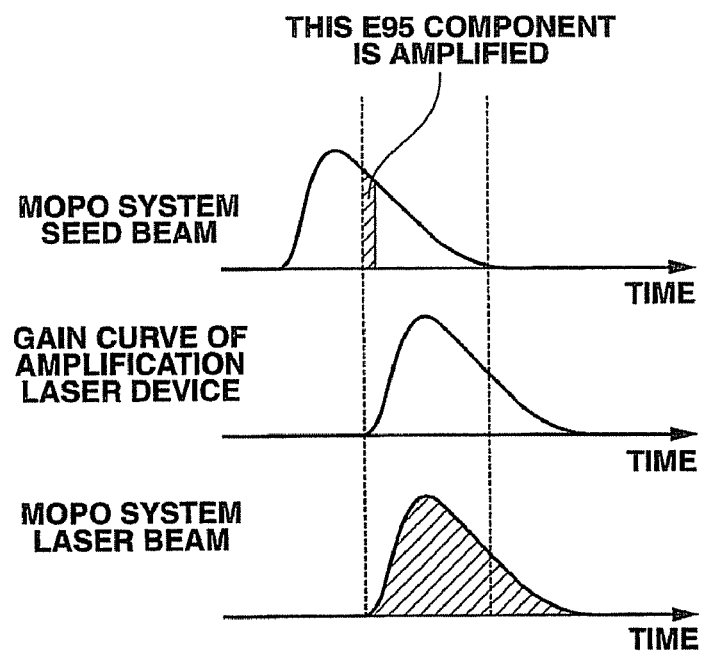

NARROW-SPECTRUM LASER DEVICE

TECHNICAL FIELD

The present invention relates to a narrow-spectrum laser device, and more particularly to a device for controlling a spectral index value such as a spectral purity range of a laser beam output from a narrow-spectrum excimer laser device or a narrow-spectrum F2 laser device serving as the light source of a reduction projection aligner used to manufacture a semiconductor.

BACKGROUND ART

Each element of a conventional narrow-spectrum laser device used as the light source of a reduction projection aligner will be described below.

(Exposure Light Source)

With the reduced size and increased integration of semiconductor integrated circuits, demands have been made for improvements in the resolving power of a semiconductor aligner. To respond to these demands, the wavelength of light discharged from an exposure light source has been shortened, and a gas laser device has come to be used as the exposure light source in place of a conventional mercury lamp. A KrF excimer laser device which outputs ultraviolet rays at a wavelength of 248 nm and an ArF excimer laser device which outputs ultraviolet rays at a wavelength of 193 nm are currently in use as exposure gas laser devices. A method of applying an immersion technique, whereby the space between an exposure lens and a wafer is filled with a liquid and the apparent wavelength of the exposure light source is shortened by varying the refractive index, to ArF exposure has been considered as a next-generation exposure technique. In ArF immersion, the apparent wavelength is shortened to 134 nm. An F2 laser device, which discharges ultraviolet rays at a wavelength of 157 nm, is favored as a next-next-generation exposure light source, and the possibility of employing F2 laser immersion exposure exists. It is said that in F2 immersion, the apparent wavelength is shortened to 115 nm.

(Exposure Optical Element and Chromatic Aberration)

A projection optical system is often employed as the optical system of a semiconductor aligner. In a projection optical system, chromatic aberration is corrected by combining optical elements, such as lenses, having different refractive indices. At present, the only optical materials suitable for use as the lens materials of a projection optical system in a laser wavelength region of 248 nm to 115 nm, i.e. the exposure light source, are synthetic fused silica and CaF2. Therefore, a fully refractive monochromatic lens constituted by synthetic fused silica alone is employed as the projection lens of a KrF excimer laser, and a fully refractive partially achromatic lens constituted by synthetic fused silica and CaF2 is employed as the projection lens of an ArF excimer laser. However, the spontaneous amplitude of KrF and ArF excimer laser is wide, between approximately 350 pm and 400 pm, and hence when these projection lenses are used, chromatic aberration occurs, leading to a reduction in the resolving power. It is therefore necessary to narrow the spectral line range of a laser beam discharged from the gas laser device described above to the extent that chromatic aberration becomes negligible. To narrow the spectral line range in a laser device, a spectrum-narrowing module having a spectrum-narrowing element (an etalon, a grating, or the like) is provided in a laser resonator.

(Spectral Purity Range)

The imaging performance of an aligner is greatly affected by the base components of the spectral waveform of the laser beam as well as the full width at half maximum of the spectral waveform. Accordingly, a new index value of the spectrum known as the spectral purity range has been introduced. The spectral purity range is evaluated as a spectral range containing 95% of the entire energy, for example.

To ensure the quality of the integrated circuit, the spectral purity range is preferably held to or below 0.5 pm, for example.

(Reasons for Stabilizing the Spectral Purity Range)

In recent years, however, it has been suggested that the quality of an integrated circuit may deteriorate when the spectral purity range takes a much narrower value than a value for which the optical system is designed. This is described in Patent Literature 1 (U.S. Pat. No. 6,721,340) and Patent Literature 2 (Japanese Patent Application Laid-open No. 2001-267673). It is therefore necessary to control the spectral purity range to be stable within a predetermined allowable range (to be referred to as stabilization control hereafter, where appropriate).

(Related Art of Spectral Purity Range Control)

Patent Literature 1 and Patent Literature 2 relate to spectral purity range stabilization control. Patent Literature 2 describes an invention in which a wavelength detector is provided, a fast tuning mechanism is provided in a spectrum-narrowing unit, and on the basis of the detected wavelength, the wavelength is dithered at high speed and within a narrow range by the fast tuning mechanism at each pulse. As a result, the apparent spectral purity range is controlled within an allowable range. Here, the term "the apparent spectral purity range is controlled" indicates control for artificially obtaining a spectral purity range corresponding to the amplitude by dithering the center wavelength at each moment and time-integrating the results.

Patent Literature 1: U.S. Pat. No. 6,721,340
Patent Literature 2: Japanese Patent Application Laid-open No. 2001-267673

DISCLOSURE OF THE INVENTION

Problems to be Solved by the Invention

However, in the related art described in Patent Literature 2, the center wavelength varies as the spectral purity range is controlled, and hence it is difficult to perform center wavelength control to match the center wavelength to a desired value and spectral line range control to hold the spectral purity range within a predetermined allowable range independently of each other. As a result, the following problems arise.

(1) Center wavelength control preferably takes the form of feedback control performed upon each pulse, but such control is difficult.

(2) When the center wavelength is stable, the precision of center wavelength control poses little problem, but when the need arises to control the wavelength dynamically, for example when an instruction to modify the target wavelength is issued from the aligner, the precision of center wavelength control may be affected.

(3) In the initial stage of burst oscillation, a chirping phenomenon, in which the center wavelength deviates greatly, may occur.

The present invention has been designed in consideration of these circumstances, and it is an object thereof to solve the problems described above by subjecting a spectral purity range (spectral index value) to stabilization control without affecting control of a center wavelength, thereby controlling the apparent spectral purity range.

Means to Solve the Problems

A first invention provides a narrow-spectrum laser device having an oscillation laser device that outputs a narrow-spectrum seed beam by causing a laser beam to pass through a wavelength dispersion element several times, and an amplification laser device or an amplifying device that amplifies the seed beam by discharging a laser gas within an amplification chamber, and outputs an amplified laser beam, the narrow-spectrum laser device comprising: spectral index value measuring means for measuring a spectral index value of the laser beam output from the amplification laser device; and control means for controlling a discharge timing from a start of discharge by the oscillation laser device to a start of discharge by the amplification laser device or amplifying device such that the measured spectral index value is held within an allowable range of a target spectral index value.

A second invention provides a narrow-spectrum laser device having an oscillation laser device that outputs a narrow-spectrum seed beam by causing a laser beam to pass through a wavelength dispersion element several times, and an amplification laser device or an amplifying device that amplifies the seed beam by discharging a laser gas within an amplification chamber, and outputs an amplified laser beam, the narrow-spectrum laser device comprising: spectral index value measuring means for measuring a spectral index value of the laser beam output from the amplification laser device or the amplifying device; and control means for controlling a spectral index value of the seed beam such that the measured spectral index value is held within an allowable range of a target spectral index value.

A third invention provides a narrow-spectrum laser device having an oscillation laser device that outputs a narrow-spectrum seed beam by causing a laser beam to pass through a wavelength dispersion element several times, and an amplification laser device or an amplifying device that amplifies the seed beam by discharging a laser gas within an amplification chamber, and outputs an amplified laser beam, the narrow-spectrum laser device comprising: spectral index value measuring means for measuring a spectral index value of the laser beam output from the amplification laser device or the amplifying device; and control means for controlling a discharge timing from a start of discharge by the oscillation laser device to a start of discharge by the amplification laser device or the amplifying device, and controlling a spectral index value of the seed beam, such that the measured spectral index value is held within an allowable range of a target spectral index value.

A fourth invention, pertaining to the first invention or third invention, is characterized in that the control is executed by the control means within a synchronization allowable range of the allowable range of the target spectral index value, in which an energy of the laser beam output from the amplification laser device equals or exceeds an allowable level.

A fifth invention, pertaining to the first invention or third invention, further comprises pulse stretching means for extending a laser pulse waveform of the seed beam, and is characterized in that a synchronization allowable range in which an energy of the laser beam output from the amplification laser device or the amplifying device equals or exceeds an allowable level is enlarged by extending the pulse waveform of the seed beam using the pulse stretching means.

A sixth invention, pertaining to the second invention or third invention, is characterized in that the control means control the spectral index value of the seed beam by varying a time from a start of discharge by the oscillation laser device to a rise of a laser pulse.

A seventh invention, pertaining to the second invention or third invention, is characterized in that the control means vary a pulse waveform of the seed beam by varying a molar concentration or a partial pressure of a fluorine molecule F2 in the oscillation chamber.

An eighth invention, pertaining to the second invention or third invention, is characterized in that the control means vary a pulse waveform of the seed beam by varying a total gas pressure in the oscillation chamber.

A ninth invention, pertaining to the second invention or third invention, is characterized in that the oscillation laser device performs a main discharge by applying a voltage corresponding to a charging voltage between a pair of electrodes, and the control means vary a pulse waveform of the seed beam by varying the charging voltage.

A tenth invention, pertaining to the second invention or third invention, is characterized in that the oscillation laser device comprises a charging circuit having a peaking capacitor disposed electrically parallel to a pair of electrodes, and a second capacitor disposed in front of and electrically parallel to the peaking capacitor, and performs discharge by shifting a charge accumulated in the second capacitor to the peaking capacitor and applying a voltage corresponding to a charging voltage of the peaking capacitor to the pair of electrodes, and a pulse waveform of the seed beam is varied by varying a capacitance of the peaking capacitor and/or the second capacitor, and/or varying a capacitance ratio between the peaking capacitor and the second capacitor.

An eleventh invention, pertaining to the second invention or third invention, is characterized in that the oscillation laser device comprises a charging circuit having a preionizing capacitor disposed electrically parallel to a pair of electrodes, and performs preionizing between the pair of electrodes in accordance with a charging voltage of the preionizing capacitor, and a pulse waveform of the seed beam is varied by varying a capacitance of the preionizing capacitor.

A twelfth invention, pertaining to the second invention or third invention, is characterized in that the oscillation laser device comprises an output coupler for returning light generated in the oscillation chamber to the oscillation chamber at a prescribed reflectance, and a pulse waveform of the seed beam is varied by varying the reflectance of the output coupler.

A thirteenth invention, pertaining to the second invention or third invention, is characterized in that the control means control the spectral index value of the seed beam by varying a time from a start of discharge by the oscillation laser device to a rise of a laser pulse, and when a rise time of a pulse waveform of the seed beam is varied, control is performed to vary the discharge timing from the start of discharge by the oscillation laser device to a start of discharge by the amplification laser device in accordance with the variation in the rise time of the pulse waveform such that the discharge timing is matched to a desired synchronization timing.

A fourteenth invention provides a narrow-spectrum laser device having an oscillation laser device that outputs a narrow-spectrum seed beam by causing a laser beam to pass through a wavelength dispersion element several times, and an amplification laser device or an amplifying device that amplifies the seed beam by discharging a laser gas within an amplification chamber, and outputs an amplified laser beam, the narrow-spectrum laser device comprising: spectral index value measuring means for measuring a spectral index value of the laser beam output from the amplification laser device or the amplifying device; and control means for controlling a spectrum-narrowing performance of the oscillation laser device or amplifying device such that the measured spectral index value is held within an allowable range of a target spectral index value.

A fifteenth invention provides a narrow-spectrum laser device having an oscillation laser device that outputs a narrow-spectrum seed beam by causing a laser beam to pass through a wavelength dispersion element several times, and an amplification laser device or an amplifying device that amplifies the seed beam by discharging a laser gas within an amplification chamber, and outputs an amplified laser beam, the narrow-spectrum laser device comprising: spectral index value measuring means for measuring a spectral index value of the laser beam output from the amplification laser device or the amplifying device; and control means for controlling a discharge timing from a start of discharge by the oscillation laser device to a start of discharge by the amplification laser device or the amplifying device, and controlling a spectrum-narrowing performance of the oscillation laser device, such that the measured spectral index value is held within an allowable range of a target spectral index value.

A sixteenth invention, pertaining to the fourteenth invention or fifteenth invention, is characterized in that wavefront varying means for varying a wavefront of light generated in the oscillation chamber are provided in the oscillation laser device, and the wavefront varying means vary the spectrum-narrowing performance of the oscillation laser device by varying the wavefront of the light generated in the oscillation chamber.

A seventeenth invention, pertaining to the fourteenth invention or fifteenth invention, is characterized in that expanding ratio varying means for varying an expanding ratio of light generated in the oscillation chamber are provided in the oscillation laser device, and the expanding ratio varying means vary the spectrum-narrowing performance of the oscillation laser device by varying the expanding ratio of the light generated in the oscillation chamber.

An eighteenth invention, pertaining to the fourteenth invention or fifteenth invention, is characterized in that beam width varying means for varying a beam width of light generated in the oscillation chamber are provided in the oscillation laser device, and the beam width varying means vary the spectrum-narrowing performance of the oscillation laser device by varying the beam width of the light generated in the oscillation chamber.

A nineteenth invention provides a narrow-spectrum laser device having an oscillation laser device that outputs a narrow-spectrum seed beam by causing a laser beam to pass through a wavelength dispersion element several times, and an amplification laser device or an amplifying device that amplifies the seed beam by discharging a laser gas within an amplification chamber, and outputs an amplified laser beam, the narrow-spectrum laser device comprising: spectral index value measuring means for measuring a spectral index value of the laser beam output from the amplification laser device; and control means for controlling a propagation speed of an acoustic wave generated upon discharge in the oscillation chamber such that the measured spectral index value is held within an allowable range of a target spectral index value.

A twentieth invention provides a narrow-spectrum laser device having an oscillation laser device that outputs a narrow-spectrum seed beam by causing a laser beam to pass through a wavelength dispersion element several times, and an amplification laser device or an amplifying device that amplifies the seed beam by discharging a laser gas within an amplification chamber, and outputs an amplified laser beam, the narrow-spectrum laser device comprising: spectral index value measuring means for measuring a spectral index value of the laser beam output from the amplification laser device; and control means for controlling a discharge timing from a start of discharge by the oscillation laser device to the start of discharge by the amplification laser device, and controlling a propagation speed of an acoustic wave generated upon discharge in the oscillation chamber, such that the measured spectral index value is held within an allowable range of a target spectral index value.

A twenty-first invention, pertaining to the nineteenth invention or twentieth invention, further comprises: oscillation frequency detecting means for detecting an oscillation frequency of the seed beam oscillated by the oscillation laser device; and laser gas temperature varying means for varying a temperature of the laser gas in the oscillation chamber, characterized in that control is performed to vary the laser gas temperature in accordance with the detected oscillation frequency of the seed beam, on the basis of a relationship between the oscillation frequency of the seed beam, the temperature of the laser gas in the oscillation chamber, and the spectral index value, such that the measured spectral index value is held within the allowable range of the target spectral index value.

The present inventor discovered that a spectral purity range E95 (representing the spectral index value) of the laser beam output to the outside from a laser device (two-stage laser device) 2 shown in FIG. 1 is determined by the discharge timing from the start of discharge in an oscillation chamber 10 to the start of discharge in an amplification chamber 30, and the spectral purity range E95 of the laser beam (seed beam) output from the oscillation chamber 10, and learned that these parameters, i.e. the discharge timing and the spectral purity range of the seed beam, can be controlled independently of center wavelength control.

The present inventor also learned that to eliminate variation in the spectral purity range caused by various variation factors such that the spectral purity range is stabilized within the range of a certain allowable range, the spectral purity range can be monitored (measured) by a spectral purity range E95 detector (spectral purity range measuring means), and when the spectral purity range varies from a target spectral purity range, control can be performed to align the spectral purity range E95 with the target spectral purity range.

In other words, stabilization control of the spectral purity range is realized principally by the following three means.
(1) Varying the discharge timing (first invention).
(2) Varying the spectral purity range of the seed beam that is output from an oscillation laser device 100 (second invention).
(3) Varying the spectral purity range of the seed beam that is output from the oscillation laser device 100 and varying the discharge timing (third invention).

Of these three means, (3) exhibits the greatest stabilization control effect.

With respect to the "control of the apparent spectral purity range" described in the related art, the wavelength is varied upon each pulse, and therefore exposure is performed by changing the best focus position on the wafer at each pulse in accordance with stabilization control of the spectral purity range. Since independent center wavelength control is impossible, best focus position deviation occurs.

According to the control means (1), (2), and (3) (first invention, second invention, and third invention) of the present invention, on the other hand, the spectral purity range can be substantially widened and narrowed, and the center wavelength can be controlled independently. Hence, the center wavelength does not change during stabilization control of the spectral purity range, and accordingly, the best focus position does not vary either. Thus, an optimum spectral shape is obtained in relation to the projection lens of an aligner 3 and best focus position deviation does not occur, and therefore the imaging performance of the projection lens can be maintained.

In the first invention, the spectral purity range E95 of the laser beam output from an amplification laser device 300 is measured by the spectral purity range measuring means, and the discharge timing from the start of discharge by the oscillation laser device 100 to the start of discharge by the amplification laser device 300 is controlled such that the measured spectral purity range E95 is held within an allowable range E950±dE95 of a target spectral purity range E950. Thus, the spectral purity range E95 is subjected to stabilization control.

More specifically, in the two-stage laser system shown in FIG. 1, in contrast to a one-stage laser system, the spectral purity range E95 can be controlled in accordance with the discharge timing from the beginning of discharge in the oscillation chamber 10 to the beginning of discharge in the amplification chamber 30.

FIG. 4 shows the manner in which the spectral purity range E95 varies in accordance with a discharge timing dt.

The symbol dt on the abscissa of the graph in FIG. 4 shows the discharge timing, or in other words the time from the beginning of discharge in the oscillation chamber 10 to the beginning of discharge in the amplification chamber 30. The left side ordinate of the graph in FIG. 4 is the spectral purity range E95, and as shown by a spectral purity range characteristic L1, the spectral purity range E95 decreases as the discharge timing dt increases (as the discharge timing is retarded). The reason for this will be explained using FIG. 5.

FIG. 5 shows a pulse waveform L3 of the seed beam. As shown in FIG. 5, the oscillated laser beam serving as the seed beam has a temporal spectral purity range E95 distribution according to which the spectral purity range E95 decreases toward the rear of the laser pulse waveform. Hence, the spectral purity range E95 of the amplified laser beam is determined according to the part of the seed beam pulse waveform, having the temporal spectral purity range E95 distribution shown in the FIG. 5, in which synchronization is performed. For example, when the discharge timing dt is retarded such that discharge is synchronized in the latter half part of the seed beam pulse waveform, the seed beam is amplified with a narrow spectral purity range E95, and as a result, the spectral purity range E95 of the amplified laser beam narrows. Conversely, when the discharge timing dt is advanced such that discharge is synchronized in the former half part of the seed beam pulse waveform, the seed beam is amplified with a wide spectral purity range E95, and as a result, the spectral purity range E95 of the amplified laser beam widens.

Using this characteristic, control is performed in the first invention such that when the monitored (measured) spectral purity range E95 increases, the spectral purity range E95 is reduced by retarding the discharge timing dt, and when the spectral purity range E95 decreases, the spectral purity range E95 is increased by advancing the discharge timing dt.

By aligning the discharge start timing of the amplification laser device 300 with the former half of the pulse waveform L3 of the seed beam output from the oscillation laser device 100, light having a wide spectral range in the former half part of the seed beam pulse waveform L3 is amplified, and conversely, by aligning the discharge start timing of the amplification laser device 300 with the latter half of the seed beam pulse waveform L3, light having a narrow spectral range in the latter half part is amplified (see FIG. 5).

On the left side ordinate of FIG. 4, the spectral purity range target value is set at E950, and the allowable range is set at E950±dE95.

It is assumed, for example, that the discharge timing dt is set at dt0 and the laser devices 100, 300 are operated on the curve L1 in order to match the spectral purity range to the target value E950.

Here, when the actual measured spectral purity range E95 has widened (E95 increased), or in other words when a shift has occurred from the curve L1 to a curve L1($a$), the discharge timing dt is retarded from dt0 to dt2, as shown by an arrow LA. By retarding the discharge timing dt from dt0 to dt2 in this manner, the spectral purity range can be narrowed and thereby returned to the value of the original target value E950.

On the other hand, when the actual measured spectral purity range E95 has narrowed (E95 reduced), or in other words when a shift has occurred from the curve L1 to a curve L1($b$), the discharge timing dt is advanced from dt0 to dt1, as shown by an arrow LB. By advancing the discharge timing dt from dt0 to dt1 in this manner, the spectral purity range can be widened and thereby returned to the value of the original target value E950.

As shown in FIG. 4, however, the spectral purity range control range (the ordinate in FIG. 4) is preferably within a range (the ordinate in FIG. 4) corresponding to a synchronization allowable range (the abscissa in FIG. 4), in which the laser output power equals or exceeds an allowable level, in accordance with the relationship thereof to the control range (the abscissa in FIG. 4) of the discharge timing dt (fourth invention).

In the second invention, the spectral purity range E95 of the laser beam output from the amplification laser device 300 is measured by the spectral purity range measuring means, and the spectral purity range E95 of the seed beam output from the oscillation laser device 100 is controlled such that the measured spectral purity range E95 is held within the allowable range E950±dE95 of the target spectral purity range E950. Thus, the spectral purity range E95 of the laser beam output from the amplification laser device 300 is subjected to stabilization control.

In the sixth invention pertaining to the second invention, the spectral purity range E95 of the seed beam is controlled by varying the time from the start of discharge by the oscillation laser device 100 to the rise of the laser pulse, and thus the spectral purity range E95 of the laser beam output from the amplification laser device 300 is subjected to stabilization control.

More specifically, means for controlling the spectral purity range E95 of the seed beam itself may be provided as another method of controlling the spectral purity range E95. The following three methods may be employed to control the spectral purity range E95 of the seed beam.

(2)-1 A method of controlling the rise of the seed beam pulse waveform (the second invention and the sixth invention pertaining thereto).

(2)-2 A method of controlling the spectrum-narrowing performance (the fourteenth invention).

(2)-3 A method of controlling the acoustic wave propagation speed (the nineteenth invention).

The spectral purity range E95 of the output seed beam can be varied using any of these methods, and hence the amplified laser light can be varied in accordance therewith.

First, the second invention and the sixth invention pertaining thereto will be described.

FIG. 15 is a graph showing the waveform of the seed beam laser pulse output from the oscillation laser device 100, on which the abscissa shows time and the ordinate shows the laser output power.

When the time from the beginning of discharge by the oscillation laser device 100 to the rise of the pulse is retarded by reducing the small signal gain, the laser pulse waveform changes from the waveform shown by the broken line in FIG. 15 to the waveform shown by the solid line. By lengthening the time from the beginning of discharge to the rise of the laser pulse waveform in this manner, or in other words by shifting the laser pulse temporally to the latter half, the spectral purity range can be narrowed. The reason for this is that the pulse rises after the photon is amplified following several passes through a wavelength selection element (LNM 16), as shown in FIG. 11, and therefore the spectral purity range becomes smaller as the round trip frequency increases. Conversely, when the laser pulse is shifted to the former half by increasing the small signal gain, the spectral purity range widens according to the same principle (the spectral purity range increases as the round trip frequency decreases).

When the rise of the laser pulse waveform of the seed beam output from the oscillation laser device 100 is controlled in the second invention and sixth invention using this characteristic (see FIG. 15), the wavelength line range of the spectral waveform of the seed beam is varied as shown in FIGS. 12A to 12E. When the spectral purity range E95 of the seed beam changes in this manner, the spectral purity range E95 of the laser beam that is amplified and output by the amplification laser device 300 changes in accordance therewith.

More specifically, as shown in FIG. 17, by varying the fluorine molecule F2 concentration in the oscillation chamber 10, the seed beam pulse waveform is varied, and as a result, the rise of the laser pulse is controlled. Thus, the spectral purity range E95 is subjected to stabilization control (sixth invention).

In addition to the F2 concentration, the parameters that can vary the laser pulse waveform of the seed beam, and thereby vary the spectral purity range E95, include the total gas pressure, the charging voltage, the capacitance and capacitance ratio of the capacitors in the charging circuit, the capacitance of the preionizing capacitor, and the reflectance of the output coupler (OC) (seventh invention, eighth invention, ninth invention, tenth invention, eleventh invention, twelfth invention).

Further, when the rise time of the seed beam pulse waveform has been varied following implementation of the second invention, control is preferably performed to vary the discharge timing from the start of discharge by the oscillation laser device 100 to the start of discharge by the amplification laser device 300 in accordance with the variation dt in the rise time of the pulse waveform such that the discharge timing is matched to a desired synchronization timing (thirteenth invention).

According to the thirteenth invention, reductions in the laser beam output power can be suppressed, and control of the spectral purity range can be performed effectively.

In the fourteenth invention, the spectral purity range E95 of the laser beam output from the amplification laser device 300 is measured by the spectral purity range measuring means, and the spectrum-narrowing performance of the oscillation laser device 100 is controlled such that the measured spectral purity range E95 is held within the allowable range E950±dE95 of the target spectral purity range E950. Thus, the spectral purity range E95 of the laser beam output from the amplification laser device 300 is subjected to stabilization control.

More specifically, the wavefront varying means for varying the wavefront of the light generated in the oscillation chamber 10 are provided in the oscillation laser device 100, and by varying the wavefront of the light generated in the oscillation chamber 10 using the wavefront varying means, the spectrum-narrowing performance of the oscillation laser device 100 is varied. Thus, the spectral purity range E95 of the laser beam output from the amplification laser device 300 is subjected to stabilization control (sixteenth invention).

Parameters that can vary the spectrum-narrowing performance of the oscillation laser device 100, and thereby vary the spectral purity range E95, also include the expanding ratio of the light and the beam width of the light (seventeenth invention, eighteenth invention).

In the nineteenth invention, the spectral purity range E95 of the laser beam output from the amplification laser device 300 is measured by the spectral purity range measuring means, and the propagation speed of the acoustic wave generated upon discharge in the oscillation chamber is controlled such that the measured spectral purity range E95 is held within the allowable range E950±dE95 of the target spectral purity range E950. Thus, the spectral purity range E95 of the laser beam output from the amplification laser device 300 is subjected to stabilization control.

More specifically, the oscillation frequency detecting means for detecting the oscillation frequency of the seed beam oscillated by the oscillation laser device 100 and the laser gas temperature varying means for varying the temperature of the laser gas in the oscillation chamber 10 are provided, and by varying the laser gas temperature in accordance with the detected oscillation frequency of the seed beam, on the basis of the relationship between the oscillation frequency of the seed beam, the temperature of the laser gas in the oscillation chamber 10, and the spectral purity range E95, the spectral purity range E95 of the laser beam output from the amplification laser device 300 is subjected to stabilization control (twenty-first invention).

The principles applied to the nineteenth invention will now be described.

When the gas temperature in the oscillation chamber 10 varies, the spectral purity range E95 varies. The reason for this is that an acoustic wave generated upon discharge varies the particle density distribution on the laser optical path, thereby varying the laser wavefront. The gas temperature T [K] has a relationship of $$v \propto (T)^{1/2}$$

with the propagation speed v of the acoustic wave. Therefore, when the gas temperature varies, the propagation speed of the acoustic wave also varies, leading to variation in the particle density distribution on the laser optical path, variation in the laser wavefront, and consequently, variation in the spectral purity range E95.

Variation in the oscillation frequency also affects the acoustic wave, and therefore the relationship between the gas temperature and the spectral purity range E95 also varies in accordance with the oscillation frequency (FIG. 43).

Since the relationship between the gas temperature and spectral purity range E95 varies in accordance with the oscillation frequency in this manner, in the nineteenth invention (twenty-first invention), the correlative relationship (FIG. 44; L16, L17, L18) between the gas temperature and spectral purity range E95 at each frequency is stored in a database, for example, and the correlative relationship corresponding to the current oscillation frequency is read. Then, on the basis of the read correlative relationship, the spectral purity range E95 is controlled by varying the gas temperature. Hence, actual spectral purity range control is performed as laser gas temperature control.

Next, the third invention will be described.

As a further method of controlling the spectral purity range E95, means (3) combining control of the discharge timing, described in (1), and control of the spectral purity range E95 of the seed beam, described in (2), may be provided. Using control means (3) (the third invention), the synchronization allowable range can be enlarged by controlling the spectral purity range E95 within the allowable range. Here, the synchronization allowable range is a discharge timing range in which the energy of the laser beam equals or exceeds an allowable level. The synchronization allowable range will now be described more specifically using FIG. 4. In FIG. 4, the right side ordinate shows the laser output power, while L2 (MOPO system) and L2' (MOPA system) show characteristics of the laser beam output power. The synchronization allowable range is a discharge timing dt range in which the output power of the amplified laser beam is within a certain proportion, for example 80%, of a peak output power. Outside of the synchronization allowable range, the laser output power decreases greatly. L2 denotes the laser output power characteristic of the MOPO system, while L2' denotes the laser output power characteristic of the MOPA system, and by comparing these laser output power characteristics, it can be seen that the synchronization allowable range of the MOPA system is smaller than that of the MOPO system.

To narrow the spectral purity range E95 considerably, for example, first the spectral purity range E95 of the seed beam is narrowed through control of the spectral purity range E95 of the seed beam (2), whereupon the synchronization timing (FIG. 5) is aligned with the latter half of the seed beam pulse waveform through control of the discharge timing (1). In so doing, the spectral purity range E95 can be narrowed considerably. Conversely, to widen the spectral purity range E95 considerably, first the spectral purity range E95 of the seed beam is widened through the control of (2), whereupon the synchronization timing (FIG. 5) is aligned with the former half of the seed beam pulse waveform through the control of (1). In so doing, the spectral purity range E95 can be widened considerably. The order in which E95 control of the seed beam and control of the discharge timing are performed may be reversed from that described above.

FIG. 56 is a timing chart illustrating the effects of combining control to vary the discharge timing and control to vary the pulse waveform (the pulse rise time). The abscissa shows time, and the ordinate shows the pulse waveform of the seed beam, indicating the seed beam output power (intensity).

FIG. 56A illustrates a case in which the spectral purity range E95 is reduced by retarding the discharge timing and retarding the seed beam pulse waveform, while FIG. 56B illustrates a case in which the spectral purity range E95 is increased by advancing the discharge timing and advancing the seed beam pulse waveform.

FIG. 56A shows effects obtained by combining the effect shown in FIG. 5 and the effect shown in FIG. 15. As shown by an arrow 3A, by retarding the discharge timing, a seed beam wavelength part to be amplified, from the seed beam pulse waveform L3, shifts from a part L31 in which the spectral purity range widens to a part L32 in which the spectral purity range narrows (the effect shown in FIG. 5). Further, as shown by an arrow 3B, by retarding the seed beam pulse waveform from L3 to L3', the spectral purity range shifts to a part L32' of the pulse waveform L3' at which the spectral purity range narrows further (the effect shown in FIG. 15).

The spectral purity range E95 is increased in a similar manner. As shown by an arrow 13A in FIG. 56B, by advancing the discharge timing, the seed beam wavelength part to be amplified, from the seed beam pulse waveform L3, shifts from the part L32 at which the spectral purity range narrows to the part L31 at which the spectral purity range widens (the effect shown in FIG. 5). Further, as shown by an arrow 13B, by advancing the seed beam pulse waveform from L3 to L3", the spectral purity range shifts to a part L31" of the pulse waveform L3" at which the spectral purity range widens further (the effect shown in FIG. 15).

As a result, the control range of the discharge timing dt, or in other words the synchronization allowable range in which the laser output power equals or exceeds an allowable level, is enlarged from 3C to 3D, leading to a dramatic improvement in controllability.

Next, the effects of the fifteenth invention, which combines the first invention and fourteenth invention, and the twentieth invention, which combines the first invention and nineteenth invention, will be described.

FIG. 57 is a view illustrating the effects of combining control to vary the discharge timing and control to vary the spectral purity range of the seed beam (control to vary the spectrum-narrowing performance or control to vary the acoustic wave propagation speed). Similarly to FIG. 4, the abscissa shows the discharge timing dt, and the ordinate shows the spectral purity range E95.

The characteristic L1 in FIG. 57 corresponds to the characteristic L1 shown in FIG. 4.

When enlarging the spectral purity range E95 to align it with the target spectral purity range E950, first of all control is performed to increase the spectral purity range of the seed beam. As a result, the characteristic L1 shifts to a characteristic L1A having an increased spectral purity range. Control is then performed to increase the spectral purity range E95 by reducing the discharge timing dt. As a result, the discharge timing varies in a decreasing direction on the characteristic line L1A.

When reducing the spectral purity range E95 to align it with the target spectral purity range E950, first of all control is performed to reduce the spectral purity range of the seed beam. As a result, the characteristic L1 shifts to a characteristic L1B having a reduced spectral purity range. Control is then performed to reduce the spectral purity range E95 by increasing the discharge timing dt. As a result, the discharge timing varies in an increasing direction on the characteristic line L1B.

By comparing a control range 1A of the spectral purity range E95 obtained when control is only performed to vary the spectral purity range of the seed beam to a control range 1B obtained when control to vary the spectral purity range of the seed beam and control to vary the discharge timing dt are combined, it can be seen that an enlarged spectral purity range E95 control range (ordinate) is obtained with the control combination when the synchronization allowable range (abscissa) is constant.

Hence, by combining the two types of control, the range in which control of the spectral purity range E95 is possible within a constant synchronization allowable range is further increased, leading to a dramatic improvement in controllability.

Further, by combining control to stretch the discharge pulse of the oscillation chamber 10 (fifth invention) with the first invention, second invention, and third invention (fifteenth invention, twentieth invention), the pulse waveform of the seed beam is lengthened, and as a result, the synchronization allowable range is enlarged (see FIG. 14). Thus, the control range of the spectral purity range E95 can be increased further. Furthermore, by enlarging the synchronization allowable range, variation in the laser output power of the amplified laser beam in relation to variation in the discharge timing dt can be suppressed, and hence the laser output power can be stabilized more easily.

According to the present invention described above, the spectral purity range (spectral index value) can be subjected to stabilization control without affecting control of the center wavelength, and therefore the problems that occur in the related art when the apparent spectral purity range is controlled can be solved.

BEST MODE FOR CARRYING OUT THE INVENTION

Embodiments of a narrow-spectrum laser device according to the present invention will be described below with reference to the drawings.

(Spectral Index Value)

First, the meanings of the terminology used in this specification will be described. In this specification, the term "spectral index value" includes the spectral line range, spectral purity range, contrast loss, spectral standard deviation, and white OTF (Optical Transfer Function).

The spectral line range is the overall range in the light value of a spectral waveform of a laser beam, and is often evaluated by FWHM (Full Width at Half Maximum), in which the spectral waveform is cut at a half value of a peak value.

The spectral purity range is the overall range of a part of the overall spectral energy occupied by a certain proportion of the energy centering on a center wavelength $\lambda_0$, and is often evaluated as the spectral range containing 95% of the energy. In this specification, the spectral purity range is referred to specifically as "E95". When the wavelength is $\lambda$ and the center wavelength is $\lambda_0$, the following Equation (1) is established in relation to the spectral purity range E95.

[Numeral 1]

$$\frac{\int_{-\frac{\Delta\lambda}{2}}^{\frac{\Delta\lambda}{2}} g(\lambda + \lambda_0) d\lambda}{\int_{-\infty}^{\infty} g(\lambda + \lambda_0) d\lambda} = 0.95 \quad (1)$$

The contrast loss is an index value applied to chromatic aberration by the spectral waveform of a laser beam, which is obtained by integrating the sum of a chromatic aberration function $p(\lambda)$, expressing the amount of color aberration per wavelength of the optical system of an aligner, and a spectral waveform $g(\lambda)$ in relation to the wavelength. The following Equation (2) is established in relation to the contrast loss.

$$CL = \int g(\lambda) \cdot p(\lambda) d\lambda \quad (2)$$

A spectral standard deviation $\sigma$ is an index value defined by the following Equations (3) and (4).

$$\lambda_0 = (\int \lambda \cdot g(\lambda) d\lambda)/(\int g(\lambda) d\lambda) \quad (3)$$

$$\sigma^2 = \int [g(\lambda+0) - g(\lambda_0)]^2 d\lambda \quad (4)$$

The white OTF is an index value that can be determined from the following Equation (5) on the basis of the OTF of monochromatic light and the spectral waveform.

[Numeral 2]

In Equation (5), $R\lambda(u, v)$ is the OTF of each monochrome, and $Rw(u, v)$ is the white OTF. $W\lambda$ is the weighting relative to each wavelength (the wavelength intensity distribution).

Hereafter, the spectral purity range will be used to represent the spectral index value, but the present invention may be applied to the control of another spectral index value.

(Two-Stage Laser System)

Next, an outline of a two-stage laser system that serves as a prerequisite of the present invention will be described.

In recent years, demands have been made for increases in the output power of a narrow-spectrum laser. A two-stage laser system is a well-known method of achieving such an increase. A two-stage laser system is a laser system constituted by an oscillation laser device for generating light (a seed beam; a seed laser beam) having a narrow spectral line range, and an amplification laser device for amplifying the intensity of the seed beam (seed laser beam). A two-stage laser system differs from a one-stage laser system having only one laser chamber in that the output power can be increased by the amplification laser device in response to a reduction in output power caused by spectrum narrowing.

Two systems, namely a MOPO system and a MOPA system having different amplifying means, may be employed in a two-stage laser system.

MOPO is an abbreviation of Master Oscillator, Power Oscillator, and in this system, a resonator is provided not only in an oscillation chamber constituting the oscillation laser device, but also in an amplification chamber. As a result, laser oscillation can be performed by the amplification device alone. MOPA is an abbreviation of Master Oscillator, Power Amplifier, and in this system, a resonator is not provided in the amplification chamber. Thus, a laser beam cannot be extracted unless a seed beam is present.

In the absence of specific description to the contrary, a beam output from the oscillation laser device will be referred to hereafter as a "seed beam", and a beam output from the amplification laser device will be referred to as a "laser beam".

FIGS. 62A, 62B, and 62C are views showing states in which amplification is performed using the MOPA system. In the drawings, the waveform of the seed beam, the gain curve of the amplification device, and the waveform of the laser beam are each shown in association with a time axis.

As shown in FIG. 62, in the MOPA system, only the part (indicated by diagonal shading) where the seed beam overlaps the gain curve of the amplification laser device is amplified, and hence the spectral purity range E95 component of the seed beam is amplified as is.

FIG. 63 is similar to FIG. 62, but shows states in which amplification is performed using the MOPO system.

In the MOPO system, as shown in FIG. 63, only the E95 component of the seed beam in the part (indicated by diagonal shading) where the seed beam initially overlaps the gain curve of the amplification laser device is amplified and output as the laser beam. Hence, in the MOPA system, only the overlapping part forms the laser beam, and therefore the synchronization allowable range, or in other words the allowable range of the time (discharge timing) from the beginning of discharge by the oscillation laser device to the beginning of discharge by the amplification laser device is shorter than that of the MOPO system.

(Description of MOPO Laser System According to this Embodiment)

Next, using the MOPO system as a representative, the constitution of a laser system according to this embodiment will be described.

FIG. 1 is a block diagram of a laser system according to this embodiment. FIG. 1 shows a MOPO system two-stage laser device. FIG. 2A is a block diagram of an oscillation chamber shown in FIG. 1 and the vicinity thereof, and FIG. 2B is a block diagram of an amplification chamber shown in FIG. 1 and the vicinity thereof.

The laser system of this embodiment is mainly constituted by a two-stage laser device 2, and is further provided with an aligner 3 at the rear end thereof. The two-stage laser device 2 is mainly constituted by an oscillation laser device (OSC) 100 which pulse-oscillates a narrow-spectrum seed beam by repeatedly performing a laser gas discharge operation within an oscillation chamber 10, and an amplification laser device (AMP) 300 which amplifies the seed beam by discharging laser gas within an amplification chamber 30, and outputs an amplified laser beam. In the oscillation laser device 100, a narrow-spectrum seed beam is generated, and in the amplification laser device 300, the seed beam output by the oscillation laser device 100 is amplified.

The overall spectral characteristic of the two-stage laser device 2 is determined by the spectral characteristic of the seed beam output by the oscillation laser 100. The laser output (energy or power) of the two-stage laser device 2 is determined by the amplification capacity of the amplification laser device 300.

The laser beam output by the amplification laser device 300 is input into the aligner 3, and the input laser beam is used to expose an exposure subject such as a semiconductor wafer, for example.

The oscillation laser device 100 is constituted by the oscillation chamber 10, a charger 11, an oscillation high voltage pulse generator 12, a gas supply/discharge unit 14, a cooling water supply unit 15, an LNM 16, a front mirror 17, a first monitor module 19, and a discharge detection portion 20.

The amplification laser device 300 is constituted by the amplification chamber 30, a charger 31, an amplification high voltage pulse generator 32, a gas supply/discharge unit 34, a cooling water supply unit 35, a rear side mirror 36, an output mirror 37, and a second monitor module 39. Note that an optical resonator constituted by the mirrors 36 and 37 does not have to be an unstable resonator, and may be a stable resonator or an etalon type resonator having planar mirrors.

The oscillation laser device 100 and amplification laser device 300 comprise some identical constitutional elements, and hereafter, these identical parts will be described using the oscillation laser device 100 as a representative.

As shown in FIG. 2A, a pair of electrodes 10a, 10b, i.e. a cathode electrode 10a and an anode electrode 10b, are provided in the interior of the oscillation chamber 10 at a predetermined distance from each other, parallel in the lengthwise direction, and such that discharge surfaces thereof oppose each other.

An example of a power source for applying a voltage to the electrodes 10a, 10b is shown in FIG. 3A. FIG. 3A shows the power source and the chamber interior as an electric circuit.

FIG. 3A shows a circuit which includes a step-up transformer Tr1 in addition to a magnetic pulse compressor. Note that the circuit shown in FIG. 3B may be used in place of the circuit shown in FIG. 3A. FIG. 3B shows a circuit which includes a reactor L1 for charging a main capacitor C0 instead of the step-up transformer of FIG. 3A. Note that in the circuit shown in FIG. 3B, apart from a step-up operation by the step-up transformer, all operations are similar to those of the circuit shown in FIG. 3A, and therefore overlapping description has been omitted. Furthermore, the power source constitution and operations of the oscillation laser device 100 and amplification laser device 300 are identical, and therefore a description of the power source for the amplification laser 300 has been omitted. The symbols shown in parentheses in FIGS. 3A and 3B denote constitutional elements of the amplification laser device 300.

The circuit constitution and operations will now be described using FIG. 3A.

The power source is constituted by the charger 11 and the oscillation high voltage pulse generator 12.

The oscillation high voltage pulse generator 12 is a two-stage magnetic pulse compressor using three magnetic switches SR1, SR2, SR3 constituted by saturable reactors. The magnetic switch SR1 is provided to reduce switching loss in a solid-state switch SW, and is also known as a magnetic assist. A semiconductor switching element such as an IGBT, for example, is used as the solid-state switch SW.

A peaking capacitor Cp is disposed electrically parallel to the pair of discharge electrodes 10a, 10b. A capacitor C2 is disposed to the front of, and electrically parallel to, the peaking capacitor Cp, and a capacitor C1 is disposed to the front of, and electrically parallel to, the capacitor C2.

In this embodiment, a two-stage capacitance shifting circuit is formed by the magnetic switches SR2, SR3 and the capacitors C1, C2.

The voltage of the charger 11 is adjusted to a predetermined value V, and the main capacitor C0 is charged in accordance with this voltage value V. Assuming that the solid-state switch SW is OFF at this time, when charging of the main capacitor C0 is complete and the solid-state switch SW switches ON, the voltages applied to the two ends of the solid-state switch SW are mainly applied to the two ends of the magnetic switch SR1. When a time-integrated value of a charging voltage V0 of the main capacitor C0, which is applied to the two ends of the magnetic switch SR1, reaches a critical value determined according to the characteristics of the magnetic switch SR1, the magnetic switch SR1 becomes saturated and enters a conductive state. As a result, a current flows through the main capacitor C0, the magnetic switch SR1, a primary side of the step-up transformer Tr1, and a loop of the solid-state switch SW. Simultaneously, a current flows through a secondary side of the step-up transformer Tr1 and a loop of the capacitor C1, while the charge accumulated in the main capacitor C0 shifts to the capacitor C1, whereby the capacitor C1 is charged. When a time-integrated value of a voltage V1 in the capacitor C1 reaches a critical value determined according to the characteristics of the magnetic switch SR2, the magnetic switch SR2 becomes saturated and enters a conductive state. As a result, a current flows through the capacitor C1, the capacitor C2, and the loop of the magnetic switch SR3, while the charge accumulated in the capacitor C1 shifts to the capacitor C2, whereby the capacitor C2 is charged. When a time-integrated value of a voltage V2 in the capacitor C2 reaches a critical value determined according to the characteristics of the magnetic switch SR3, the magnetic switch SR3 becomes saturated and enters a conductive state. As a result, a current flows through the capacitor C2, the peaking capacitor Cp, and the loop of the magnetic switch SR3, while the charge accumulated in the capacitor C2 shifts to the peaking capacitor Cp, whereby the peaking capacitor Cp is charged.

As shown in FIG. 3A, the oscillation chamber 10 is provided with preionizing means constituted by a first electrode 91, a dielectric tube 92, and a second electrode 93. A preionizing capacitor Cp' is disposed electrically parallel to the pair of discharge electrodes 10a, 10b. Preionizing is performed between the pair of electrodes 10a, 10b in accordance with the charging voltage of the preionizing capacitor Cp'.

A corona discharge for preionizing is generated on the outer peripheral surface of the dielectric tube 92 with a base point situated in a location where the dielectric tube 92, into which the first electrode 91 is inserted, contacts the second electrode 93. As charging of the peaking capacitor Cp progresses, the voltage Vp thereof increases, and when the voltage Vp reaches a predetermined voltage, a corona discharge is generated on the outer peripheral surface of the dielectric tube 92. As a result of the corona discharge, an ultraviolet ray is generated on the outer periphery of the dielectric tube 92, and laser gas between the pair of electrodes 10a, 10b is preionized. As charging of the peaking capacitor Cp progresses further, the voltage Vp of the peaking capacitor Cp rises. When the voltage Vp reaches a certain value (a breakdown voltage) Vb, the laser gas between the pair of electrodes 10a, 10b is broken down, and as a result, a main discharge begins. The laser medium is excited by the main discharge, whereby a seed beam is generated in the oscillation laser device 100, and the injected seed beam is amplified in the amplification laser 300 (or amplifier). As a result of the main discharge, the voltage of the peaking capacitor Cp decreases rapidly such that eventually, the peaking capacitor Cp returns to its pre-charged state. By performing this discharge operation repeatedly through a switching operation of the solid-state switch SW, pulse laser oscillation is performed. The switching operation of the solid-state switch SW is performed on the basis of an external trigger signal. A synchronous controller 8 to be described below, for example, serves as an external controller for transmitting the trigger signal.

By setting the capacitance shifting circuit shown in FIG. 3A such that the inductance of each stage decreases steadily toward the latter stages, a pulse compression operation, in which the pulse range of the current pulse flowing through each stage becomes gradually narrower, is realized. As a result, short pulses can be discharged powerfully between the pair of electrodes 10a, 10b (between the pair of electrodes 30a, 30b).

Thus, a high-voltage pulse is applied to the pair of electrodes 10a, 10b by the power source constituted by the charger 11 and the oscillation high voltage pulse generator 12. When the high-voltage pulse is applied to the electrodes 10a, 10b, discharge occurs between the electrodes 10a, 10b, and as a result of this discharge, the laser gas sealed in the oscillation chamber 10 is excited.

The constitutions and operations of the charger 11 and oscillation high voltage pulse generator 12 in the oscillation laser device 100 were described above.

The gas supply/discharge unit 14 shown in FIG. 1 is constituted by a gas supply system for supplying laser gas to the interior of the oscillation chamber 10, and a gas discharge system for discharging laser gas from the interior of the oscillation chamber 10.

The gas supply system of the gas supply/discharge unit 14 supplies laser gas to the interior of the oscillation chamber 10. Thus, the laser gas is sealed in the oscillation chamber 10.

When the laser system shown in FIG. 1 is a fluorine molecule (F2) laser system, the gas supply/discharge unit 14 supplies fluorine (F2) gas and a buffer gas such as helium (He) or neon (Ne) to the oscillation chamber 10. When the laser system is a KrF excimer laser system, the gas supply/discharge unit 14 supplies krypton (Kr) gas, fluorine (F2) gas, and a buffer gas such as helium (He) or neon (Ne) to the oscillation chamber 10. When the laser system is an ArF excimer laser system, the gas supply/discharge unit 14 supplies argon (Ar) gas, fluorine (F2) gas, and a buffer gas such as helium (He) or neon (Ne) to the oscillation chamber 10. The supply and discharge of each gas are controlled by opening and closing valves provided in the gas supply/discharge unit 14.

As shown in FIG. 2A, the interior of the oscillation chamber 10 is provided with a cross-flow fan 10c. The laser gas is circulated through the chamber 10 by the cross-flow fan 10c and thereby delivered between the electrodes 10a, 10b.

As shown in FIG. 2A, the interior of the oscillation chamber 10 is also provided with a heat exchanger 10d. The heat exchanger 10d is supplied with cooling water from the cooling water supply unit 15. Thus, the heat exchanger 10d discharges heat from the interior of the oscillation chamber 10. The supply of cooling water to the heat exchanger 10d is controlled by opening and closing a valve provided in the cooling water supply unit 15 (FIG. 1).

Windows 10e, 10f are provided in a laser beam output part of the oscillation chamber 10 on the optical axis of the laser beam. The windows 10e, 10f are formed from a material that is permeable to laser light, such as CaF2, for example. The outside surfaces of the two windows 10e, 10f are disposed parallel to each other, and the two windows 10e, 10f are provided at Brewster's angles to reduce reflection loss in the laser beam. Furthermore, the windows 10e, 10f are disposed such that a linear polarization direction of the laser beam is perpendicular to the window surface.

A pressure sensor P1 monitors the gas pressure in the oscillation chamber 10. A signal indicating the gas pressure detected by the pressure sensor P1 is input into a utility controller 5. A temperature sensor T1 monitors the temperature in the oscillation chamber 10. A signal indicating the temperature detected by the temperature sensor T1 is also input into the utility controller 5.

The utility controller 5 generates a gas flow rate adjustment signal indicating whether or not each valve of the gas supply/discharge unit 14 is to be opened or closed, and the opening of each valve (or the gas flow rate), using the detection signal of the pressure sensor P1 as a feedback signal, and outputs the gas flow rate adjustment signal to the gas supply/discharge unit 14. When the gas flow rate adjustment signal is input into the gas supply/discharge unit 14, the opening and closing of each valve is controlled by the gas supply/discharge unit 14. Thus, the composition and pressure of the gas in the oscillation chamber 10 are adjusted to desired values.

The laser output power varies according to the temperature of the laser gas in the oscillation chamber 10. Therefore, to adjust the temperature of the laser gas in the oscillation chamber 10 to a desired temperature, the utility controller 5 generates a cooling water flow rate adjustment signal indicating whether or not the valves of the cooling water supply unit 15 are to be opened or closed, and the opening of the valves (or cooling water flow rate), using the detection signal of the temperature sensor T1 as a feedback signal, and outputs the cooling water flow rate adjustment signal to the cooling water supply unit 15. When the cooling water flow rate adjustment signal is input into the cooling water supply unit 15, the opening and closing of each valve is controlled by the cooling water supply unit 15. Thus, the flow rate of the cooling water that is supplied to the heat exchanger 10d in the oscillation chamber 10, or in other words the heat discharge amount, is adjusted.

The LNM (line-narrowing module) 16 is provided outside of the oscillation chamber 10 on the window 10e side of the optical axis of the laser beam (see FIG. 2A). The front mirror 17 is also provided outside of the oscillation chamber 10 and on the window 10f side of the optical axis of the laser beam (see FIG. 2A). The LNM 16 is constituted by an expanding prism and an optical element such as a grating (diffraction grating) serving as a wavelength selection element, for example. The LNM 16 may also be constituted by an etalon serving as a wavelength selection element and an optical element such as a fully reflective mirror. The optical element in the LNM 16 and the front mirror 17 together constitute a laser resonator.

The first monitor module 19 monitors (measures) laser beam characteristics such as the energy, output line range, and center wavelength of the laser beam that passes through the front mirror 17. The first monitor module 19 generates a signal indicating the center wavelength of the laser beam, and outputs the signal to a wavelength controller 6. The first monitor module 19 also measures the energy of the laser beam, and outputs a signal indicating the energy to an energy controller 7. Note that the functions of the electrodes 30$a$, 30$b$, a cross-flow fan 30$c$, a heat exchanger 30$d$, and windows 30$e$, 30$f$ of the amplification chamber 30 shown in FIG. 2B are identical to the corresponding constitutional elements of the oscillation chamber 10 shown in FIG. 2A, i.e. the electrodes 10$a$, 10$b$, cross-flow fan 10$c$, heat exchanger 10$d$, and windows 10$e$, 10$f$.

Further, the functions of the charger 31, amplification high voltage pulse generator 32, gas supply/discharge unit 34, cooling water supply unit 35, second monitor module 39, pressure sensor P2, and temperature sensor T2 provided in the amplification laser device 300 are identical to the corresponding constitutional elements provided on the oscillation laser device 100 side, i.e. the charger 11, oscillation high voltage pulse generator 12, gas supply/discharge unit 14, cooling water supply unit 15, first monitor module 19, pressure sensor P1, and temperature sensor T1. On the other hand, the amplification laser device 300 is provided with an unstable resonator to be described below in place of the laser resonator constituted by the LNM 16 and so on, which is provided in the oscillation laser device 100.

The rear side mirror 36 is provided outside of the amplification chamber 30 on the window 30$e$ side of the optical axis of the laser beam (see FIG. 2B), while the output mirror 37 is provided outside of the amplification chamber 30 on the window 30$f$ side of the optical axis of the laser beam (see FIG. 2B). The rear side mirror 36 and output mirror 37 together constitute an unstable type resonator. The reflective surface of the rear side mirror 36 is a concave surface, and a hole is provided in a central portion thereof for transmitting the laser beam from the mirror rear side to the reflective surface side. An HR (High Reflection) coating is applied to the reflective surface of the rear side mirror 36. The reflective surface of the output mirror 37 is a convex surface. An HR (High Reflection) coating is applied to the central portion thereof, and an AR (Anti Reflection) coating is applied to the periphery of the central portion. Instead of a mirror provided with a central hole, a mirror substrate on which only the part corresponding to the hole is coated with an AR coating may be used as the rear side mirror 36. Also, a stable resonator may be used instead of an unstable resonator.

A beam propagating portion 42 including a reflection mirror is provided between the front mirror 17 of the oscillation laser device 100 and the rear side mirror 36 of the amplification laser device 300. Having passed through the front mirror 17, the laser beam (seed beam) is guided to the rear side mirror 36 by the beam propagating portion 42. Having been guided to the beam propagating portion 42, the laser beam passes through the hole in the rear side mirror 36 via the beam propagating portion 42 and enters the amplification chamber 30. Having entered the amplification chamber 30, the laser beam passes through the amplification chamber 30 and is reflected on the central portion of the output mirror 37. Having been reflected by the output mirror 37, the laser beam passes through the amplification chamber 30 and is reflected on the periphery of the hole in the rear side mirror 36. Having been reflected by the rear side mirror 36, the laser beam passes through the amplification chamber 30, passes through the periphery of the central portion of the output mirror 37, and is output. In the amplification chamber 30, discharge is performed between the pair of electrodes 30$a$, 30$b$ in a similar manner to that of the oscillation chamber 10. When discharge occurs as the laser beam passes through the discharge portion of the amplification chamber 30, or in other words between the electrodes 30$a$, 30$b$, the power of the laser beam is amplified.

Signals indicating the laser beam characteristics monitored by the first monitor module 19 and second monitor module 39 are input into the wavelength controller 6. To set the center wavelength of the laser beam to a desired wavelength, the wavelength controller 6 generates a signal for varying the selected wavelength of the wavelength selection element (grating, etalon, or the like) in the LNM 16, and outputs this signal to a driver 21. The selected wavelength of the wavelength selection element is varied by varying the angle of incidence at which the laser beam enters the wavelength selection element, for example. To vary the angle of incidence at which the laser beam enters the wavelength selection element, the driver 21 controls the attitude angle and so on of the optical element (for example, an expanding prism, a fully reflective mirror, a grating, or similar) in the LNM 16 on the basis of the signal received from the wavelength controller 6. Note that wavelength selection control by the wavelength selection element is not limited to the example described above. For example, when the wavelength selection element is an air gap etalon, the air pressure (nitrogen or the like) in the air gap of the LNM 16 may be controlled, or the gap interval may be controlled.

A signal indicating the laser beam characteristic (the energy of the laser beam) monitored by the first monitor module 19 and second monitor module 39 is input into the energy controller 7. Note that the aligner 3 may be provided with an output monitor 51 for monitoring the energy of the laser beam, whereby a signal monitored by the output monitor 51 is input directly into the energy controller 7. Alternatively, the signal monitored by the output monitor 51 of the aligner 3 may be input into a controller 52 of the aligner 3 such that the signal is transmitted from the controller 52 to the energy controller 7 on the laser device 2 side.

To set the pulse energy at a desired value, the energy controller 7 generates a signal indicating the next charging voltage and outputs this signal to the synchronization controller 8.

A discharge start timing in each of the chambers 10, 30 is detected by the discharge detectors 20, 40, respectively.

The signal indicating the next charging voltage, which is output by the energy controller 7, and signals indicating the discharge start timings detected by the discharge detectors 20, 40, are input into the synchronization controller 8. The synchronization controller 8 controls the charging voltage of the charger 11 on the basis of the next charging voltage value, input from the energy controller 7, and the discharge start timings detected by the discharge detectors 20, 40.

When the discharge timing of the oscillation chamber 10 and the discharge timing of the amplification chamber 30 deviate from each other, the laser beam (seed beam) output by the oscillation chamber 10 is not amplified efficiently in the amplification chamber 30. It is therefore necessary to ensure that discharge is performed in the amplification chamber 30 at a discharge timing when the laser beam (seed beam) output from the oscillation chamber 10 fills the discharge region (excitation region) between the pair of electrodes 30a, 30b in the amplification chamber 30. To ensure that amplification is performed efficiently at the discharge timing, the synchronization controller 8 determines a delay in the timing at which a trigger signal is output to the solid-state switch SW of the amplification high voltage pulse generator 32, in relation to the timing at which a trigger signal is output to the solid-state switch SW of the amplification high voltage pulse generator 12, and varies the synchronization timing by varying the delay.

The constitution of a MOPO laser system was described above.

(Description of MOPA System)

The constitution of the MOPA system differs from that of the MOPO system described above in that the rear mirror 36 and output mirror 37 shown in FIG. 1, which constitute the laser resonator of the amplification chamber 30, are omitted. In the MOPA system, discharge begins in the amplification chamber 30 when the seed beam enters the amplification chamber 30. The seed beam is amplified by passing through the laser medium, which is excited to a high level by the discharge. The seed beam may pass through the laser medium in the amplification chamber 30 once, or to amplify the seed beam further, mirrors may be disposed at both ends of the amplification chamber 30 such that the seed beam passes through the laser medium in the amplification chamber 30 several times.

The laser system serving as a prerequisite of the present invention was described above. The present invention may be applied to either of two types of laser system, namely a MOPO system and a MOPA system. In the following, however, a MOPO system will be described in the absence of specific description to the contrary.

After describing the discoveries of the present invention, specific control examples (examples) thereof will be described.

(Spectral Index Value of Aligner and Exposure Light Source)

As described above, the imaging performance of the aligner 3 is affected by the spectral performance of the laser beam output from the exposure light source, or in other words the two-stage laser device 2. To maintain the imaging performance, at least one spectral index value (the spectral line range, spectral purity range E95, contrast loss, spectral standard deviation, or white OTF (Optical Transfer Function)) must be subjected to stabilization control. Here, stabilization control of the spectral index value means controlling the spectral index value within an allowable range of a target spectral index value.

(Reasons for (Necessity of) Stabilizing Spectral Purity Range E95)

When the spectral purity range widens, the imaging performance of the aligner 3 deteriorates due to chromatic aberration in the projection lens. As noted above, on the other hand, it has been suggested that when the spectral purity range takes a much narrower value than the value for which the optical system was designed, the quality of the integrated circuit may deteriorate unless the spectral purity range is held within a certain allowable range (see Patent Literature 1). Hence, it is said that the spectral purity range must be subjected to stabilization control within a value having a certain allowable range.

(Variation Factors of Spectral Purity Range E95)

Meanwhile, the spectral purity range varies over the long term due to temporal variation in the optical element of the LNM 16 or the chambers 10, 30, the thermal load produced thereon by oscillation, and so on. Moreover, the thermal load varies in accordance with variation in the oscillation pattern, i.e. the frequency, duty, pulse number, and stoppage time, and therefore variation in the spectral purity is dependent on the laser operation pattern.

(Means for Controlling Spectral Purity Range E95)

The present inventor discovered that a spectral purity range E95 (representing the spectral index value) of the laser beam output to the outside from a laser device 2 is determined by the discharge timing from the start of discharge in an oscillation chamber 10 to the start of discharge in an amplification chamber 30, and the spectral purity range E95 of the laser beam (seed beam) output from the oscillation chamber 10, and learned that these parameters, i.e. the discharge timing and the spectral purity range of the seed beam, can be controlled independently of center wavelength control.

The present inventor also learned that to eliminate variation in the spectral purity range caused by various variation factors as described above such that the spectral purity range is stabilized within the range of a certain allowable range, the spectral purity range can be monitored (measured) by a spectral purity range E95 detector (spectral purity range measuring means), and when the spectral purity range varies from a target spectral purity range, control can be performed to align the spectral purity range E95 with the target spectral purity range by each of controlling means using actuators described later.

Stabilization control of the spectral purity range is mainly realized by the following three means.
(1) Varying the discharge timing.
(2) Varying the spectral purity range of the seed beam output from the oscillation laser device 100.
(3) Varying the spectral purity range of the seed beam output from the oscillation laser device 100 and varying the discharge timing.

Of these three means, the greatest stabilization control effect is achieved with (3).

In the "control of the apparent spectral purity range" described in the related art, the wavelength is varied per pulse, and therefore exposure is performed by changing the best focus position on the wafer at each pulse in accordance with stabilization control of the spectral purity range. Since independent center wavelength control is impossible, best focus position deviation occurs.

According to the control means (1), (2), and (3) of the present invention, on the other hand, the spectral purity range can be substantially widened and narrowed, and the center wavelength can be controlled independently. Hence, the center wavelength does not change during stabilization control of the spectral purity range, and accordingly, the best focus position does not vary either. Thus, an optimum spectral shape is obtained in relation to the projection lens of the aligner 3 and best focus position deviation does not occur, and therefore the imaging performance of the projection lens can be maintained.

Control means (1) will now be described.

In the two-stage laser system shown in FIG. 1, in contrast to a one-stage laser system, the spectral purity range E95 can be controlled in accordance with the discharge timing from the beginning of discharge in the oscillation chamber 10 to the beginning of discharge in the amplification chamber 30.

FIG. 4 shows the manner in which the spectral purity range E95 varies in accordance with a discharge timing dt.

The symbol dt on the abscissa of the graph in FIG. 4 shows the discharge timing, or in other words the time from the beginning of discharge in the oscillation chamber 10 to the beginning of discharge in the amplification chamber 30. The left side ordinate of the graph in FIG. 4 is the spectral purity range E95, and as shown by a spectral purity range characteristic L1, the spectral purity range E95 decreases as the discharge timing dt increases (as the discharge timing is retarded). The reason for this will be explained using FIG. 5.

FIG. 5 shows a pulse waveform L3 of the seed beam. As shown in FIG. 5, the oscillated laser beam serving as the seed beam has a temporal spectral purity range E95 distribution according to which the spectral purity range E95 decreases toward the rear of the laser pulse waveform. Hence, the spectral purity range E95 of the amplified laser beam is determined according to the part of the seed beam pulse waveform, having the temporal spectral purity range E95 distribution shown in the FIG. 5, in which synchronization is performed. For example, when the discharge timing dt is retarded such that discharge is synchronized in the latter half part of the seed beam pulse waveform, the seed beam is amplified with a narrow spectral purity range E95, and as a result, the spectral purity range E95 of the amplified laser beam narrows. Conversely, when the discharge timing dt is advanced such that discharge is synchronized in the former half part of the seed beam pulse waveform, the seed beam is amplified with a wide spectral purity range E95, and as a result, the spectral purity range E95 of the amplified laser beam widens. Using this characteristic, control may be performed such that when the monitored (measured) spectral purity range E95 increases, the spectral purity range E95 can be reduced by increasing the discharge timing dt, and when the spectral purity range E95 decreases, the spectral purity range E95 can be increased by reducing the discharge timing dt.

Next, control means (2) will be described.

As another method of controlling the spectral purity range E95, the spectral purity range E95 of the seed beam itself may be controlled. The following three methods may be employed to control the spectral purity range E95 of the seed beam.

(2)-1 A method of controlling the rise of the seed beam pulse waveform.

(2)-2 A method of controlling the spectrum-narrowing performance.

(2)-3 A method of controlling the acoustic wave propagation speed.

The spectral purity range E95 of the output seed beam can be varied using any of these methods, and hence the amplified laser light can be varied in accordance therewith.

Next, control means (3) will be described.

As a further method of controlling the spectral purity range E95, control of the discharge timing, described in (1), and control of the spectral purity range E95 of the seed beam, described in (2), may be combined. Using control means (3), the synchronization allowable range can be enlarged by controlling the spectral purity range E95 within the allowable range. Here, the synchronization allowable range is a discharge timing range in which the energy of the laser beam equals or exceeds an allowable level. The synchronization allowable range will now be described more specifically using FIG. 4. In FIG. 4, the right side ordinate shows the laser output power, while L2 (MOPO system) and L2' (MOPA system) show characteristics of the laser beam output power. The synchronization allowable range is a discharge timing dt range in which the output power of the amplified laser beam is within a certain proportion, for example 80%, of a peak output power. Outside of the synchronization allowable range, the laser output power decreases greatly. L2 denotes the laser output power characteristic of the MOPO system, while L2' denotes the laser output power characteristic of the MOPA system, and by comparing these laser output power characteristics, it can be seen that the synchronization allowable range of the MOPA system is smaller than that of the MOPO system.

To narrow the spectral purity range E95 considerably, for example, first the spectral purity range E95 of the seed beam is narrowed through control of the spectral purity range E95 of the seed beam (2), whereupon the synchronization timing (FIG. 5) is aligned with the latter half of the seed beam pulse waveform through control of the discharge timing (1). In so doing, the spectral purity range E95 can be narrowed considerably. Conversely, to widen the spectral purity range E95 considerably, first the spectral purity range E95 of the seed beam is widened through the control of (2), whereupon the synchronization timing (FIG. 5) is aligned with the former half of the seed beam pulse waveform through the control of (1). In so doing, the spectral purity range E95 can be widened considerably. The order in which E95 control of the seed beam and control of the discharge timing are performed may be reversed from that described above.

By combining a technique, to be described below, of stretching the discharge pulse of the oscillation chamber 10 with the control means (1), (2), and (3) described above, the seed beam pulse waveform lengthens, and as a result, the synchronization allowable range is enlarged. In so doing, the control range of the spectral purity range E95 can be increased. Moreover, since the synchronization allowable range widens, the rate of change in the laser output power of the amplified laser beam relative to variation in the discharge timing dt can be suppressed, making it easier to stabilize the laser output power.

(Spectral Purity Range E95 Detector (Spectral Purity Range Measuring Means))

The value of the actual spectral purity range E95 of the laser beam output from the amplification laser device 300 is required to execute the control of the control means (1), (2), and (3). The spectral purity range E95 of the laser beam output from the amplification laser device 300 is detected (measured) by the second monitor module 39 serving as a spectral purity range E95 detector (spectral purity range measuring means). FIG. 8 is a block diagram of the second monitor module 39. Note that the constitution of the first monitor module 19 is identical, and hence description thereof has been omitted.

The second monitor module 39 is constituted by a beam splitter 391, an etalon spectroscope 393, and a photodiode 392.

The etalon spectroscope 393 measures a spectral index value such as the spectral purity range E95, and the photodiode 392 measures the laser output intensity. The etalon spectroscope 393 is constituted by beam scattering means 394 such as a diffuser or a lens array, an etalon 395, a lens 396, and a sensor array 397. A line sensor or the like in which a plurality of photodiode arrays are arranged in a single dimension, for example, may be used as the sensor array 397, and in this case, a plurality of line sensors are arranged in channel (ch: integer) order.

In the second monitor module 39, a part of the laser beam is sampled by the beam splitter 391 and caused to enter the etalon spectroscope 393. Having entered the etalon spectroscope 393, the laser beam is scattered by the beam scattering means 394 and caused to enter the etalon 395. Having passed through the etalon 395, the laser beam enters the lens 396. The sensor array 397 is disposed on the focal surface of the lens 396. Hence, when the laser beam passes through the lens 396, an interference fringe (fringe) is generated on the sensor array 397. Linear data regarding the wavelength and quantity of the laser beam are determined as a spectral waveform from the data of the fringe on the sensor array 397, and thus the spectral purity range E95 is calculated.

Note that in this embodiment, the etalon spectroscope 393 is used, but an angular dispersion type optical element may be used as a spectroscope. For example, a Czerny-Turner type spectroscope, a spectroscope employing a plurality of gratings, or a multipass spectroscope may be used.

A spectroscope has a unique response characteristic, or in other words an instrumental function. The measured spectral waveform is obtained by convolution-integrating the true spectral waveform using the instrumental function. Hence, to obtain the true spectral waveform, the measured spectral waveform may be subjected to deconvolution processing using the instrumental function. However, this calculation is time-consuming, and it is therefore preferable to store the correlation between the actual spectral purity range measured by the spectroscope and the true spectral purity range in advance, and determine the true spectral purity range through calculation. FIG. 9 shows an example of a correlative relationship L4 between an actual spectral index value (the spectral purity range E95) measured by the etalon spectroscope 393 and a true spectral index value (the spectral purity range E95) measured by a high resolution spectroscope. From the correlative relationship L4 shown in FIG. 9, the true spectral purity range corresponding to the actual spectral purity range measured by the etalon spectroscope 393 can be determined. Note, however, that the correlative relationship may vary slightly, and it is therefore necessary to calibrate the correlative relationship periodically using an external high resolution spectroscope.

Next, a main routine relating to stabilization control of the spectral purity range will be described with reference to the flowchart in FIG. 7.

As shown in FIG. 7, upon laser oscillation, the routine advances to a step 101, where a "spectral purity range E95 measurement" subroutine is executed such that the spectral purity range E95 is measured by the second monitor module 39. The spectral purity range E95 is measured per pulse. In consideration of the calculation time, however, the spectral purity range E95 may be evaluated according to an average value over n pulses or a moving average value. In this case, calibration processing is preferably performed at fixed intervals to check whether or not the measured value has deviated from the actual value. The specific content of the "spectral purity range E95 measurement" subroutine will be described later (step 101).

The value of a target spectral purity range E95 is set at E950, and a first allowable range relative to the target spectral purity range E950 is set at E950±dE95(S) (first control threshold dE95(S)). The first allowable range E950±dE95(S) relative to the target spectral purity range E950 is set in accordance with the specifications required by the aligner 3. Control is required to ensure that [the spectral purity range E95] does not exceed an upper limit value E950+dE95(S) of the first allowable range required by the aligner 3 or fall below a lower limit value E950−dE95(S) so as to fall outside of the range of the first allowable range. Therefore, a second control threshold dE95 having a certain predetermined margin (dE95(S)-dE95), or in other words a second allowable range E950±dE95 relative to the target spectral purity range E95, is set. The range of the second control threshold dE95 is 0<dE95<dE95(S). When dE95=0 and the measured value of the spectral purity range E95 deviates from the target value E950 even slightly, an E95 actuator to be described below is operated, and stabilization control is performed to ensure that the measured value E95 matches the target value E950.

After measuring the actual spectral purity range E95, a calculation is performed to determine whether or not the absolute value of the difference between the measured value E95 and the target value E950 is no greater than the second control threshold dE95, i.e. whether or not the measured spectral purity range E95 is within the second allowable range E950±dE95 (step 102).

When the absolute value of the difference between the measured value E95 and the target value E950 is no greater than the second control threshold dE95, or in other words when |E95−E950|<dE95, stabilization control of the spectral purity range E95 is not executed (an affirmative determination in the step 102). On the other hand, when the absolute value of the difference between the measured value E95 and the target value E950 exceeds the second control threshold dE95, or in other words when |E95−E950|>dE95 (a negative determination in the step 102), a determination is made as to whether or not the absolute value of the difference between the measured value E95 and the target value E950 is less than the first control threshold dE95(S) (|E95−E950|<dE95(S)) (step 103). If, as a result, it is determined that the absolute value of the difference between the measured value E95 and the target value E950 is equal to or greater than the first control threshold dE95(S) (a negative determination in the step 103), an error signal is transmitted to the aligner 3, and measures such as halting laser oscillation or closing a shutter provided between the aligner 3 and the two-stage laser device 2 is taken to prevent a laser beam having a spectral purity range outside of the first allowable range from entering the aligner 3.

On the other hand, when the absolute value of the difference between the measured value E95 and the target value E950 is less than the first control threshold dE95(S) (an affirmative determination in the step 103), the routine advances to a "stabilization control using the E95 actuator" subroutine, to be described below, to make the measured value E95 match the target value E950, and in this subroutine, stabilization control is executed by operating the E95 actuator (step 104).

Note that the content of the "stabilization control using the E95 actuator" subroutine of the step 104 will be described below in the examples. If, as a result of the processing performed in the "stabilization control using the E95 actuator" subroutine, the spectral purity range E95 falls within the allowable range, the routine returns to the main routine of FIG. 7.

FIG. 6 shows the "spectral purity range E95 measurement subroutine".

Following the start of the subroutine, the spectral waveform is measured by the second monitor module 39, as described with reference to FIG. 8 (step 201). The measured spectral waveform is subjected to deconvolution processing, whereby the true spectral waveform is calculated (step 202). Next, the average value or moving average value of the spectral purity range E95 is determined through calculation (step 203). Next, a determination is made as to whether or not to calibrate the spectral index value (spectral purity range) (step 204), and when it is determined that the spectral index value (spectral purity range) should be calibrated, the spectral index value (spectral purity range) is calibrated and the spectral purity range E95 is recalculated in accordance with the calibration value (step 205). When it is determined that the spectral index value (spectral purity range) need not be calibrated, the routine returns to the main routine of FIG. 7 with no further processing (step 206).

FIG. 10 shows a different aspect of the "spectral purity range E95 measurement subroutine" to that shown in FIG. 6.

Following the start of the subroutine, the spectral waveform is measured by the second monitor module 39, as described with reference to FIG. 8 (step 301). Next, the average value or moving average value of the spectral purity range E95 is determined through calculation (step 302).

Next, to shorten the calculation time, the true value of the spectral purity range E95 corresponding to the measured value is determined on the basis of the correlative relationship L4 between the measured value and true value of the spectral purity range E95, described with reference to FIG. 9. To perform this processing, the correlation between the etalon spectroscope 393 used in the actual measurement and a separate high resolution spectroscope serving as a master standard may be measured in advance, and the measurement result may be stored in memory as the correlative relationship L4 (step 303). Next, a determination is made as to whether or not to calibrate the spectral index value (spectral purity range) (step 304), and when it is determined that the spectral index value (spectral purity range) should be calibrated, the spectral index value (spectral purity range) is calibrated and the spectral purity range E95 is recalculated in accordance with the calibration value (step 305). When it is determined that the spectral index value (spectral purity range) need not be calibrated, the routine returns to the main routine of FIG. 7 with no further processing (step 306). Note that in this case, calibration may be performed using the high resolution spectroscope described above, or through calculation using the image dissection result of the aligner 3.

(E95 Actuator)

The E95 Actuators Used to Execute the "Stabilization Control by the E95 actuator" subroutine of the step 104 in FIG. 7 will now be described using various examples (control examples).

First Embodiment

Stabilization Control of Spectral Purity Range E95 by Controlling Discharge Timing (Control Means 1)

In this embodiment, the spectral purity range E95 of the laser beam output from the amplification laser device 300 is measured by the spectral purity range measuring means, and the spectral purity range E95 is subjected to stabilization control by controlling the discharge timing from the beginning of discharge by the oscillation laser device 100 to the beginning of discharge by the amplification laser device 300 such that the measured spectral purity range E95 is held within the allowable range E950±dE95 of the target spectral purity range E950.

In the case of the two-stage laser device 2 shown in FIG. 1, by varying the discharge timings of the two laser devices 100, 200 in the manner described above, the spectral characteristic can be altered. Reference Literature 1 (Japanese Patent Application No. 2002-046328) describes a technique in which this characteristic is employed to control the spectral line range to or below 0.2 pm. However, Reference Literature 1 describes a technique for controlling the spectral line range to or below 0.2 pm, and no description is provided of a technique for stabilizing the spectral line range within a predetermined allowable range.

An embodiment in which the spectral purity range is subjected to stabilization control using the characteristic whereby the spectral performance is varied by varying the discharge timing will be described below. Typically, when the discharge timing is varied, the laser output power also changes, but in the MOPO system in particular, the effect thereof is relatively small, and therefore the laser output power remains stable. To suppress variation in the laser output power further, the applied voltage, gas pressure, and so on are preferably controlled.

First, the principles of spectral performance control using the discharge timing will be described.

In a narrow-spectrum laser, a wavelength line range $\Delta\lambda$ and the spectral purity range E95 are narrowed by inserting a wavelength dispersion element into a laser resonator that oscillates in broadband. The wavelength dispersion element is a prism, a grating, an etalon, or similar. By means of the wavelength dispersion element, only the selected wavelength returns to the laser resonance axis, and therefore only the selected wavelength is amplified and output as a laser beam. Light in the wave range outside of the selected wavelength is removed when it passes through the wavelength dispersion element, and therefore the wavelength line range $\Delta\lambda$ and spectral purity range E95 become steadily narrower as the number of passes increases. The number of passes is known as the round trip frequency.

FIG. 11 shows the relationship of the round trip frequency with the laser pulse waveform and the spectral purity range E95.

FIGS. 11A to 11D are views showing the laser optical axis from the side face of the chamber 10 at a round trip frequency of zero, one, two, and three, respectively. FIG. 11E is a side view showing the laser optical axes of FIGS. 11A to 11D superposed. FIG. 11K is a top view of the chamber 10 corresponding to FIGS. 11A to 11E.

FIGS. 11F, 11G, 11H, 11I, and 11J show the laser pulse waveform, wavelength line range $\Delta\lambda$, and spectral purity range E95 corresponding to FIGS. 11A, 11B, 11C, 11D, and 11E, respectively. The abscissa of FIGS. 11F to 11J shows time (ns), while the left ordinate shoes the laser intensity and the right ordinate shows the wavelength line range $\Delta\lambda$ and spectral purity range E95. In FIGS. 11F to 11J, the wavelength line range $\Delta\lambda$ and spectral purity range E95 are marked by an x.

FIG. 11A shows the laser optical axis in a case where a photon generated in the chamber 10 is output from the chamber 10 without passing through the wavelength dispersion element (LNM 16) (round trip frequency zero). FIG. 11F shows the laser pulse waveform, wavelength line range $\Delta\lambda$, and spectral purity range E95 corresponding to FIG. 11A.

As shown in FIGS. 11A and 11F, the light that is output from the chamber 10 forms an ASE (Amplified Spontaneous Emission) component. The oscillation laser device 100 is provided with an output coupler 60 for returning the light that is generated in the oscillation chamber 10 to the oscillation chamber 10 at a predetermined reflectance. The output coupler 60 has a reflectance of approximately 30%. Accordingly, 70% of the ASE that is generated in the chamber 10 is output to the outside. Reflected ASE light forming the remaining 30% of the ASE generated in the chamber 10 returns to the chamber 10 to serve as a laser pilot. The ASE output intensity is far smaller than the laser output intensity, but since the ASE does not pass through the wavelength dispersion element (LNM 16), the wavelength line range $\Delta\lambda$ and spectral purity range E95 are large (see FIG. 11F).

FIG. 11B shows the laser optical axis in a case where light is output from the chamber 10 having passed through the wavelength dispersion element (LNM 16) once (a round trip frequency of one). FIG. 11G shows the laser pulse waveform, wavelength line range $\Delta\lambda$, and spectral purity range E95 corresponding to FIG. 11B.

As shown in FIGS. 11B and 11G, the ASE light shown in FIG. 11A is reflected by the output coupler 60 and returned to the chamber 10. Then, having passed through the wavelength dispersion element (LNM 16), the wavelength-selected light is returned to the chamber 10 and output to the outside of the chamber 10. By now, the output laser beam is delayed by the time required for light to perform a single reciprocation of the interior of the resonator. Since the light passes through the wavelength dispersion element (LNM 16) once, the wavelength line range Δλ and spectral purity range E95 are correspondingly narrower (see FIG. 11G).

FIGS. 11C and 11H show a similar case in which the round trip frequency is two, and FIGS. 11D and 11I show a similar case in which the round trip frequency is three.

Thus, increases in the round trip frequency lead to further delays in the output start time and further reductions in the spectral purity range E95 (see FIGS. 11H and 11I).

FIG. 11E shows the laser optical axes of FIGS. 11A to 11D superposed, and FIG. 11J shows the laser pulse waveform, wavelength line range Δλ, and spectral purity range E95 corresponding to FIG. 11A'. When observed in reality, the laser pulse waveform takes the shape shown in FIG. 11E. As shown in FIG. 11E, the wavelength line range Δλ and spectral purity range E95 become steadily narrower toward the latter half of the laser pulse waveform. Note that in FIGS. 11A to 11E, the laser optical axes are depicted separately in each reciprocation through the interior of the chamber 10 to facilitate understanding, but in reality, the laser optical axes overlap.

FIG. 12 shows a summary of the round trip frequencies shown in FIGS. 11A to 11E and the corresponding laser beam spectral waveforms. In FIG. 12, the symbols A to E correspond to FIGS. 11A to 11E, respectively. The spectral purity range E95 is the range of a region containing 95% of the total energy, and therefore, when the light component in the former half of the laser pulse waveforms corresponding to FIGS. 11A and 11B is included, the effect thereof intensifies, and as a result, the spectral purity range E95 widens.

FIGS. 11F to 11J show cases in which the small signal gain of the laser medium is large. When the small signal gain is small, the output intensity in the former half part of the laser pulse is weak and therefore not observed. Accordingly, the former half component of F and G do not appear, and as a result, the rise of the laser pulse waveform is retarded.

Hence, with a narrow-spectrum laser, the values of the spectral line range Δλ and spectral purity range E95 differ between the former half and latter half of the laser pulse waveform. In the former half of the laser pulse waveform, the spectral line range Δλ and spectral purity range E95 become wider, and in the latter half of the laser pulse waveform, the spectral line range Δλ and spectral purity range E95 become narrower. As described with reference to FIG. 5, in a system requiring synchronization of two laser devices, such as the two-stage laser device 2, when the discharge start timing of the amplification laser device 300 is aligned with the former half of the pulse waveform L3 of the seed beam output from the oscillation laser device 100, the light having a wide spectral range in the former half part of the seed beam pulse waveform L3 is amplified, and when the discharge start timing of the amplification laser device 300 is aligned with the latter half part of the seed beam pulse waveform L3, the light having a narrow spectral range in the latter half is amplified. Hence, as described with reference to FIG. 4, the spectral line range Δλ and spectral purity range E95 become gradually narrower as the discharge timing dt is delayed.

On the left side ordinate of FIG. 4, the spectral purity range target value is set at E950, and the second control threshold is set at dE95 (the second allowable range is set at E950±dE95).

As a result, the allowable upper limit of the spectral purity range is E950+dE95, and the allowable lower limit value is E950−dE95.

It is assumed, for example, that in order to match the spectral purity range to the target value E950, the discharge timing dt is set at dt0 and the laser devices 100, 300 are operated on the curve L1.

Here, when the actual measured spectral purity range E95 has widened (E95 increased), or in other words when a shift has occurred from the curve L1 to a curve L1(a), the discharge timing dt is retarded from dt0 to dt2, as shown by an arrow LA. By retarding the discharge timing dt from dt0 to dt2 in this manner, the spectral purity range can be narrowed and thereby returned to the value of the original target value E950.

On the other hand, when the actual measured spectral purity range E95 has narrowed (E95 reduced), or in other words when a shift has occurred from the curve L1 to a curve L1(b), the discharge timing dt is advanced from dt0 to dt1, as shown by an arrow LB. By advancing the discharge timing dt from dt0 to dt1 in this manner, the spectral purity range can be widened and thereby returned to the value of the original target value E950.

FIG. 13 is a flowchart of the first embodiment. FIG. 13 corresponds to the "stabilization control using the E95 actuator" subroutine (step 104) of the main routine shown in FIG. 7.

As described with reference to FIG. 7, when the value of the spectral purity range E95 measured by the second monitor module 39 becomes wider than the second allowable range E950+dE95 (when the spectral purity range E95 is within the first allowable range E950+dE95(S)) in the main routine (an affirmative determination in the step 103), the subroutine shown in FIG. 13 is entered.

The processing of the subroutine shown in FIG. 13 is executed by E95, the wavelength controller 6 and the synchronization controller 8, shown in FIG. 1.

When the subroutine shown in FIG. 13 begins, first a calculation is made by E95 and the wavelength controller 6 (FIG. 1) to determine whether the spectral purity range E95 has become wider or narrower than the target value, or in other words whether or not E95>E950 (step 401).

If, as a result of the determination, E95>E950, this means that the spectral purity range is wider than the target value, and therefore a value of the discharge timing dt (dt=dt0+dt') for narrowing the spectral purity range E95 to match the target value is calculated (step 402). Conversely, when E95>E950 is not established, this means that the spectral purity range is narrower than the target value, and therefore a value of the discharge timing dt (dt=dt0−dt') for widening the spectral purity range E95 to match the target value is calculated (step 403).

The value of the control interval dt' may be calculated from an incline k (see FIG. 4) of the correlation curve L1 of the spectral purity range E95 and the discharge timing dt (dt'=(|E95−E950|)/k). Alternatively, an optimum value for smooth control may be determined by performing actual control in advance, and the value of the control interval dt' may be fixed at this value.

Next, a determination is made (step 404) as to whether or not the calculated discharge timing dt has deviated from the synchronization allowable range (see FIG. 4) (limit detected).

When the calculated discharge timing dt deviates from the synchronization allowable range (limit detected), the laser output power decreases greatly such that the two-stage laser device 2 becomes meaningless. On the other hand, when the discharge timing dt is within the synchronization allowable range, the laser output power varies only slightly, and in this case, at least a fixed level of laser output power can be secured by controlling the charging voltage and gas pressure of the amplification laser device 300 simultaneously as required.

Hence, if the discharge timing deviates from the synchronization allowable range (limit detected) when shifted by the control interval dt', stabilization control can no longer be performed, and therefore the routine switches to another E95 control method or a control impossible signal is transmitted to the main controller 4 to halt laser oscillation (step 405).

When the discharge timing is within the synchronization allowable range (limit not detected), stabilization control is possible, and therefore the routine advances to a following step 406, where a command signal is transmitted to the synchronization controller 8, instructing the synchronization controller 8 to perform stabilization control. Upon reception of the command signal, the synchronization controller 8 shifts the discharge timing dt by the control interval dt' (step 406).

As described above, in this embodiment, stabilization control is performed within a control range, in which the synchronization allowable range for keeping the energy of the laser beam output from the amplification laser device 300 equal to or greater than an allowable level is obtained, of the allowable range E950+dE95 relative to the target spectral purity range E950.

Next, the routine enters the same "spectral purity range E95 measurement" subroutine (see FIGS. 6 and 10) as that of the step 101 in FIG. 7, where the actual spectral purity range E95 following variation of the discharge timing dt is measured (step 407), and a determination is made as to whether or not the measured spectral purity range E95 is within the second allowable range (E950±dE95) (step 408). If, as a result, the measured spectral purity range E95 is contained within the second allowable range (E950±dE95), the routine returns to the main routine of FIG. 7 (step 409).

On the other hand, if it is determined as a result of the determination in the step 408 that the measured spectral purity range E95 is not contained within the second allowable range (E950±dE95), the routine returns to the step 401 and repeats the subroutine until the spectral purity range E95 is contained within the second allowable range. Once the spectral purity range E95 has been contained within the second allowable range, the routine returns to the main routine of FIG. 7 (step 409).

Second Embodiment

Stabilization Control of Spectral Purity Range E95 Through Discharge Timing Control and Pulse Stretching Control (Control Means 1)

In this embodiment, pulse stretching means for extending the laser pulse waveform of the seed beam output from the oscillation laser device 100 are further provided. By extending the pulse waveform of the seed beam using these pulse stretching means, the synchronization allowable range at which the energy (output power) of the laser beam output from the amplification laser device 300 equals or exceeds an allowable level is enlarged, and in this state, similar discharge timing control to that of the first embodiment is performed, whereby the spectral purity range E95 is subjected to stabilization control.

Extending the laser pulse waveform by varying the laser discharge characteristic is known as (discharge) pulse stretching (control). By applying pulse stretching control to the oscillation laser device 100, the pulse length of the seed beam can be lengthened, and as a result, the synchronization allowable range shown in FIG. 4 can be enlarged.

FIG. 14 is a similar graph to that shown in FIG. 4. FIG. 14 shows a comparison of a relationship (laser output power characteristic) L6 between the discharge timing dt and the laser output power when pulse stretching control is performed (pulse stretching) and a relationship L2 between the discharge timing dt and the laser output power when pulse stretching is not performed (no pulse stretching), and a comparison of a relationship (spectral purity range characteristic) L7 between the discharge timing dt and the spectral purity range E95 when pulse stretching control is performed (pulse stretching), and a relationship L1 between the discharge timing dt and the spectral purity range E95 when pulse stretching is not performed (no pulse stretching).

As regards the spectral purity range characteristic, there is little variation between the characteristic L7 when pulse stretching control is performed (pulse stretching) and the characteristic L1 when pulse stretching is not performed (no pulse stretching). As regards the laser output power characteristic, however, large variation occurs between the characteristic L6 when pulse stretching control is performed (pulse stretching) and the characteristic L2 when pulse stretching is not performed (no pulse stretching). When pulse stretching control is performed (pulse stretching), the range of the synchronization allowable range (the range at which the laser output power equals or exceeds an allowable level (80% of the peak output power, for example)) becomes much wider, and as a result, the range in which the discharge timing dt can be controlled also increases. Hence, by widening the synchronization allowable range, the range in which the energy of the laser beam output by the amplification laser device 300 equals or exceeds the allowable level (80% of the peak output power, for example) widens, and as a result, variation in the laser output power caused by variation of the discharge timing dt can be reduced even further.

Accordingly, by applying pulse stretching during execution of discharge timing control (control means 1), the control range of the discharge timing dt can be widened, making discharge timing control more practical. Pulse stretching is realized by the pulse stretching means for extending the laser pulse waveform of the seed beam.

Next, the pulse stretching means will be described.

Discharge pulse stretching in a high repetition laser is performed using an oscillating current method, a current superposition method, or a simple spiker/sustainer method.

The oscillating current method is described in Reference Literature 2 (Japanese Patent Application Laid-open No. 2001-156367), for example. In the oscillating current method, the period of an oscillating current flowing between the discharge electrodes 10*a*, 10*b* is shortened and the circuit constant is determined such that the peak value of the current is increased. As a result, excitation of the laser gas is conducted in the first half period of the oscillating current and at least one half period following the first half period. Thus, the laser oscillation operation can be sustained and pulse stretching can be realized.

The current superposition method is described in Reference Literature 3 (Japanese Patent No. 3427889), for example. To describe the current superposition method using FIG. 3, a primary current for injecting energy into the discharge electrodes 10*a*, 10*b* from the magnetic pulse compression circuit via the peaking capacitor Cp and a secondary current for injecting energy into the discharge electrodes 10*a*, 10*b* from the final-stage capacitor C2 of the magnetic pulse compression circuit for charging the peaking capacitor are superposed, and the oscillation period of the secondary current is set longer than the oscillation period of the primary current. Thus, the laser oscillation operation of a single pulse is performed in a half period at the beginning of a discharge oscillating current waveform, in which the polarity of the primary current superposed with the secondary current reverses, and at least two half periods following this half period. As a result, pulse stretching is realized.

The simple spiker/sustainer method is described in Reference Literature 4 (Japanese Patent Application Laid-open No. 2000-353839), for example. In the simple spiker/sustainer method, pulse stretching is realized by a spiker circuit for initiating discharge and a sustainer circuit for maintaining discharge.

In the second embodiment, any of the pulse stretching means described above may be employed, and regardless of the pulse stretching means, the synchronization allowable range shown in FIG. 4 widens such that during stabilization control of the spectral purity range E95, the control range of the discharge timing dt can be enlarged.

The content of control to which pulse stretching is added is identical to that of the flowchart shown in FIG. 13, and hence description thereof has been omitted.

Third Embodiment

Stabilization Control of Spectral Purity Range E95 Through Control of Rise of Seed Beam Pulse Waveform (Control Means (2)-1)

In the third and subsequent embodiments, the spectral purity range E95 of the laser beam output from the amplification laser device 300 is measured by the spectral purity range measuring means, and the spectral purity range E95 of the seed beam output from the oscillation laser device 100 is controlled such that the measured spectral purity range E95 is contained within the allowable range E950±dE95 of the target spectral purity range E950. Thus, the spectral purity range E95 of the laser beam output from the amplification laser device 300 is subjected to stabilization control.

In the third embodiment, the spectral purity range E95 of the seed beam is controlled by varying the time from the beginning of discharge by the oscillation laser device 100 to the rise of the laser pulse, and thus the spectral purity range E95 of the laser beam output from the amplification laser device 300 is subjected to stabilization control.

FIG. 15 is a graph showing the waveform of the seed beam laser pulse output from the oscillation laser device 100, on which the abscissa shows time and the ordinate shows the laser output power.

When the time from the beginning of discharge by the oscillation laser device 100 to the rise of the pulse is retarded by reducing the small signal gain, the laser pulse waveform changes from the waveform shown by the broken line in FIG. 15 to the waveform shown by the solid line. By lengthening the time from the beginning of discharge to the rise of the laser pulse waveform in this manner, or in other words by shifting the laser pulse temporally to the latter half, the spectral purity range can be narrowed. The reason for this is that the pulse rises after the photon is amplified following several passes through the wavelength selection element (LNM 16), as described with reference to FIG. 11, and therefore the spectral purity range becomes smaller as the round trip frequency increases. Conversely, when the laser pulse is shifted to the former half by increasing the small signal gain, the spectral purity range widens according to the same principle (the spectral purity range increases as the round trip frequency decreases).

When the rise of the laser pulse waveform of the seed beam output from the oscillation laser device 100 is controlled using this characteristic, the wavelength line range of the spectral waveform of the seed beam can be varied as shown in FIGS. 12A to 12C. When the spectral purity range E95 of the seed beam changes in this manner, the spectral purity range E95 of the laser beam that is amplified and output by the amplification laser device 300 changes in accordance therewith.

As will be described below, the F2 concentration, the total gas pressure, the charging voltage, the output coupler (OC) reflectance, and so on may be used as parameters enabling variation of the laser pulse waveform and variation of the spectral purity range E95. By varying these parameters, the laser output power varies in addition to the spectral purity range E95. Therefore, in a one-stage laser device, the variable range of each parameter is limited, and as a result, the control range of the spectral purity range E95 becomes narrower. Moreover, with a parameter that affects the laser output power greatly, such as the charging voltage, it is difficult to control the spectral purity range E95. With the two-stage laser device 2, in contrast, the laser output power can be controlled by the amplification laser device 300, and therefore variation in the output power of the laser beam output by the amplification laser device 300 does not pose a problem even when the output power of the seed beam output by the oscillation laser device 100 is varied to a greater or lesser extent by varying the respective parameters. Hence, by controlling the respective parameters, the spectral purity range E95 can be subjected to stabilization control with no limitations on the laser output power.

Fourth Embodiment

Stabilization Control of Spectral Purity Range E95 by Controlling Pulse Rise Through Variation of Fluorine F2 Concentration to Alter Seed Beam Pulse Waveform (Control Means (2)-1)

In this embodiment, the pulse waveform of the seed beam is varied by varying the fluorine molecule F2 concentration in the oscillation chamber 10. In so doing, the rise of the laser pulse is controlled, and hence the spectral purity range E95 is subjected to stabilization control.

FIG. 16 shows a relationship L8 between a fluorine molecule F2 concentration NF2 (%) in the oscillation chamber 10 and the spectral purity range E95 (a.u.), and a relationship L9 between the same fluorine molecule F2 concentration NF2 (%) and a laser output power (seed beam intensity) E (a.u.). As shown in FIG. 16, by reducing the fluorine molecule F2 concentration in the oscillation chamber 10, the spectral purity range E95 can be narrowed. This is described in Reference Literature 5 (Japanese Patent Application No. 4-312202). By controlling the fluorine molecule F2 concentration using this phenomenon, the spectral purity range E95 can be subjected to stabilization control.

FIG. 17 shows the laser pulse waveform of the seed beam when the fluorine molecule F2 concentration is varied. The abscissa of FIG. 17 shows time (ns), and the ordinate shows the laser intensity (a.u.). The broken line shows the laser pulse waveform of the seed beam when the fluorine molecule F2 concentration is 0.06%, and the solid line shows the laser pulse waveform of the seed beam when the fluorine molecule F2 concentration is 0.14%. FIG. 17 also shows parts corresponding to FIGS. 12A to 12D.

As shown in FIG. 17, when the fluorine molecule F2 concentration is high, the time from the beginning of discharge to observation of the output seed beam is short, i.e. the seed beam is output within a short time period. Hence, when the fluorine molecule F2 concentration is high, the components (a) and (b) of the pulse former half increase in intensity, and the spectral purity range E95 of the seed beam widens, as shown in FIGS. 12A and 12B.

When the fluorine molecule F2 concentration rises, the number density of the fluorine molecule F2 increases, leading to an increase in the small signal gain g of the laser medium, and as a result, the rise of the pulse is advanced. When the reflectance of the output coupler is R1, the reflectance of the other mirror constituting the resonator is R2, the absorption coefficient of the laser medium is α, and the length of the laser medium is L, a net gain (increase proportion) G in the optical intensity following a single reciprocation of the resonator is expressed as G=R1×R2×EXP{2(g−α)L}. It is assumed here that a condition G>1 for amplifying the optical intensity is satisfied. When the initial fluorescence intensity is I0 and n round trips are performed, the intensity I that is output to the outside becomes I=(1−R1)×I0×G[INSERT SYMBOL]n−A. A denotes the loss received by the propagation system, including the monitor modules and so on, following output. I>1 is required to observe the rise of the laser pulse when 1 [mJ/cm2], for example, is exceeded on the outside as the laser output power In other words, (1−R1)×I0×[R1×R2×EXP{2 (g−α)L}][INSERT SYMBOL]n−A>1 is a condition enabling the laser pulse to rise. Hence, when the small signal gain g is large, the condition described above is satisfied by a small number of round trips, and therefore laser oscillation begins within a short time period.

When the fluorine molecule F2 concentration is increased in accordance with the principles described above, the gain increases, laser output is obtained within a short time period, and the spectral purity range E95 widens. Hence, by controlling the fluorine molecule F2 concentration, the spectral purity range E95 can be subjected to stabilization control.

FIG. 18 is a flowchart of the fourth embodiment. FIG. 18 corresponds to the "stabilization control using the E95 actuator" subroutine (step 104) of the main routine shown in FIG. 7.

As shown in FIG. 7, when the value of the spectral purity range E95 measured by the second monitor module 39 becomes wider than the second allowable range E950+dE95 (when the spectral purity range E95 is within the first allowable range E950+dE95(S)) in the main routine (an affirmative determination in the step 103), the subroutine shown in FIG. 18 is entered.

The processing of the subroutine shown in FIG. 18 is executed by E95, the wavelength controller 6, the main controller 4, and the utility controller 5, shown in FIG. 1.

When the subroutine shown in FIG. 18 begins, first the value NF2 of the current fluorine molecule F2 concentration in the oscillation chamber 10 is detected. Fluorine molecule F2 gas decreases through reaction with the material of the electrodes 10a, 10b during discharge, and the laser output power decreases accordingly. Hence, to stabilize the laser output power, fluorine molecule F2 gas is injected periodically. For example, the fluorine molecule F2 gas consumption per unit shot number is measured in advance, and on the basis of the measured value, fluorine molecule F2 gas is injected into the oscillation chamber 10 in accordance with the shot number. Therefore, to detect the fluorine molecule F2 concentration easily, the fluorine F2 gas injection amount and gas discharge amount are preferably recorded when the laser gas is replaced such that the calculation can be performed using the values of the injection amount and discharge amount. Alternatively, a concentration meter for measuring the fluorine molecule F2 concentration may be attached to the oscillation chamber 10 such that the fluorine molecule F2 concentration can be detected by reading the value of the concentration meter (step 510).

Next, a calculation is made by E95 and the wavelength controller 6 (FIG. 1) to determine whether the spectral purity range E95 has become wider or narrower than the target value, or in other words whether or not E95>E950 (step 501).

If, as a result of the determination, E95>E950, this means that the spectral purity range is wider than the target value, and therefore the value of a decrease dNF2 in the fluorine molecule F2 concentration required to narrow the spectral purity range E95 is calculated, and the reduced concentration value is calculated as $$NF2=NF2-dNF2$$

(step 502).

Conversely, when E95>E950 is not established, this means that the spectral purity range is narrower than the target value, and therefore the value of an increase dNF2 in the fluorine molecule F2 concentration required to widen the spectral purity range E95 is calculated, and the increased concentration value is calculated as $$NF2=NF2+dNF2$$

(step 503). The value of the increase/decrease dNF2 may be calculated from the correlative relationship L8 between the spectral purity range E95 and the fluorine molecule F2 concentration shown in FIG. 16, for example.

The spectral purity range E95 varies according to the values of the total gas pressure and the charging voltage, as well as the fluorine molecule F2 concentration. Therefore, a relational expression $$E95=f(V,NF2,TP)$$

of the spectral purity range E95, a charging voltage V, the fluorine concentration NF2, and a total gas pressure TP is preferably stored in advance, and the charging voltage V and total gas pressure TP are preferably detected during measurement of the spectral purity range. The resulting detection values are then inserted into the relational expression (E95=f (V, NF2, TP)) together with the fluorine F2 concentration NF2 detected in the step 510, and a relational expression $$E95=h(NF2)$$

of the spectral purity range and fluorine concentration is calculated. The equation $$dNF2=h-1(|E95-E950|)$$

is then determined from the relational expression, and thus the rate of change dNF2 in the fluorine concentration corresponding to the displacement |E95−E950| in the spectral purity range can be calculated. Here, x=h−1(y) is an inverse function of y=h(x). Alternatively, an optimum value for smooth control may be determined in advance by performing an actual control operation, and the fluorine molecule F2 concentration may be fixed at this value.

Next, a determination is made as to whether or not the value changed by the concentration increase/decrease dNF2, which is determined in the manner described above, is within a range permitting actual variation of the fluorine molecule F2 concentration. When the fluorine molecule F2 concentration is extremely low or extremely high, a gain reduction occurs and glow discharge becomes unstable, making laser oscillation impossible. Hence, a fluorine molecule F2 concentration control range in which laser oscillation can be performed is set, and a determination is made as to whether or not the value changed by the concentration increase/decrease dNF2 has deviated from this concentration control range (limit detected) (step 504). If, as a result of the determination, the limit is detected, it is determined that stabilization control of the spectral purity range E95 can no longer be performed by controlling the fluorine molecule F2 concentration, and therefore the routine switches to another E95 control method or a control impossible signal is transmitted to the main controller 4 to halt laser oscillation (step 505).

When the value changed by the concentration increase/decrease dNF2 is within the concentration control range (limit not detected), stabilization control is possible, and therefore the routine advances to a following step 506, where a command signal is transmitted to the main controller 4, instructing the main controller 4 to perform stabilization control. Upon reception of the command signal, the main controller 4 outputs a command signal to the utility controller 5, and upon reception of the command signal, the utility controller 5 operates the gas supply/discharge unit 14. When the gas supply/discharge unit 14 is operated, gas is injected into the oscillation chamber 10 or discharged from the oscillation chamber 10, and as a result, the fluorine molecule F2 concentration is varied by the concentration increase/decrease dNF2. More specifically, in the gas supply/discharge unit 14, an air valve of a gas discharge line connected to the oscillation chamber 10 and an air valve or a mass-flow controller of an F2/Ne gas line in a gas intake line connected to the oscillation chamber 10 are controlled. To narrow the spectral purity range, the valve of the gas discharge line is opened and dp1 (=TP×(dNF2/NF2)) is discharged to reduce the fluorine concentration by dNF2, whereupon Ar/Ne gas is injected in an amount corresponding to dp1. To widen the spectral purity range, the valve of the gas discharge line is opened and dp2 (=dp1/0.01x) is discharged to increase the fluorine concentration by dNF2, whereupon x % diluted F2/Ne gas is injected in an amount corresponding to dp2 (dp2=dp1/0.01x). At this time, the gas pressure drops temporarily, and to eliminate this drop, gas discharge and gas injection may be implemented simultaneously using the mass-flow controller (step 506).

A preferred embodiment of gas injection will be described using an ArF excimer laser as an example. Replenishment gas is stored in two canisters 1 and 2. A mixture of Ar gas and Ne gas is sealed in the interior of the canister 1, and a mixture of F2 gas, Ar gas, and Ne gas is sealed in the interior of the canister 2. The partial pressure ratio of the Ar gas and Ne gas in both canisters is substantially identical, and the partial pressure ratio of the gases is adjusted to a ratio suitable for an ArF excimer laser operation. The F2 gas in the canister 2 has a high partial pressure exceeding the range that is suitable for an ArF excimer laser operation. Hence, when F2 gas is to be injected into the oscillation chamber, the F2 gas is injected from the canister 2. Since the F2 gas in the canister 2 has a high partial pressure, F2 gas that is diluted by the gas in the oscillation chamber to an appropriate partial pressure can be supplied. When a gas other than F2 gas is to be injected, the gas is injected from the canister 1. Even when laser gas injection and discharge are performed repeatedly, the partial pressure ratio of the Ar gas and Ne gas in the interior of the oscillation chamber is maintained at a substantially constant value, and hence long-term laser stabilization can be performed.

Next, the routine enters the same "spectral purity range E95 measurement" subroutine (see FIGS. 6 and 10) as that of the step 101 in FIG. 7, where the actual spectral purity range E95 following variation of the fluorine molecule F2 concentration is measured (step 507), and a determination is made as to whether or not the measured spectral purity range E95 is within the second allowable range (E950±dE95) (step 508). If, as a result, the measured spectral purity range E95 is contained within the second allowable range (E950±dE95), the routine returns to the main routine of FIG. 7 (step 509).

On the other hand, if it is determined as a result of the determination of the step 508 that the measured spectral purity range E95 is not contained within the second allowable range (E950+dE95), the routine returns to the step 510 and repeats the subroutine until the spectral purity range E95 is contained within the second allowable range. Once the spectral purity range E95 has been contained within the second allowable range, the routine returns to the main routine of FIG. 7 (step 509).

As the processing of the subroutine described above is performed and the fluorine molecule F2 concentration varies, the output intensity of the seed beam also varies (see L9 in FIG. 16). As described above, however, the laser output power can be stabilized by controlling the discharge parameters (total gas pressure, charging voltage, and so on) of the amplification laser device 300.

Fifth Embodiment

Stabilization Control of Spectral Purity Range E95 by Controlling Pulse Rise Through Variation of Total Gas Pressure to Alter Seed Beam Pulse Waveform (Control Means (2)-1)

In this embodiment, the pulse waveform of the seed beam is varied by varying the total gas pressure in the oscillation chamber 10. In so doing, the rise of the laser pulse is controlled, and hence the spectral purity range E95 is subjected to stabilization control.

FIG. 64 shows the laser pulse waveform of the seed beam when the total gas pressure in the oscillation chamber 10 has been altered. The abscissa of FIG. 64 denotes time, and the ordinate denotes the laser output power (seed beam intensity). The broken line shows the laser pulse waveform of the seed beam when the total gas pressure is small, and the solid line shows the laser pulse waveform of the seed beam when the total gas pressure is large.

As shown in FIG. 64, by reducing the total gas pressure in the oscillation chamber 10, the rise of the laser pulse is delayed and the latter half part of the pulse waveform increases in intensity. Conversely, when the total gas pressure increases, the rise of the laser is advanced and the former half of the pulse waveform increases in intensity. The reason for this is that when the total gas pressure rises, the discharge resistance increases, leading to an increase in the discharge start voltage, and by extension, an increase in the injection energy into the laser medium from the power source 11, 12. The density of the excimer molecule itself also increases, leading to an increase in gain. As described above in the fourth embodiment, the pulse waveform varies as a result of variation in the gain. Accordingly, the relationship between the total gas pressure TP, the spectral purity range E95, and the laser output power E exhibits similar behavior to the relationship L8, L9 between the fluorine molecule F2 concentration, the spectral purity range E95, and the laser output power E shown in FIG. 16.

FIG. 19 is a flowchart of the fifth embodiment. FIG. 19 corresponds to the "stabilization control using the E95 actuator" subroutine (step 104) of the main routine shown in FIG. 7.

As shown in FIG. 7, when the value of the spectral purity range E95 measured by the second monitor module 39 becomes wider than the second allowable range E950+dE95 (when the spectral purity range E95 is within the first allowable range E950+dE95(S)) in the main routine (an affirmative determination in the step 103), the subroutine shown in FIG. 19 is entered.

The processing of the subroutine shown in FIG. 19 is executed by E95, the wavelength controller 6, the main controller 4, and the utility controller 5, shown in FIG. 1.

When the subroutine shown in FIG. 19 begins, first the current total gas pressure TP in the oscillation chamber 10 is detected (step 610).

Next, a calculation is made by E95 and the wavelength controller 6 (FIG. 1) to determine whether the spectral purity range E95 has become wider or narrower than the target value, or in other words whether or not E95>E950 (step 601).

If, as a result of the determination, E95>E950, this means that the spectral purity range is wider than the target value, and therefore the value of a decrease dTP in the total gas pressure TP required to narrow the spectral purity range E95 is calculated, and the reduced value is calculated as $$TP = TP - dTP$$

(step 602).

Conversely, when E95>E950 is not established, this means that the spectral purity range is narrower than the target value, and therefore an increase dTP in the total gas pressure TP required to widen the spectral purity range E95 is calculated, and the increased value is calculated as $$TP = TP + dTP$$

(step 603). The value of the increase/decrease dTP may be calculated from the correlative relationship L8 between the spectral purity range E95 and the total gas pressure, which is identical to the correlative relationship shown in FIG. 16 between the spectral purity range E95 and the fluorine molecule F2 concentration, for example.

The spectral purity range E95 varies according to the values of the fluorine molecule F2 concentration and the charging voltage, as well as the total gas pressure. Therefore, a relational expression $$E95 = f(V, NF2, TP)$$

of the spectral purity range E95, the charging voltage V, the fluorine concentration NF2, and the total gas pressure TP is preferably stored in advance, and the charging voltage V and fluorine F2 concentration NF2 are preferably detected during measurement of the spectral purity range. The resulting detection values are then inserted into the relational expression (E95=f(V, NF2, TP)) together with the total gas pressure TP detected in the step 610, and a relational expression $$E95 = i(TP)$$

of the spectral purity range and total gas pressure is calculated. The equation $$dTP = i-1(|E95 - E950|)$$

is then determined from the relational expression, and thus the rate of change dTP in the total gas pressure corresponding to the displacement |E95−E950| in the spectral purity range can be calculated. Here, $x = i-1(y)$ is an inverse function of $y = i(x)$. Alternatively, an optimum value for smooth control may be determined in advance by performing an actual control operation, and the total gas pressure may be fixed at this value.

Next, a determination is made as to whether or not the value changed by the total gas pressure increase/decrease dTP, which is determined in the manner described above, is within a range permitting actual variation of the total gas pressure TP. When the total gas pressure is extremely low, a gain reduction occurs, making laser oscillation impossible. When the total gas pressure is extremely high, the pressure in the oscillation chamber 10 reaches a critical value, making it physically impossible to raise the gas pressure further.

Hence, a total gas pressure control range is set, and a determination is made as to whether or not the value changed by the total gas pressure increase/decrease dTP has deviated from this total gas pressure control range (limit detected) (step 604). If, as a result of the determination, the limit is detected, it is determined that stabilization control of the spectral purity range E95 can no longer be performed by controlling the total gas pressure, and therefore the routine switches to another E95 control method or a control impossible signal is transmitted to the main controller 4 to halt laser oscillation (step 605).

When the value changed by the total gas pressure increase/decrease dTP is within the total gas pressure control range (limit not detected), stabilization control is possible, and therefore the routine advances to a following step 606, where a command signal is transmitted to the main controller 4, instructing the main controller 4 to perform stabilization control. Upon reception of the command signal, the main controller 4 outputs a command signal to the utility controller 5, and upon reception of the command signal, the utility controller 5 operates the gas supply/discharge unit 14. When the gas supply/discharge unit 14 is operated, gas is injected into the oscillation chamber 10 or discharged from the oscillation chamber 10, and as a result, the total gas pressure TP is varied by the total gas pressure increase/decrease dTP. More specifically, in the gas supply/discharge unit 14, an air valve of a gas discharge line connected to the oscillation chamber 10 and an air valve of an Ar/Ne gas line in a gas intake line connected to the oscillation chamber 10 are controlled. To narrow the spectral purity range, the valve of the gas discharge line is opened and gas is discharged to reduce the total gas pressure by dTP. To widen the spectral purity range, the valve of the Ar/Ne gas line is opened and gas is injected to increase the total gas pressure by dTP (step 606).

A preferred embodiment of gas injection will be described using an ArF excimer laser as an example. Replenishment gas is stored in two canisters 1 and 2. A mixture of Ar gas and Ne gas is sealed in the interior of the canister 1, and a mixture of F2 gas, Ar gas, and Ne gas is sealed in the interior of the canister 2. The partial pressure ratio of the Ar gas and Ne gas in both canisters is substantially identical, and the partial pressure ratio of the gases is adjusted to a ratio suitable for an ArF excimer laser operation. The F2 gas in the canister 2 has a high partial pressure exceeding the range that is suitable for an ArF excimer laser operation. Hence, when F2 gas is to be injected into the oscillation chamber, the F2 gas is injected from the canister 2. Since the F2 gas in the canister 2 has a high partial pressure, F2 gas that is diluted by the gas in the oscillation chamber to an appropriate partial pressure can be supplied. When a gas other than F2 gas is to be injected, the gas is injected from the canister 1. Even when laser gas injection and discharge are performed repeatedly, the partial pressure ratio of the Ar gas and Ne gas in the interior of the oscillation chamber is maintained at a substantially constant value, and hence long-term laser stabilization can be performed.

Next, the routine enters the same "spectral purity range E95 measurement" subroutine (see FIGS. 6 and 10) as that of the step 101 in FIG. 7, where the actual spectral purity range E95 following variation of the total gas pressure is measured (step 607), and a determination is made as to whether or not the measured spectral purity range E95 is within the second allowable range (E950±dE95) (step 608). If, as a result, the measured spectral purity range E95 is contained within the second allowable range (E950±dE95), the routine returns to the main routine of FIG. 7 (step 609).

On the other hand, if it is determined as a result of the determination of the step 608 that the measured spectral purity range E95 is not contained within the second allowable range (E950±dE95), the routine returns to the step 610 and repeats the subroutine until the spectral purity range E95 is contained within the second allowable range. Once the spectral purity range E95 has been contained within the second allowable range, the routine returns to the main routine of FIG. 7 (step 609).

As the processing of the subroutine described above is performed and the total gas pressure varies, the output intensity of the seed beam also varies (see L9 in FIG. 16). As described above, however, the laser output power can be stabilized by controlling the discharge parameters (total gas pressure, charging voltage, and so on) of the amplification laser device 300.

Sixth Embodiment

Stabilization Control of Spectral Purity Range E95 by Controlling Pulse Rise Through Variation of Charging Voltage to Alter Seed Beam Pulse Waveform (Control Means (2)-1)

As described with reference to FIGS. 1, 2, and 3, the main discharge is performed by applying a voltage corresponding to the charging voltage of the power source 11, 12 to the pair of electrodes 10a, 10b in the oscillation laser device 100. In this embodiment, the pulse waveform of the seed beam is varied by varying the charging voltage. In so doing, the rise of the laser pulse is controlled, and thus the spectral purity range E95 is subjected to stabilization control.

FIG. 64 shows the laser pulse waveform of the seed beam when the charging voltage V of the charger 11, corresponding to the voltage that is applied to the electrodes 10a, 10b in the oscillation chamber 10, has been altered. The abscissa of FIG. 64 denotes time, and the ordinate denotes the laser output power (seed beam intensity). The broken line shows the laser pulse waveform of the seed beam when the charging voltage V is small, and the solid line shows the laser pulse waveform of the seed beam when the charging voltage V is large.

As shown in FIG. 64, by reducing the charging voltage V, the rise of the laser pulse is delayed and the latter half part of the pulse waveform increases in intensity. Conversely, when the charging voltage V increases, the rise of the laser is advanced and the former half of the pulse waveform increases in intensity. The reason for this is that when the voltage for charging the capacitors of the power source 11, 12 increases, the charging speed from the capacitors to the electrodes 10a, 10b at the start of discharge rises, leading to an increase in the discharge start voltage, and by extension, an increase in the injection energy into the laser medium from the power source 11, 12 and an increase in gain. As described above in the fourth embodiment, the pulse waveform varies as a result of variation in the gain. Accordingly, the relationship between the charging voltage V, the spectral purity range E95, and the laser output power E exhibits similar behavior to the relationship L8, L9 between the fluorine molecule F2 concentration, the spectral purity range E95, and the laser output power E shown in FIG. 16.

FIG. 20 is a flowchart of the sixth embodiment. FIG. 20 corresponds to the "stabilization control using the E95 actuator" subroutine (step 104) of the main routine shown in FIG. 7.

As shown in FIG. 7, when the value of the spectral purity range E95 measured by the second monitor module 39 becomes wider than the second allowable range E950+dE95 (when the spectral purity range E95 is within the first allowable range E950+dE95(S)) in the main routine (an affirmative determination in the step 103), the subroutine shown in FIG. 20 is entered.

The processing of the subroutine shown in FIG. 20 is executed by E95, the wavelength controller 6, the main controller 4, the energy controller 7, and the synchronization controller 8, shown in FIG. 1.

When the subroutine shown in FIG. 20 begins, first the current charging voltage V of the power source 11, 12 (charger 11) for applying a voltage to the electrodes 10a, 10b in the oscillation chamber 10 is detected (step 710).

Next, a calculation is made by E95 and the wavelength controller 6 (FIG. 1) to determine whether the spectral purity range E95 has become wider or narrower than the target value, or in other words whether or not E95>E950 (step 701).

If, as a result of the determination, E95>E950, this means that the spectral purity range is wider than the target value, and therefore the value of a decrease dV in the charging voltage V required to narrow the spectral purity range E95 is calculated, and the reduced value is calculated as $$V=V-dV$$

(step 702).

Conversely, when E95>E950 is not established, this means that the spectral purity range is narrower than the target value, and therefore an increase dV in the charging voltage V required to widen the spectral purity range E95 is calculated, and the increased value is calculated as $$V=V+dV$$

(step 703). The value of the increase/decrease dV may be calculated from the correlative relationship L8 between the spectral purity range E95 and the charging voltage, which is identical to the correlative relationship shown in FIG. 16 between the spectral purity range E95 and the fluorine molecule F2 concentration, for example.

The spectral purity range E95 varies according to the values of the fluorine molecule F2 concentration and the total gas pressure, as well as the charging voltage. Therefore, a relational expression $$E95=f(V,NF2,TP)$$

of the spectral purity range E95, the charging voltage V, the fluorine concentration NF2, and the total gas pressure TP is preferably stored in advance, and the total gas pressure TP and fluorine F2 concentration NF2 are preferably detected during measurement of the spectral purity range. The resulting detection values are then inserted into the relational expression (E95=f(V, NF2, TP)) together with the charging voltage V detected in the step 710, and a relational expression $$E95=g(V)$$

of the spectral purity range and charging voltage is calculated. The equation $$dV=g-1(|E95-E950|)$$

is then determined from the relational expression, and thus the rate of change dV in the charging voltage corresponding to the displacement |E95−E950| in the spectral purity range can be calculated. Here, $x=g-1(y)$ is an inverse function of $y=g(x)$. Alternatively, an optimum value for smooth control may be determined in advance by performing an actual control operation, and the charging voltage may be fixed at this value.

Next, a determination is made as to whether or not the value changed by the charging voltage increase/decrease dV, which is determined in the manner described above, is within a range at permitting actual variation of the charging voltage. The reason for this is that the chargeable range is limited by the performance of the power source 11, 12 in the actual oscillation laser device 100.

Hence, a charging voltage control range is set, and a determination is made as to whether or not the value changed by the charging voltage increase/decrease dV has deviated from this charging voltage control range (limit detected) (step 704). If, as a result of the determination, the limit is detected, it is determined that stabilization control of the spectral purity range E95 can no longer be performed by controlling the charging voltage, and therefore the routine switches to another E95 control method or a control impossible signal is transmitted to the main controller 4 to halt laser oscillation (step 705).

When the value changed by the charging voltage increase/decrease dV is within the charging voltage control range (limit not detected), stabilization control is possible, and therefore the routine advances to a following step 706, where a command signal is transmitted to the main controller 4, instructing the main controller 4 to perform stabilization control. Upon reception of the command signal, the main controller 4 outputs a command signal to the synchronization controller 8 via the energy controller 7, and upon reception of the command signal, the synchronization controller 8 operates the charger 11 of the oscillation laser device 100 to modify the charging voltage V by the charging voltage increase/decrease dV (step 706).

Next, the routine enters the same "spectral purity range E95 measurement" subroutine (see FIGS. 6 and 10) as that of the step 101 in FIG. 7, where the actual spectral purity range E95 following variation of the charging voltage is measured (step 707), and a determination is made as to whether or not the measured spectral purity range E95 is within the second allowable range (E950±dE95) (step 708). If, as a result, the measured spectral purity range E95 is contained within the second allowable range (E950±dE95), the routine returns to the main routine of FIG. 7 (step 709).

On the other hand, if it is determined as a result of the determination of the step 708 that the measured spectral purity range E95 is not contained within the second allowable range (E950±dE95), the routine returns to the step 710 and repeats the subroutine until the spectral purity range E95 is contained within the second allowable range. Once the spectral purity range E95 has been contained within the second allowable range, the routine returns to the main routine of FIG. 7 (step 709).

As the processing of the subroutine described above is performed and the charging voltage varies, the output intensity of the seed beam also varies (see L9 in FIG. 16). As described above, however, the laser output power can be stabilized by controlling the discharge parameters (total gas pressure, charging voltage, and so on) of the amplification laser device 300.

Seventh Embodiment

Stabilization Control of Spectral Purity Range E95 by Controlling Pulse Rise Through Variation of Output Coupler Reflectance to Alter Seed Beam Pulse Waveform (Control Means (2)-1)

In this embodiment, as shown in FIGS. 11 and 21, it is assumed that the output coupler 60 is provided in the oscillation laser device 100 for returning light generated in the oscillation chamber 10 back to the oscillation chamber 10 at a predetermined reflectance. In this embodiment, the pulse waveform of the seed beam is varied by varying the reflectance of the output coupler 60, and in so doing, the rise of the laser pulse is controlled and the spectral purity range E95 is subjected to stabilization control.

By varying the reflectance of the output coupler 60 of the laser resonator in the oscillation laser device 100, shown in FIG. 11, the laser pulse waveform can be varied. When the reflectance of the output coupler 60 is increased, the latter half part of the pulses increases in intensity, and when the reflectance is reduced, the former half part of the pulse increases in intensity. Accordingly, the output coupler 60 is designed with a reflectance of 30% as a reference value, for example, and when the spectral purity range E95 is wide, the spectral purity range E95 can be narrowed within the allowable range by increasing the reflectance from the reference value to 40%. Conversely, when the spectral purity range E95 is narrow, the spectral purity range E95 can be widened by reducing the reflectance from the reference value to 20%. The numerical values of the reflectance noted here are merely examples, and the present invention is not limited thereto.

FIGS. 21A and 21B show examples of means for varying the reflectance of the output coupler 60. FIG. 21 is a view of the output coupler 60 seen from the oscillation chamber 10 side.

FIG. 21A shows a structural example in which a beam irradiation surface of the output coupler 60 is formed in the lengthwise direction of the drawing, and the beam irradiation surface is formed with a reflectance distribution whereby the reflectance increases in a leftward direction 61A of the drawing and the reflectance decreases in a rightward direction 61B of the drawing, for example. A sliding mechanism 61 slides the beam irradiation surface of the output coupler 60 to the left and right of the drawing, and thus the reflectance of a laser beam irradiation position 62 is varied.

FIG. 21B shows a structural example in which the beam irradiation surface of the output coupler 60 is formed in a circumferential direction, and the beam irradiation surface is formed with a reflectance distribution whereby the reflectance increases in a leftward circumferential direction of the drawing and the reflectance decreases in a rightward circumferential direction of the drawing, for example. A rotary mechanism 63 rotates the beam irradiation surface of the output coupler 60 in leftward and rightward rotary directions 63A, 63B of the drawing, and thus the reflectance of the laser beam irradiation position 62 is varied.

Note that in FIG. 21, a distribution in which the reflectance changes continuously is formed on the beam irradiation surface of the output coupler 60, but a film that changes the reflectance in stages may be formed such that the reflectance is modified in stepped form.

Eighth Embodiment

Stabilization Control of Spectral Purity Range E95 Through Control to Vary Spectral Purity Range of Seed Beam Output From Oscillation Laser Device 100 and Control to Vary Discharge Timing in Accordance Therewith (Control Means 3)

In this embodiment, the spectral purity range E95 of the laser beam output from the amplification laser device 300 is measured by the spectral purity range measuring means, whereupon both the discharge timing from the start of discharge by the oscillation laser device 100 to the start of discharge by the amplification laser device 300 and the spectral purity range E95 of the seed beam output from the oscillation laser device 100 are controlled such that the measured spectral purity range E95 is held within the allowable range E950±dE95 of the target spectral purity range E950. Thus, the spectral purity range E95 of the laser beam output by the amplification laser device 300 is subjected to stabilization control.

More specifically, when the rise time of the seed beam pulse waveform varies, the discharge timing from the start of discharge by the oscillation laser device 100 to the start of discharge by the amplification laser device 300 is varied in accordance with the variation dt in the rise time of the pulse waveform, and thus the discharge timing is controlled to match a desired synchronization timing.

FIGS. 25A, 25B, and 25C are views illustrating the effects obtained when the rise of the seed beam pulse waveform is varied and the discharge timing is fixed, and FIGS. 26A, 26B, and 26C are views illustrating the effects obtained when the rise of the seed beam pulse waveform is varied and the discharge timing is varied in accordance with the variation in the seed beam pulse waveform.

FIGS. 25A, 25B, and 25C all have a time base on their abscissa, and respectively illustrate the spectral purity range E95 of the laser beam output from the amplification laser device 300, the pulse waveform of the seed beam output from the oscillation laser device 100 (the ordinate showing the seed beam output power (intensity)), and the pulse waveform of the laser beam output from amplification laser device 300 (the ordinate showing the laser beam output power (intensity)). FIGS. 26A, 26B, and 26C are similar. The pulse waveform shown by the broken line is a pre-retardation waveform, and the pulse waveform shown by the solid line is a post-retardation waveform.

As shown in FIGS. 25A through 25C, by varying the rise of the seed beam pulse waveform, the spectral purity range E95 of the seed beam varies (FIG. 25B). However, when the discharge start timing in the amplification laser device 300 is fixed at this time (FIG. 25C), the spectral purity range E95 value of the laser beam exhibits substantially no variation, as shown by P1 in FIG. 25A. Moreover, varying the rise of the seed beam pulse waveform may result in deviation from the synchronization allowable range such that the laser output power decreases (see FIG. 25C). However, in the case of the MOPA system, as shown in FIG. 62, the part in which the seed beam and the gain curve of the amplification laser device 300 overlap is amplified, and therefore the spectral purity range E95 changes even when the discharge timing is fixed, preventing a reduction in the laser output power. Hence, the control shown in FIG. 25, in which the rise of the seed beam pulse waveform is varied while the discharge timing remains fixed, is effective for use with the MOPA system.

On the other hand, when the discharge timing is varied (FIG. 26C) by an identical variation dt to the variation dt (FIG. 26B) in the rise time of the seed beam pulse, as shown in FIG. 26, the synchronization timing does not fall out of alignment, and therefore the spectral purity range E95 of the amplified laser beam shifts from P2 to P3 (FIG. 26A) under the influence of the spectral purity range E95 of the seed beam, and the laser output power does not change (FIG. 26C). Hence, the control shown in FIG. 26, in which the rise of the seed beam pulse waveform is varied and the discharge timing is varied in accordance therewith, is effective for use with both the MOPO and the MOPA systems.

FIG. 27 is a flowchart showing a combined processing procedure for the control illustrated in FIG. 18, i.e. control for varying the laser pulse waveform of the seed beam (varying the rise time of the seed beam pulse) by varying the fluorine molecule F2 concentration, and control for varying the discharge timing in accordance therewith. In FIG. 27, steps 510, 501 to 509 are shared with FIG. 18, and hence description thereof has been omitted.

FIG. 27 differs from FIG. 18 in that a step 511 for executing processing to "vary the discharge timing by the variation dt in the rise time of the seed beam pulse" is inserted between the step 506 and the step 507 of FIG. 18.

In other words, in this embodiment the fluorine molecule F2 concentration is varied by the concentration increase/decrease dNF2 to vary the laser pulse waveform of the seed beam, and after the rise time of the seed beam pulse has been varied by dt (step 506), processing is executed to vary the discharge timing by the variation dt in the rise time of the seed beam pulse (step 511).

According to the eighth embodiment, reductions in the laser beam output power can be suppressed in comparison with the fourth embodiment described with reference to FIG. 18.

Note that in FIG. 27, a case where the control described in FIG. 18, i.e. control for varying the laser pulse waveform of the seed beam (varying the rise time of the seed beam pulse) by varying the fluorine molecule F2 concentration and control for varying the discharge timing in accordance therewith is shown as an example. And similarly, the control described in FIG. 19, i.e. control for varying the laser pulse waveform of the seed beam (varying the rise time of the seed beam pulse) by varying the total gas pressure may be combined with control for varying the discharge timing in accordance therewith. Furthermore, the control described in FIG. 20, i.e. control for varying the laser pulse waveform of the seed beam (varying the rise time of the seed beam pulse) by varying the charging voltage, or the control illustrated in FIG. 21, i.e. control for varying the laser pulse waveform of the seed beam (varying the rise time of the seed beam pulse) by varying the reflectance of the output coupler 60, may be combined similarly with control for varying the discharge timing in accordance therewith.

Ninth Embodiment

Stabilization Control of Spectral Purity Range E95 by Varying Pulse Waveform of Seed Beam in Accordance with Capacitance and Capacitance Ratio of Capacitors in Magnetic Compression Circuit In this embodiment, it is assumed that the oscillation laser device 100 is provided with a magnetic compression circuit, as shown in FIG. 3. More specifically, it is assumed that the oscillation laser device 100 is provided with a charging circuit (magnetic compression circuit) in which the peaking capacitor Cp is disposed electrically parallel to the pair of discharge electrodes 10a, 10b and the second capacitor C2 is disposed to the front of, and electrically parallel to, the peaking capacitor Cp, such that discharge is performed by shifting a charge accumulated in the second capacitor C2 to the peaking capacitor Cp and applying a voltage corresponding to the charging voltage of the peaking capacitor Cp to the pair of electrodes 10a, 10b. In this embodiment, the pulse waveform of the seed beam is varied by varying the capacitance of the peaking capacitor Cp and/or the second capacitor Cp, and/or varying a capacitance ratio C2/Cp of the second capacitor and peaking capacitor Cp. In so doing, the spectral purity range E95 is subjected to stabilization control.

As shown in FIG. 22C, for example, pulse stretching is performed by increasing the capacitance ratio C2/Cp, thereby lengthening the pulse waveform of the seed beam.

First, the principles of the relationship between the capacitor capacitance and the seed beam pulse waveform will be described.

The laser pulse waveform is dependent on the discharge current waveform, and the discharge current waveform is dependent on the voltage waveform between the electrodes 10a, 10b. When laser oscillation is sustained in the first ½ period of the oscillating current and thereafter, the peak value of the current is particularly large. The voltage at which discharge begins between the main electrodes 10a, 10b (known as a breakdown voltage Vb) is dependent on the rise of the voltage applied between the main electrodes 10a, 10b such that when the rise time is high-speed, the discharge start voltage Vb increases (an overcurrent is generated). If an attempt is made to increase the applied voltage dramatically by increasing the capacitance of the second capacitor C2 relative to the capacitance of the peaking capacitor Cp (or conversely, by decreasing Cp), for example, the rise of the voltage is sharpened. It is desirable to sharpen the voltage rise by making the capacitance of the second capacitor C2 as large as possible in relation to the capacitance of the peaking capacitor Cp. However, as the capacitance of the second capacitor C2 increases, the amount of energy required to drive the entire oscillation laser device 100 increases, leading to a reduction in the efficiency of the oscillation laser device 100, and hence there are limitations on the capacitance ratio C2/Cp. Therefore, when controlling the capacitance ratio, it must be varied within a certain range.

Further, by shortening the period of the oscillating current flowing between the main electrodes 10a, 10b from the first ½ period onward, laser oscillation is sustained in the second ½ period onward. The reason for this is that when the period is long, spatial discharge concentration occurs in the latter half of one ½ period such that the required even excitation cannot be performed efficiently. The parameters for determining the period from the second ½ period onward are the capacitance and the floating inductance in a loop (discharge current circuit) formed by the peaking capacitor Cp and the main electrodes 10a, 10b, and the root of the product of these two parameters is commensurate with the period. Hence, the period can be shortened by reducing the capacitance of the peaking capacitor Cp.

FIG. 22 shows variation in A the voltage between the electrodes 10a, 10b, B the discharge current, and C the pulse waveform of the seed beam (the ordinate showing the laser intensity) when the capacitance of the capacitors is varied. FIGS. 22A, 22B, and 22C all have a time base on their abscissa. In FIG. 22, the broken line shows the waveform prior to capacitance variation, and the solid line shows the waveform following capacitance variation.

In accordance with the principle described above, when the capacitance of the peaking capacitor Cp decreases such that the capacitance ratio C2/Cp increases, the rise of the charging voltage sharpens (changes from the broken line to the solid line in FIG. 22A) and the discharge start voltage Vb increases (see FIG. 22A). As a result, the peak value of the discharge current increases, and the discharge current oscillates over a long time period (see FIG. 22B). At the same time, the laser pulse waveform of the seed beam lengthens (see FIG. 22C). When the laser pulse lengthens, the latter half part of the pulse increases in intensity, leading to an increase in the component having a narrow spectral purity range.

Hence, in the charging circuit (magnetic compression circuit) of the oscillation laser device 100, by decreasing the capacitance of the peaking capacitor Cp and/or increasing the capacitance of the second capacitor C2 and/or increasing the capacitance ratio C2/Cp, the spectral purity range E95 of the seed beam narrows. Conversely, by increasing the capacitance of the peaking capacitor Cp and/or decreasing the capacitance of the second capacitor C2 and/or decreasing the capacitance ratio C2/Cp, the spectral purity range E95 of the seed beam widens.

The capacitance of the capacitor may be adjusted in accordance with the temperature of the capacitor. For example, by increasing the temperature 20° C., the capacitor capacitance decreases 10%.

Accordingly, the control temperature of the peaking capacitor Cp is designed to be variable to 40° C. with air cooling, 20° C. with water cooling, and 60° C. without air cooling, for example.

An example of a relationship L10 between the temperature (° C.) of the peaking capacitor Cp and the spectral purity range E95 (a.u.) is shown in FIG. 23.

As shown in FIG. 23, when the spectral purity range E95 is wide, the spectral purity range E95 can be narrowed by switching air cooling off to increase the temperature of the peaking capacitor Cp (from 40° C. to 60° C.) such that the capacitance decreases and the laser pulse range widens. On the other hand, when the spectral purity range E95 is narrow, the spectral purity range E95 can be widened by applying water cooling to decrease the temperature of the peaking capacitor Cp (from 40° C. to 20° C.) such that the capacitance increases and the laser pulse range decreases (see FIG. 23). For example, when the capacitance ratio C2/Cp=5.6/8 and the capacitance of the peaking capacitor Cp can be modified from 5 nF to 6.2 nF, the capacitance ratio C2/Cp can be controlled within a range of 0.63 to 0.78.

FIG. 24 is a flowchart of the ninth embodiment. FIG. 24 corresponds to the "stabilization control by E95 actuator" (step 104) subroutine in the main routine of FIG. 7.

As shown in FIG. 7, when the value of the spectral purity range E95 measured by the second monitor module 39 is wider than the second allowable range E950+dE95 (when the spectral purity range E95 is within the first allowable range E950+dE95(S)) in the main routine (an affirmative determination in the step 103), the subroutine shown in FIG. 20$^{iii}$ is entered.

The processing of the subroutine shown in FIG. 24 is executed by E95, the wavelength controller 6, and the main controller 4 shown in FIG. 1.

When the subroutine shown in FIG. 24 begins, first a current temperature Tcp of the peaking capacitor Cp is detected (step 810).

Next, a calculation is made by E95 and the wavelength controller 6 (FIG. 1) to determine whether the spectral purity range E95 has become wider or narrower than the target value, or in other words whether or not E95>E950 (step 801).

If, as a result of the determination, E95>E950, this means that the spectral purity range is wider than the target value, and therefore the value of an increase dTcp in the peaking capacitor temperature Tcp required to narrow the spectral purity range E95 is calculated, and the increased value is calculated as $$Tcp=Tcp+dTcp$$

(step 802).

When E95>E950 is not established, this means that the spectral purity range is narrower than the target value, and therefore the value of a decrease dTcp in the peaking capacitor temperature Tcp required to widen the spectral purity range E95 is calculated, and the decreased value is calculated as $$Tcp = Tcp - dTcp$$

(step 803). The value of the increase/decrease dTcp may be calculated from the correlative relationship L10 between the peaking capacitor temperature and the spectral purity range E95 shown in FIG. 23, for example.

Next, a determination is made as to whether or not the value varied by the temperature increase/decrease dTcp of the peaking capacitor Cp, determined in this manner, is within a range permitting actual variation of the temperature. When the capacitance of the peaking capacitor Cp is varied by the temperature increase/decrease, the energy efficiency with which the oscillation laser device 100 is driven also varies, and hence the range in which the capacitance can be varied (the range in which the temperature can be varied) is limited.

Hence, a peaking capacitor temperature control range is set, and a determination is made as to whether or not the value changed by the temperature increase/decrease dTcp has deviated from this temperature control range (limit detected) (step 804). If, as a result of the determination, the limit is detected, it is determined that stabilization control of the spectral purity range E95 can no longer be performed by controlling the temperature of the peaking capacitor, and therefore the routine switches to another E95 control method or a control impossible signal is transmitted to the main controller 4 to halt laser oscillation (step 805).

When the value changed by the temperature increase/decrease dTcp is within the temperature control range (limit not detected), stabilization control is possible, and therefore the routine advances to a following step 806, where a command signal is transmitted to the main controller 4, instructing the main controller 4 to perform stabilization control. Upon reception of the command signal, the main controller 4 varies the temperature of the peaking capacitor Cp by the temperature increase/decrease dTcp (step 806).

Next, the routine enters the same "spectral purity range E95 measurement" subroutine (see FIGS. 6 and 10) as that of the step 101 in FIG. 7, where the actual spectral purity range E95 following variation of the temperature Tcp of the peaking capacitor Cp is measured (step 807), and a determination is made as to whether or not the measured spectral purity range E95 is within the second allowable range (E950±dE95) (step 808). If, as a result, the measured spectral purity range E95 is contained within the second allowable range (E950±dE95), the routine returns to the main routine of FIG. 7 (step 809).

On the other hand, if it is determined as a result of the determination of the step 808 that the measured spectral purity range E95 is not contained within the second allowable range (E950±dE95), the routine returns to the step 810 and repeats the subroutine until the spectral purity range E95 is contained within the second allowable range. Once the spectral purity range E95 has been contained within the second allowable range, the routine returns to the main routine of FIG. 7 (step 809).

Note that the flowchart of FIG. 24 shows an example in which the temperature of the peaking capacitor Cp is controlled. However, the temperature of the second capacitor C2 may be controlled similarly, or the temperatures of both capacitors may be controlled such that the capacitance ratio C2/Cp changes. Further, control of the temperature of the peaking capacitor Cp, control of the temperature of the second capacitor C2, and control of the capacitance ratio C2/Cp (the temperatures of both capacitors) may be combined appropriately.

Moreover, instead of controlling the capacitor temperature, the capacitance may be controlled by modifying the number of connections in the case of a doorknob type capacitor. For example, in the case of a doorknob capacitor having 28 200 pF capacitors and a 5.6 nF peaking capacitor CpF, the capacitance can be varied by varying the number of connections within a range of 25 to 31, and as a result, similar effects to those obtained by varying the temperature can be obtained.

Tenth Embodiment

Stabilization Control of Spectral Purity Range E95 by Varying Pulse Waveform of Seed Beam in Accordance with Capacitance of Preionizing Capacitor As shown in FIG. 3, in this embodiment it is assumed that a charging circuit having the preionizing capacitor Cp' disposed electrically parallel to the pair of discharge electrodes 10a, 10b is provided in the oscillation laser device 100, and that preionizing is performed between the pair of electrodes 10a, 10b in accordance with the charging voltage of the preionizing capacitor Cp'. In this embodiment, the pulse waveform of the seed beam is varied by varying the capacitance of the preionizing capacitor Cp', and thus the spectral purity range E95 is subjected to stabilization control.

Similarly to the laser pulse waveform shown in FIG. 22C, when the capacitance value of the preionizing capacitor Cp' is varied, the laser pulse waveform varies. For example, when the capacitance of the preionizing capacitor Cp' is reduced, the current flowing to the preionizing capacitor Cp' side increases proportionately, and as a result, the laser pulse waveform lengthens. Accordingly, the intensity of the pulse latter half increases, and the spectral purity range E95 narrows. Conversely, when the capacitance of the preionizing capacitor Cp' increases, the current flowing to the preionizing capacitor Cp' side decreases proportionately, and as a result, the laser pulse waveform shortens. Accordingly, the intensity of the pulse former half increases, and the spectral purity range E95 widens. Similarly to the peaking capacitor Cp described above, the capacitance of the preionizing capacitor Cp' can be controlled according to temperature. The capacitance can also be controlled by varying the number of connections of the capacitors constituting the preionizing capacitor Cp'.

A specific example is realized through similar processing to that of the flowchart shown in FIG. 24 by replacing the "peaking capacitor Cp" with the "preionizing capacitor Cp'".

In the ninth and tenth embodiments described above, the pulse waveform of the seed beam is subjected to pulse stretching, but the ninth and tenth embodiments may be implemented in combination with the pulse waveform control through control of the fluorine concentration according to the fourth embodiment, and in so doing, the synchronization allowable range can be widened further.

Similarly, the ninth and tenth embodiments, in which the pulse waveform of the seed beam is subjected to pulse stretching, may be combined with the pulse waveform control through control of the total gas pressure according to the fifth embodiment.

Similarly, the ninth and tenth embodiments, in which the pulse waveform of the seed beam is subjected to pulse stretching, may be combined with the pulse waveform control through control of the charging voltage according to the sixth embodiment.

Similarly, the ninth and tenth embodiments, in which the pulse waveform of the seed beam is subjected to pulse stretching, may be combined with the pulse waveform control through control of the output coupler reflectance according to the seventh embodiment.

Moreover, as described in the eighth embodiment, control to vary the spectral purity range of the seed beam by pulse-stretching the seed beam laser pulse (FIG. 22C) may be performed together with control to vary the discharge timing.

Eleventh Embodiment

Stabilization Control of Spectral Purity Range E95 Through Control of Spectrum-Narrowing Performance (Wavefront Control According to Radius of Curvature of Grating, Wavefront Control Using Wavefront Corrector)

In this embodiment, the spectral purity range E95 of the laser beam output from the amplification laser device 300 is measured by the spectral purity range measuring means, and the spectrum-narrowing performance of the oscillation laser device 100 is controlled such that the measured spectral purity range E95 is held within the allowable range E950±dE95 of the target spectral purity range E950. Thus, the spectral purity range E95 of the laser beam output by the amplification laser device 300 is subjected to stabilization control.

In the eleventh embodiment, the oscillation laser device 100 is provided with wavefront varying means for varying the wavefront of the beam generated in the oscillation chamber 10, and by varying the wavefront of the beam that is generated in the oscillation chamber 10 using the wavefront varying means, the spectrum-narrowing performance of the oscillation laser device 100 is varied. Thus, the spectral purity range E95 of the laser beam output by the amplification laser device 300 is subjected to stabilization control.

First, the principles applied to this embodiment will be described.

By correcting the wavefront of the laser beam, the spectral performance is varied. Using this principle, the spectral purity range E95 can be controlled.

More specifically, in the laser resonator, the wavefront of the laser beam possesses divergence (spread) and curvature due to various factors. For example, when a slit is disposed in the laser resonator, the beam is diffracted by the slit and therefore becomes a spherical wave after passing through the slit. Further, the wavefront may become distorted by aberration in the optical element disposed in the laser resonator. For example, in a transmission-type optical element used as a spectrum-narrowing element, such as a prism expander, for example, the wavefront of the laser beam may possess a convex or concave curvature after passing through the optical element due to causes such as:
(a) An interior refractive index distribution that is not perfectly even; or
(b) A distorted prism polished surface.

When the laser beam having such a curved wavefront enters the flat grating, the wavelength selection performance of the grating deteriorates. More specifically, when the laser beam wavefront incident on the grating possesses curvature, the laser beam enters the respective grooves of the grating at different angles, and as a result, the wavelength selection characteristic of the grating decreases, leading to an increase in the spectral purity range of the narrow-spectrum laser beam.

By curving the grating itself to match the wavefront of the laser beam that enters the grating, the reflected wavefront is corrected and an increase in the spectral purity range can be prevented.

FIG. 29 is a sectional view showing a constitutional example of a curvature generating apparatus for creating curvature in a grating, or in other words a grating bending mechanism.

The grating bending mechanism shown in FIG. 29 is provided in the line-narrowing module (LNM) 16.

The side face of a grating 161 is supported by a grating support portion 162. A spring 163 is disposed in a central portion of a surface on the opposite side of a laser beam (seed beam) entrance surface of the grating 161. One end surface of the spring 163 is disposed so as to press against the grating 161. The other end surface of the spring 163 abuts against a pushing member 164. The spring 163 is disposed to be free to expand and contract in a movement direction of the pushing member 164. The pushing member 164 comprises a tapered inclined surface 164a, and the tip end of an adjusting bolt 165 abuts against the inclined surface 164a. The adjusting bolt 165 abuts against the pushing member 164 in a positional relationship whereby the pushing member 164 moves in accordance with the longitudinal motion of the adjusting bolt 165. The adjusting bolt 165 is connected to a rotary shaft of a stepping motor 166, and moves longitudinally in accordance with the rotary driving of the stepping motor 166.

Hence, when the stepping motor 166 drives the rotary shaft to rotate such that the adjusting bolt 165 moves longitudinally relative to the inclined surface 164a of the pushing member 164, the pushing member 164 moves in a direction for causing the spring 163 to contract (the leftward direction in the drawing) or a direction for causing the spring 163 to expand (the rightward direction in the drawing), in accordance with the longitudinal motion direction of the adjusting bolt 165. As a result, the central portion of the grating 161 is pushed or pulled such that the radius of curvature of the light entrance surface of the grating 161 varies. The spring 163 is provided to narrow the control interval.

FIG. 28 shows a relationship L11 between the radius of curvature of the grating 161 and the spectral purity range E95. The curve L11 shown in FIG. 28 includes the minimum value of the spectral purity range at a certain radius of curvature, and therefore during actual control, either a control range (SA) in which the radius of curvature is smaller than the minimum value or a control range (SB) in which the radius of curvature is greater than the minimum value is preferably selected. The region of the curve L11 having a large incline is easier to control, and hence in this embodiment, control can be performed more effectively using the control range (SA) having the larger incline.

FIG. 30 shows a processing sequence of the eleventh embodiment, in which the spectral purity range E95 is subjected to stabilization control by adjusting the radius of curvature of the grating 161. FIG. 30 corresponds to the "stabilization control using the E95 actuator" (step 104) subroutine in the main routine of FIG. 7.

As shown in FIG. 7, when the value of the spectral purity range E95 measured by the second monitor module 39 is wider than the second allowable range E950+dE95 (when the spectral purity range E95 is within the first allowable range E950+dE95(S)) in the main routine (an affirmative determination in the step 103), the subroutine shown in FIG. 30 is entered.

The processing of the subroutine shown in FIG. 30 is executed by E95 and the wavelength controller 6 shown in FIG. 1.

When the subroutine shown in FIG. 30 begins, first a current curvature x of the grating 161 in the line-narrowing module (LNM) 16 is detected (step 910).

Next, a calculation is made by E95 and the wavelength controller 6 (FIG. 1) to determine whether the spectral purity range E95 has become wider or narrower than the target value, or in other words whether or not E95>E950 (step 901).

If, as a result of the determination, E95>E950, this means that the spectral purity range is wider than the target value, and therefore a control amount dx of the curvature of the grating 161 corresponding to a difference E95−E950 in spectral purity range required to narrow the spectral purity range E95 is calculated, and a value varied by the control amount dx is calculated as $$x=x+dx$$

(step 902).

When E95>E950 is not established, this means that the spectral purity range is narrower than the target value, and therefore a control amount dx of the curvature of the grating 161 corresponding to a difference E950-E95 in spectral purity range required to widen the spectral purity range E95 is calculated, and a value varied by the control amount dx is calculated as $$x=x-dx$$

(step 903). The value of the control amount dx may be calculated from the correlative relationship L11 between the radius of curvature of the grating 161 and the spectral purity range E95 shown in FIG. 28, for example.

Next, a determination is made as to whether or not the value varied by the control amount dx of the curvature of the grating 161, determined in this manner, is within a range permitting actual control.

When it is determined that the value varied by the control amount dx has deviated from the control range (limit detected) (step 904), and that the limit has been detected as a result of this determination, it is determined that stabilization control of the spectral purity range E95 can no longer be performed by adjusting the radius of curvature (curvature) of the grating 161, and therefore the routine switches to another E95 control method or a control impossible signal is transmitted to the main controller 4 to halt laser oscillation (step 905).

When the value varied by the control amount dx is within the control range (limit not detected), stabilization control is possible, and therefore the routine advances to a following step 906, where a drive command signal is transmitted to the driver 21. As a result, the stepping motor 166 of the grating bending mechanism shown in FIG. 29, for example, is driven to vary the curvature of the grating 161 by the control amount dx (step 906).

Next, the routine enters the same "spectral purity range E95 measurement" subroutine (see FIGS. 6 and 10) as that of the step 101 in FIG. 7, where the actual spectral purity range E95 following variation of the curvature x of the grating 161 is measured (step 907), and a determination is made as to whether or not the measured spectral purity range E95 is within the second allowable range (E950±dE95) (step 908). If, as a result, the measured spectral purity range E95 is contained within the second allowable range (E950±dE95), the routine returns to the main routine of FIG. 7 (step 909).

On the other hand, if it is determined as a result of the determination of the step 908 that the measured spectral purity range E95 is not contained within the second allowable range (E950+dE95), the routine returns to the step 910 and repeats the subroutine until the spectral purity range E95 is contained within the second allowable range. Once the spectral purity range E95 has been contained within the second allowable range, the routine returns to the main routine of FIG. 7 (step 909).

Note that the flowchart of FIG. 30 shows an example in which the wavefront of the beam is varied (corrected) by varying the radius of curvature of the grating 161. However, wavefront correction may be performed similarly by varying the radius of curvature of another element in the LNM 16, for example a tuning mirror or the like.

Furthermore, as described in Reference Literature 6 (Japanese Patent Application No. 9-119631), wavefront correcting means for correcting the wavefront of a laser beam and then outputting the laser beam may be provided in the LNM 16, and the spectral purity range E95 may be subjected to stabilization control by varying the wavefront correction characteristic of the wavefront correcting means.

FIG. 54 shows a constitutional example of the line-narrowing module 16 provided in a wavefront corrector 169.

As shown in FIG. 54, the line-narrowing module (LNM) 16 is constituted by constitutional elements including a beam expander 168, the grating 161, a rotary actuator 167 for varying the attitude of the grating 161, and the wavefront corrector 169.

The wavefront corrector 169 has a function for correcting the wavefront of an incident laser beam and outputting the laser beam. The wavefront of a laser beam incident on the line-narrowing module 16 is first corrected by the wavefront corrector 169, and then enters the beam expander 168. The beam expander 168 expands the beam width of the laser beam. The laser beam then enters the grating 161 and is diffracted thereby such that only a predetermined wavelength component of the laser beam is looped back in the same direction as the incoming beam. After being looped back by the grating 161, the laser beam is subjected to beam width contraction by the beam expander (a prism, for example) 168, and then enters the wavefront corrector 169. In the wavefront corrector 169, the wavefront of the laser beam is corrected to the same plane wave as that of the laser beam upon initial entrance into the line-narrowing module 16. The wavefront-corrected laser beam is then output by the line-narrowing module 16 and enters the oscillation chamber 10.

By varying the wavefront correction characteristic of the wavefront corrector 169 in the line-narrowing module 16 constituted as described above, the spectral purity range E95 is subjected to stabilization control.

FIG. 55 shows a constitutional example of the wavefront corrector 169.

FIG. 55A is a constitutional example of a wavefront corrector 169 that varies the wavefront by controlling the temperature distribution of a transmission-type optical element substrate.

Typically, the refractive index of an optical material such as CaF2 varies according to temperature. Hence, by applying a temperature distribution to an optical element purposely, a refractive index distribution can be generated.

As shown in FIG. 55A, a heater/cooler 1691 capable of both heating and cooling, such as a thermoelectric element, is disposed on each of the four side faces of a substrate 1692. The temperature of the substrate 1692 in the vicinity of the heater/coolers 1691 is detected by a temperature sensor 1691a, and each heater/cooler 1691 is subjected to temperature control on the basis of the value detected by the temperature sensor 1691a to produce a predetermined temperature distribution on the substrate 1692. Thus, a desired refractive index distribution is applied to the substrate 1692, enabling variation of the laser beam wavefront.

FIG. 55B shows an example of a wavefront corrector 169 constituted by a convex lens 1695, a concave lens 1696, a moving stage 1693 for moving the convex lens 1695 in an optical axis direction, and a pulse motor 1694 for driving the moving stage 1693.

As shown in FIG. 55B, the incident convex wavefront or concave wavefront is converted into a plane wave in accordance with the relative positions of the convex lens 1695 and concave lens 1696 in the optical axis direction. When the distance between the convex lens 1695 and concave lens 1696 is large, a convex wavefront can be converted into a plane wave, and when the distance between the convex lens 1695 and concave lens 1696 is small, a concave wavefront can be converted into a plane wave. By driving the pulse motor 1694 to move the moving stage 1693 such that the distance between the convex lens 1695 and concave lens 1696 changes, the wavefront of the laser beam can be varied.

Twelfth Embodiment

Stabilization Control of Spectral Purity Range E95 Through Control of Spectrum-Narrowing Performance (Wavefront Control Using Deformable Mirror)

In the eleventh embodiment described above, the case where the wavefront is controlled in accordance with the radius of curvature of the grating or using a wavefront controller has been described. Next, an embodiment in which a deformable mirror is used to control the wavefront of light generated in the oscillation chamber 10 in an identical manner will be described.

FIG. 31 shows the constitution of a laser wavefront control system employing a deformable mirror.

As shown in FIG. 31, a deformable mirror 70 serving as an end mirror is disposed on the front side of the oscillation chamber 10. In this embodiment, the laser wavefront is varied (corrected) by altering the shape of the entire reflection surface of the deformable mirror 70.

A laser resonator is formed between the grating 161, which is Littrow-mounted on the rear side of the oscillation chamber 10, and the front side deformable mirror 70. A 45-degree beam splitter 71 is disposed on an optical path between the oscillation chamber 10 and the front side deformable mirror 70. The beam splitter 71 functions as an output-coupling mirror.

More specifically, a part of the light output from the oscillation chamber 10 is reflected by the output-coupling mirror 71 and extracted as the output beam (seed beam) of the oscillation laser device 100. The output beam is then input into the amplification laser device 100$^{iv}$ as an injected beam.

Meanwhile, the reflected wavefront of the light that passes through the output-coupling mirror 71 is varied by the deformable mirror 70, whereupon the light re-enters the output-coupling mirror 71. Having passed through the output-coupling mirror 71, the light passes through the oscillation chamber 10 and is amplified therein. The light that is reflected by the output-coupling mirror 71 enters a wavefront detector 72. The amplified light that passes through the oscillation chamber 10 is subjected to spectrum narrowing by the beam expander 168, which is constituted by a prism, and the grating 161, whereupon the resulting diffracted light passes through the oscillation chamber 10 to be amplified again. After passing through the oscillation chamber 10 again, the amplified light enters the output-coupling mirror 71 and is laser-oscillated.

Ideally, the wavefront of the laser beam generated in the oscillation chamber 10 has a cylindrical shape. The wavefront detector 72 detects a radius of curvature R of the wavefront of the laser beam generated in the oscillation chamber 10. The wavefront detector 72 may either monitor the oscillated laser beam or detect the wavefront of the beam using a separate guide laser such as another types of visible light. Other well-known methods of detecting the wavefront of a laser beam include a sharing interferometer and the Hartmann-Shack method. The wavefront detector 72 may be constructed on the basis of these detection principles.

Each of a plurality of parts of the reflection surface of the deformable mirror 70 is pushed and pulled mechanically by an actuator 73. FIG. 32 shows an A-A cross-section of FIG. 31 comprising a line-type deformable mirror 70 and actuators 73 provided at three points on the reflection surface of the deformable mirror 70. A piezo element, for example, is used as the actuator 73. By causing each actuator 73 (piezo element) to expand and contract, each portion of the reflection surface of the deformable mirror 70 is pushed and pulled, thereby adjusting the radius of curvature of the deformable mirror 70. Note that FIG. 32 shows in example in which three actuators 73 are provided, but the present invention is not limited thereto, and the number of actuators 73 is arbitrary. By increasing the number of actuators 73, wavefront correction can be performed with a greater degree of precision. Furthermore, the actuator 73 for pushing and pulling the reflection surface of the deformable mirror 70 is not limited to a piezo element, and any actuator may be used. For example, an actuator that pushes and pulls the reflection surface of the deformable mirror 70 using thermal expansion through temperature variation may be used instead of a piezo element.

A controller 74 controls a radius of curvature r of the deformable mirror 70 via the actuator 73 on the basis of the radius of curvature R of the beam wavefront, detected by the wavefront detector 72, and the detection value of the spectral purity range E95.

FIG. 33 shows a relationship L12 between the radius of curvature of the laser beam wavefront, detected by the wavefront detector 72, and the spectral purity range E95. Similarly to FIG. 28, the curve L12 shown in FIG. 33 includes the minimum value of the spectral purity range at a certain radius of curvature, and therefore during actual control, either a control range (SA) in which the radius of curvature is smaller than the minimum value or a control range (SB) in which the radius of curvature is greater than the minimum value is preferably selected. The region of the curve L12 having a large incline is easier to control, and hence in this embodiment, control can be performed more effectively using the control range (SA) having the larger incline.

FIG. 34 shows a processing sequence of the twelfth embodiment, in which the spectral purity range E95 is subjected to stabilization control by adjusting the radius of curvature of the laser beam wavefront. FIG. 34 corresponds to the "stabilization control using the E95 actuator" (step 104) subroutine in the main routine of FIG. 7.

As shown in FIG. 7, when the value of the spectral purity range E95 measured by the second monitor module 39 is wider than the second allowable range E950+dE95 (when the spectral purity range E95 is within the first allowable range E950+dE95(S)) in the main routine (an affirmative determination in the step 103), the subroutine shown in FIG. 34 is entered.

The processing of the subroutine shown in FIG. 34 is executed by E95 and the wavelength controller 6 shown in FIG. 1, and the controller 74 shown in FIG. 31.

When the subroutine shown in FIG. 34 begins, first the current radius of curvature R of the wavefront of the laser beam generated in the oscillation chamber 10 is detected by the wavefront detector 72 (step 1010).

Next, a calculation is made by E95 and the wavelength controller 6 (FIG. 1) to determine whether the spectral purity range E95 has become wider or narrower than the target value, or in other words whether or not E95>E950 (step 1001).

If, as a result of the determination, E95>E950, this means that the spectral purity range is wider than the target value, and therefore a control amount dR of the radius of curvature of the laser beam wavefront corresponding to a difference E95−E950 in spectral purity range required to narrow the spectral purity range E95 is calculated, and a value varied by the control amount dR is calculated as $$R=R+dR$$

(step 1002).

When E95>E950 is not established, this means that the spectral purity range is narrower than the target value, and therefore a control amount dR of the radius of curvature of the laser beam wavefront corresponding to a difference E950−E95 in spectral purity range required to widen the spectral purity range E95 is calculated, and a value varied by the control amount dR is calculated as $$R=R-dR$$

(step 1003). The value of the control amount dR may be calculated from the correlative relationship L12 between the radius of curvature of the laser beam wavefront and the spectral purity range E95 shown in FIG. 33, for example.

Next, a variation dr in the radius of curvature of the deformable mirror 70 required to vary the radius of curvature of the laser beam wavefront by the control amount dR is calculated. A determination is then made as to whether or not the radius of curvature value of the deformable mirror 70 varied by the control amount dr determined in this manner is within a range permitting actual control.

A determination is then made as to whether or not the value varied by the control amount dr has deviated from the control range (limit detected) (step 1004), and if, as a result of this determination, the limit has been detected, it is determined that stabilization control of the spectral purity range E95 can no longer be performed by adjusting the radius of curvature of the deformable mirror 70 (the radius of curvature of the laser beam wavefront). Therefore, the routine switches to another E95 control method or a control impossible signal is transmitted to the main controller 4 to halt laser oscillation (step 1005).

When the value varied by the control amount dr is within the control range (limit not detected), stabilization control is possible, and therefore the routine advances to a following step 1006, where a drive command signal is transmitted to the controller 74 of the deformable mirror 70. As a result, the radius of curvature r of the deformable mirror 70 is varied by the control amount dr via the actuators 73, and thus the radius of curvature R of the wavefront of the laser beam generated in the oscillation chamber 10 is varied by the control amount dR (step 1006).

Next, the routine enters the same "spectral purity range E95 measurement" subroutine (see FIGS. 6 and 10) as that of the step 101 in FIG. 7, where the actual spectral purity range E95 following variation of the radius of curvature r of the deformable mirror 70 (the radius of curvature R of the laser beam wavefront) is measured (step 1007), and a determination is made as to whether or not the measured spectral purity range E95 is within the second allowable range (E950±dE95) (step 1008). If, as a result, the measured spectral purity range E95 is contained within the second allowable range (E950±dE95), the routine returns to the main routine of FIG. 7 (step 1009).

On the other hand, if it is determined as a result of the determination of the step 1008 that the measured spectral purity range E95 is not contained within the second allowable range (E950±dE95), the routine returns to the step 1010 and repeats the subroutine until the spectral purity range E95 is contained within the second allowable range. Once the spectral purity range E95 has been contained within the second allowable range, the routine returns to the main routine of FIG. 7 (step 1009).

In this embodiment, an ideal case in which the laser beam wavefront takes a cylindrical shape is envisaged. In actuality, however, the wavefront of the laser beam may be distorted by the temperature distribution on the optical element in the laser resonator or the effects of acoustic waves generated during discharge, and as a result, it may become difficult to perform wavefront control with a high degree of precision using a line-type deformable mirror 70. In this case, stabilization control of the spectral purity range E95 can be performed with a greater degree of precision by controlling the laser beam wavefront more precisely using a two-dimensional deformable mirror instead of a line-type deformable mirror.

Furthermore, in the eleventh embodiment described above, the curvature (radius of curvature) of the grating 161 is detected, and the curvature (radius of curvature) of the grating 161 is varied on the basis of the detection result. However, similarly to the twelfth embodiment, the laser beam wavefront may be detected using a wavefront detector in the eleventh embodiment, instead of detecting the curvature (radius of curvature) of the grating 161, and the curvature (radius of curvature) of the grating 161 may be varied on the basis of the detection result.

Thirteenth Embodiment

Stabilization Control of Spectral Purity Range E95 Through Control of Spectrum-Narrowing Performance (Expanding Ratio (Magnification) Modification)

In the eleventh and twelfth embodiments described above, the spectrum-narrowing performance of the oscillation laser device 100 is controlled by varying the wavefront of the light that is generated in the oscillation chamber 10. Next, an embodiment in which the expanding ratio of the light generated in the oscillation chamber 10 is varied to control the spectrum-narrowing performance of the oscillation laser device 100 in an identical manner will be described.

First, the principles applied to this embodiment will be described.

FIG. 35A shows positional relationships between the constitutional elements of the line-narrowing module (LNM) 16 in the oscillation laser device 100 and the optical axis.

The line-narrowing module (LNM) 16 of the oscillation laser device 100 is provided with a prism 168a (to be abbreviated hereafter to "prism a" where appropriate), a prism 168b (to be abbreviated hereafter to "prism b" where appropriate), and the grating 161, in sequence from a location near the rear side window 10e. The prisms 168a, 168b constitute a beam expander 168.

As shown by the arrow in FIG. 35A, when the attitude of the prisms 168a, 168b is varied, the beam expanding ratio of the beam expander 168 in the oscillation laser device (MO)

100 is modified, and as a result, the spectral range of the light generated in the oscillation chamber 10 is varied.

FIG. 39A shows a relationship L13 between an expanding ratio M and the spectral range Δλ.

As is evident from the relationship L13 shown in FIG. 39A, as the beam expanding ratio M of the beam expander 168 increases, the spectral range Δλ narrows. Conversely, as the beam expanding ratio M of the beam expander 168 decreases, the spectral range Δλ widens.

Hence, when the spectral purity range, or a spectral index value used in lieu thereof, is measured (detected) and the current spectral range Δλ obtained as the resulting measurement value (detection value) is wider than a target spectral range Δλ0, the spectral range can be stabilized within a target spectral range-related allowable range by increasing the beam expanding ratio M of the beam expander 168, and when the current spectral range Δλ is narrower than the target spectral range Δλ0, the spectral range can be stabilized within the target spectral range-related allowable range by decreasing the beam expanding ratio M. Thus, the spectral performance is stabilized.

Meanwhile, when the prism group 168a, 168b is used as the beam expander 168, the center wavelength must be held at a fixed level. Depending on the manner in which the attitudes of the plurality of prisms 168a, 168b are adjusted, it is possible to vary only the expanding ratio while maintaining a constant center wavelength. According to this embodiment, the prism a is used for expanding ratio adjustment, whereas the prism b is used mainly for wavelength adjustment, and therefore control of both the center wavelength and the expanding ratio is performed by adjusting the respective attitudes thereof (FIG. 35A). Conventionally, as shown by the reference example in FIG. 35B, only the attitude of the prism b is adjusted, and therefore control of only the center wavelength is performed. The structural differences between the two examples are evident from the drawings.

FIG. 39B shows a relationship L14 between the expanding ratio M and the output power (intensity) of the seed beam that is output by the oscillation laser device 100.

As is evident from FIG. 39B, when the expanding ratio M is varied by adjusting the attitudes of the plurality of prisms 168a, 168b, the output power of the seed beam may also vary to a greater or lesser extent. However, variation in the output power of the seed beam can be compensated for sufficiently by adjusting the voltage that is applied between the electrodes 10a, 10b in the oscillation chamber 10 or the gas pressure in the chamber 10.

FIG. 36 shows a processing sequence of the thirteenth embodiment, in which the spectral purity range E95 is subjected to stabilization control by adjusting the expanding ratio (magnification) M. FIG. 36 corresponds to the "stabilization control using the E95 actuator" (step 104) subroutine in the main routine of FIG. 7. In the following processing, the prism a is used for expanding ratio adjustment and the prism b is used mainly for wavelength adjustment.

As shown in FIG. 7, when the value of the spectral purity range E95 measured by the second monitor module 39 is wider than the second allowable range E950+dE95 (when the spectral purity range E95 is within the first allowable range E950+dE95(S)) in the main routine (an affirmative determination in the step 103), the subroutine shown in FIG. 36 is entered.

The processing of the subroutine shown in FIG. 36 is executed by E95 and the wavelength controller 6 shown in FIG. 1.

When the subroutine shown in FIG. 36 begins, first a calculation is made by E95 and the wavelength controller 6 (FIG. 1) to determine whether the spectral purity range E95 has become wider or narrower than the target value, or in other words whether or not E95>E950 (step 1101).

If, as a result of the determination, E95>E950, this means that the spectral purity range is wider than the target value, and therefore an expanding ratio variation +ΔM per step corresponding to a difference E95−E950 in spectral purity range required to narrow the spectral purity range E95 is calculated, and the attitudes of the prisms a, b are adjusted in accordance therewith (step 1102). The processing of the step 1102 is executed as a subroutine shown in FIG. 37.

First, the expanding ratio variation +ΔM per step corresponding to the difference E95−E950 in spectral purity range required to narrow the spectral purity range E95 is calculated, and a value varied by the expanding ratio variation +ΔM is calculated as $$M=M+\Delta M$$

The attitude of the prism a is then adjusted by rotating the prism a to obtain the calculated expanding ratio M. The value of the expanding ratio variation +ΔM may be calculated from the correlative relationship L13 between the expanding ratio M and the spectral purity range E95 (Δλ) shown in FIG. 39A, for example (step 1201).

However, by varying only the attitude of the prism a in 1201, the oscillation wavelength varies, and therefore the center wavelength is controlled simultaneously by adjusting the attitude of the prism b. In other words, the attitude of the prism b is adjusted by rotating the prism b such that the center wavelength is returned to the original target center wavelength (step 1202).

Next, a part of the seed beam output from the oscillation laser device 100 is extracted, whereupon a center wavelength λ and the spectral purity range E95 of the seed beam are measured by the first monitor module 19.

Next, the detected center wavelength λ is compared to a target center wavelength λ0 required by the aligner 3, and a determination is made as to whether or not the detected center wavelength λ exceeds an allowable range Δ relating to the target center wavelength λ0, or in other words whether or not $$|\lambda-\lambda_0|>\Delta$$

(step 1204).

If, as a result, the detected center wavelength λ exceeds the allowable range Δ of the target center wavelength λ0, the wavelength is varied by adjusting the attitude of the prism b alone such that the center wavelength aligns with λ0 (step 1205), whereupon the routine returns to the step 1104 of FIG. 36 (step 1206). If, on the other hand, the detected center wavelength λ does not exceed a value obtained by adding the allowable range Δ to the target center wavelength λ0, the routine returns to the step 1104 of FIG. 36 without further processing (step 1206).

When E95>E950 is not established as a result of the determination made in the step 1101 of FIG. 36, this means that the spectral purity range is narrower than the target value, and therefore an expanding ratio decrease −ΔM per step corresponding to a difference E95−E950 in spectral purity range required to widen the spectral purity range E95 is calculated, and the attitudes of the prisms a, b are adjusted in accordance therewith (step 1103). The processing of the step 1103 is executed as a subroutine shown in FIG. 38.

First, the expanding ratio decrease −ΔM per step corresponding to the difference E95−E950 in spectral purity range required to widen the spectral purity range E95 is calculated, and a value varied by the expanding ratio variation −ΔM is calculated as $M=M-\Delta M$ The attitude of the prism a is then adjusted by rotating the prism a to obtain the calculated expanding ratio M (step 1301). The processing of steps 1302 to 1306 is similar to the processing of the steps 1202 to 1206 described with reference to FIG. 37, and hence description thereof has been omitted.

Next, in a step 1104 of FIG. 36, a determination is made as to whether or not the attitude angles of the prisms a, b obtained by rotating the prisms a, b have deviated from an allowable angle range (upper limit value to lower limit value) (in the case of the lower limit value, for example, a determination is made as to whether or not the attitude angles have fallen below the lower limit value). For example, a limit switch is provided for detecting the critical angles (upper limit value and lower limit value) of the attitude angles of the prism a and prism b, and a determination is made as to whether or not the limit (critical angle) has been detected by the limit switch (step 1104).

If the critical angle of the attitude angles of the prisms a, b has been detected (limit detected), it is determined that stabilization control of the spectral purity range E95 can no longer be performed by adjusting the prisms a, b (the expanding ratio M), and therefore the routine switches to another E95 control method or a control impossible signal is transmitted to the main controller 4 to halt laser oscillation (step 1105).

If the critical angle of the attitude angles of the prisms a, b is not detected (limit not detected), stabilization control is possible, and therefore the routine advances to a following step 1107 without further processing.

In the step 1107, the routine enters the same "spectral purity range E95 measurement" subroutine (see FIGS. 6 and 10) as that of the step 101 in FIG. 7, where the actual spectral purity range E95 following variation of the attitude of the prisms a, b is measured (step 1107), and a determination is made as to whether or not the measured spectral purity range E95 is within the second allowable range (E950±dE95) (step 1108). If, as a result, the measured spectral purity range E95 is contained within the second allowable range (E950±dE95), the routine returns to the main routine of FIG. 7 (step 1109).

On the other hand, if it is determined as a result of the determination of the step 1108 that the measured spectral purity range E95 is not contained within the second allowable range (E950±dE95), the routine returns to the step 1101 and repeats the subroutine until the spectral purity range E95 is contained within the second allowable range. Once the spectral purity range E95 has been contained within the second allowable range, the routine returns to the main routine of FIG. 7 (step 1109).

In the control described above, the center wavelength and expanding ratio are controlled by adjusting the attitude of the pair of prisms a, b, but similar control may be performed using other combinations of optical components. For example, the center wavelength and expanding ratio may be similarly controlled by adjusting the attitude of a prism and a grating, by adjusting the attitude of a prism and a rotating mirror, or by adjusting the attitude of a rotating mirror and a grating. Similar control may also be performed by providing an afocal optical system such that the magnification thereof can be varied.

Note that when the attitude of a prism is adjusted, the output power of the seed beam may decrease dramatically if the attitude angle thereof becomes too large, as shown in FIG. 39B. Some of the possible reasons for this are that when the angle of incidence on the prism deviates from an optimum region of the membrane, reflection loss increases and that the optical path varies, leading to an increase in shading. Moreover, modifying the magnification may lead to variation in the beam quality. Hence, if necessary, reductions in the optical quality and output power of the seed beam may be compensated for using a shaping optical module.

In contrast to a one-stage laser device, the two-stage laser device 2 in particular is capable of compensating for reductions in the beam quality occurring in the oscillation laser device 100 by adjusting the beam quality in the amplification laser device 300.

Fourteenth Embodiment

Stabilization Control of Spectral Purity Range E95 Through Control of Spectrum-Narrowing Performance (Beam Width Variation)

Next, an embodiment in which the beam width of the light generated in the oscillation chamber 10 is varied to control the spectrum-narrowing performance of the oscillation laser device 100 in an identical manner will be described.

First, the principles applied to this embodiment will be described.

FIG. 40 shows a positional relationship between the optical axis of the oscillation laser device 100 and a slit. FIG. 40 is a horizontal direction view of the oscillation chamber 10 shown in FIG. 2 (vertical direction) seen from its upper surface. The line-narrowing module (LNM) 16 of the oscillation laser device 100 is provided with the prism 168a, the prism 168b, and the grating 161, in sequence from a location near the rear side window 10e.

A (rear side) slit 80 is disposed between the rear side window 10e and the prisms 168. A (front side) slit 81 is disposed between the front side window 10f and the front mirror 17. In other words, the slits 80, 81 are disposed in the laser resonator. As shown by the arrow, the slits 80, 81 are constituted such that a slit width W is varied in the horizontal direction (the up-down direction in the drawing) of the oscillation chamber 10. A controller 82 drive-controls the slit width W of the slits 80, 81 via a driver not shown in the drawing.

When the slit width W (the slit width in the horizontal direction) of the slits 80, 81 in the laser resonator varies, the divergence of the light in the horizontal direction varies, and as a result, the spectral range varies.

FIG. 41 shows a relationship L15 between the slit width W of the slits 80, 81 and the spectral range $\Delta\lambda$.

As is evident from the relationship L15 shown in FIG. 41, as the slit width W increases within a range of W0 to W1, the spectral range $\Delta\lambda$ widens. Conversely, as the slit width W decreases, the spectral range $\Delta\lambda$ narrows.

Hence, when the spectral purity range, or a spectral index value used in lieu thereof, is measured (detected) and the current spectral range $\Delta\lambda$ obtained as the resulting measurement value (detection value) is wider than the target spectral range $\Delta\lambda$0, the spectral range can be stabilized within a target spectral range-related allowable range by decreasing the slit width W, and when the current spectral range $\Delta\lambda$ is narrower than the target spectral range $\Delta\lambda$0, the spectral range can be stabilized within the target spectral range-related allowable range by increasing the slit width W. Thus, the spectral performance is stabilized.

The slits having varying slit widths W may be disposed on both the rear side and the front side of the oscillation chamber 10 as the slits 80, 81. Alternatively, a slit may be disposed on the rear side alone as the slit 80, or a slit may be disposed on the front side alone as the slit 81.

When the slit width W varies, the output power of the seed beam may also vary.

However, in the two-stage laser device 2, slight variation in the output power of the oscillation laser device 100 does not pose a problem as long as the output power of the amplification laser device 300 is stable. Moreover, variation in the output power of the seed beam can be compensated for sufficiently while maintaining the spectral performance by adjusting the voltage that is applied between the electrodes 10a, 10b in the oscillation chamber 10 or adjusting the gas pressure in the chamber 10. The beam profile and beam divergence of the light also vary when the slit width W is varied, but this variation may be compensated for by disposing a shaping optical module in the propagation system. In so doing, the beam profile and beam divergence can be held at substantially constant levels.

The slit width W of the slits 80, 81 may be varied from only one side of the optical axis, or the slit width W may be varied from both sides of the optical axis. Note, however, that controllability is enhanced by varying the slit width W from both sides of the optical axis.

Further, in FIG. 40, the slit width W of the slits 80, 81 varies in the horizontal direction, but the spectral range may be controlled similarly using slits in which the slit width W varies in the vertical direction, i.e. the up-down direction in FIG. 2. Note, however, that variation in the spectral performance relative to variation in the slit width W is smaller when the slit width W is varied in the horizontal direction than when the slit width W is varied in the vertical direction, and hence the slits 80, 81 (FIG. 40) varying in the vertical direction$^v$ are preferable in terms of controllability.

As is evident from the characteristic L15 shown in FIG. 41, when the slit width W becomes narrower than a certain threshold W0, the spectral performance deteriorates. A possible reason for this is that the beam width that can enter the grating 161 decreases, leading to a reduction in the theoretical resolution of the grating 161. Furthermore, when the slit width W becomes narrower than the threshold W0, the output power of the seed beam decreases greatly. Hence, there is little merit in controlling the slit width in a region below the threshold W0.

Further, in a region where the slit width W is greater than a certain threshold W1 (>W0), the spectral performance exhibits substantially no change in relation to variation in the slit width. A possible reason for this is that in this region, the slit width is greater than the beam width. Hence, there is little merit in controlling the slit width in a region above the threshold W1.

Therefore, the spectral range is preferably controlled by varying the slit width W in a region between the thresholds W0 and W1. Furthermore, within this region W0 to W1, the spectral range Δλ varies monotonously (increases) in relation to variation (increase) in the slit width W, which is preferable in terms of the control characteristic.

FIG. 42 shows a processing sequence of the fourteenth embodiment, in which the spectral purity range E95 is subjected to stabilization control by adjusting the slit width W. FIG. 42 corresponds to the "stabilization control using the E95 actuator" (step 104) subroutine in the main routine of FIG. 7.

As shown in FIG. 7, when the value of the spectral purity range E95 measured by the second monitor module 39 is wider than the second allowable range E950+dE95 (when the spectral purity range E95 is within the first allowable range E950+dE95(S)) in the main routine (an affirmative determination in the step 103), the subroutine shown in FIG. 42 is entered.

The processing of the subroutine shown in FIG. 42 is executed by E95 and the wavelength controller 6 shown in FIG. 1, and the controller 82 shown in FIG. 40.

When the subroutine shown in FIG. 42 begins, first a calculation is made by E95 and the wavelength controller 6 (FIG. 1) to determine whether the spectral purity range E95 has become wider or narrower than the target value, or in other words whether or not E95>E950 (step 1401).

If, as a result of the determination, E95>E950, this means that the spectral purity range is wider than the target value, and therefore a slit width decrease −ΔW per step corresponding to a difference E95−E950 in spectral purity range required to narrow the spectral purity range E95 is calculated, and the slit width W of the slits 80, 81 is adjusted in accordance therewith. The value of the slit width decrease −ΔW may be calculated from the correlative relationship L15 between the slit width W and the spectral purity range E95 (Δλ) shown in FIG. 41, for example (step 1402).

On the other hand, when E95>E950 is not established as a result of the determination made in the step 1401, this means that the spectral purity range is narrower than the target value, and therefore a slit width increase +ΔW per step corresponding to a difference E95−E950 in spectral purity range required to widen the spectral purity range E95 is calculated, and the slit width W of the slits 80, 81 is adjusted in accordance therewith (step 1403).

Next, a determination is made as to whether or not the slit width W obtained as a result of varying the slit width W of the slits 80, 81 by the slit width decrease −ΔW or the slit width increase +ΔW has deviated from the allowable slit width W0 to W1 (upper limit value W1, lower limit value W0) (in the case of the lower limit value W0, for example, a determination is made as to whether or not the slit width W has fallen below the lower limit value W0). For example, a limit switch is provided for detecting the critical angles W0, W1 of the slit width of the slits 80, 81, and a determination is made as to whether or not the limit (critical angle) has been detected by the limit switch (step 1404).

If the slit width W of the slits 80, 81 has exceeded the critical angle W1 or fallen below the critical angle W0 (limit detected), it is determined that stabilization control of the spectral purity range E95 can no longer be performed by adjusting the slit width W, and therefore the routine switches to another E95 control method or a control impossible signal is transmitted to the main controller 4 to halt laser oscillation (step 1405).

If the slit width W of the slits 80, 81 has neither exceeded the critical angle W1 nor fallen below the critical angle W0 (limit not detected), stabilization control is possible, and therefore the routine advances to a following step 1407 without further processing.

In the step 1407, the routine enters the same "spectral purity range E95 measurement" subroutine (see FIGS. 6 and 10) as that of the step 101 in FIG. 7, where the actual spectral purity range E95 following variation of the slit width W is measured (step 1407), and a determination is made as to whether or not the measured spectral purity range E95 is within the second allowable range (E950±dE95) (step 1408). If, as a result, the measured spectral purity range E95 is contained within the second allowable range (E950±dE95), the seed beam light quality and the seed beam output power are compensated for by the shaping optical module (step 1411), whereupon the routine returns to the main routine of FIG. 7 (step 1409).

On the other hand, if it is determined as a result of the determination of the step 1408 that the measured spectral purity range E95 is not contained within the second allowable range (E950±dE95), the routine returns to the step 1401 and repeats the subroutine until the spectral purity range E95 is contained within the second allowable range. When the spectral purity range E95 has been contained within the second allowable range, the seed beam light quality and the seed beam output power are compensated for by the shaping optical module (step 1411), whereupon the routine returns to the main routine of FIG. 7 (step 1409).

Note that the compensation processing of the step 1411 need only be executed when necessary, and may be omitted.

In contrast to a one-stage laser device, the two-stage laser device 2 in particular is capable of compensating for reductions in the beam quality occurring in the oscillation laser device 100 by adjusting the beam quality in the amplification laser device 300.

Fifteenth Embodiment

Stabilization Control of Spectral Purity Range E95 Through Control of Propagation Speed of Acoustic Wave Generated Upon Discharge in Oscillation Chamber In this embodiment, the spectral purity range E95 of the laser beam output from the amplification laser device 300 is measured by the spectral purity range measuring means, whereupon the propagation speed of an acoustic wave generated upon discharge in the oscillation chamber is controlled such that the measured spectral purity range E95 is held within the allowable range E950±dE95 of the target spectral purity range E950. Thus, the spectral purity range E95 of the laser beam output by the amplification laser device 300 is subjected to stabilization control.

In the fifteenth embodiment, oscillation frequency detecting means for detecting the oscillation frequency of the seed beam oscillated by the oscillation laser device 100 and laser gas temperature varying means for varying the temperature of the laser gas in the oscillation chamber 10 are provided, and the laser gas temperature is varied in accordance with the detected oscillation frequency of the seed beam on the basis of a relationship between the seed beam oscillation frequency, the temperature of the laser gas in the oscillation chamber 10, and the spectral purity range E95. In so doing, the spectral purity range E95 of the laser beam output from the amplification laser device 300 is subjected to stabilization control.

First, the principles applied to this embodiment will be described.

When the gas temperature in the oscillation chamber 10 varies, the spectral purity range E95 varies. The reason for this is that an acoustic wave generated upon discharge varies the particle density distribution on the laser optical path, thereby varying the laser wavefront. The gas temperature T [K] has a relationship of $$v \propto (T)^{1/2}$$

with the propagation speed v of the acoustic wave. Therefore, when the gas temperature varies, the propagation speed of the acoustic wave also varies, leading to variation in the particle density distribution on the laser optical path, variation in the laser wavefront, and consequently, variation in the spectral purity range E95.

Variation in the oscillation frequency also affects the acoustic wave, and therefore the relationship between the gas temperature and the spectral purity range E95 also varies in accordance with the oscillation frequency.

FIG. 43 is a graph indicating the manner in which the spectral purity range E95 changes in accordance with variation in the oscillation frequency, showing characteristics when the gas temperature is changed by 20° C., 40° C., 60° C., respectively. As is evident from FIG. 43, when the oscillation laser device 100 oscillates at a certain frequency and the gas temperature in the oscillation chamber 10 is varied, the spectral purity range E95 can be changed in accordance with the variation in the gas temperature, and thus the spectral purity range E95 can be set at a target value.

FIG. 44 shows the relationship between the gas temperature (° C.) and the spectral purity range E95 at each oscillation frequency. A characteristic L16 shows the relationship between the gas temperature (° C.) and the spectral purity range E95 at an oscillation frequency of 3.6 kHz, a characteristic L17 shows the relationship between the gas temperature (° C.) and the spectral purity range E95 at an oscillation frequency of 3.7 kHz, and a characteristic $L17^{vi}$ shows the relationship between the gas temperature (° C.) and the spectral purity range E95 at an oscillation frequency of 4 kHz.

Since the relationship between the gas temperature and the spectral purity range E95 varies in accordance with the oscillation frequency, the correlative relationships (L16, L17, L18) between the gas temperature and spectral purity range E95 at each frequency may be pre-stored in a database and the correlative relationship corresponding to the current oscillation frequency may be read during actual control. The spectral purity range E95 can then be controlled by varying the gas temperature on the basis of the read correlative relationship. Hence, actual control of the spectral purity range E95 is performed by controlling the laser gas temperature.

Next, a constitutional example of a temperature sensor T1 used in this example to detect the laser gas temperature will be described.

A thermocouple, a resistance thermometer bulb, and so on may be used as a measuring instrument for detecting the gas temperature in the oscillation chamber 10. A fiber thermometer, an infrared thermometer, and so on may also be used.

FIGS. 45 to 48 show ways in which the temperature sensor T1 is attached to the oscillation chamber 10.

In FIG. 45, the temperature sensor T1 is attached to a sheath 91 protruding into the interior of the oscillation chamber 10. A detection signal from the temperature sensor T1 is input into the utility controller 5 (FIG. 1). To improve the temperature sensitivity of the temperature sensor T1, the sheath 91 is preferably made from a material that does not react with laser gas, has high thermal conductivity, and is as thin as possible. The sheath 91 is sealed from the exterior of the chamber 10 by an O-ring, welding, or a similar method, and is attached to a chamber partition wall 90 so as to contact the laser gas in the interior of the chamber 10. Note that if the temperature sensor T1 itself is made from a material that does not react with laser gas, the sheath 91 may be omitted.

FIG. 46 shows an example of the attachment position of the temperature sensor T1.

The temperature sensor T1 is preferably disposed in positions 90A, 90B of the chamber partition wall 90 in the vicinity of the electrodes 10*a*, 10*b*. The temperature sensor T1 may also be disposed in positions 90C, 90D in the vicinity of the cross-flow fan 10*c*.

In FIG. 45, the temperature sensor T1 contacts the laser gas via the sheath 91, but the temperature sensor T1 may be attached so as to contact the chamber partition wall 90, as shown in FIG. 47, such that the temperature of the chamber partition wall 90 is detected as the temperature of the laser gas. Note, however, that the periphery of the temperature sensor T1 is preferably covered in an adiabatic material 92 to ensure that temperature measurement is performed with stability.

Further, as shown in FIG. 48, temperature responsiveness can be improved further by reducing the thickness of the chamber partition wall 90 in the location where the temperature sensor T1 is attached.

A case in which the laser gas is detected by the temperature sensor T1 was described above, but it is also possible to measure the pressure of the oscillation chamber 10 and calculate the temperature from the pressure.

Next, constitutional examples of means for varying the laser gas temperature will be described.

As shown in FIG. 2, the heat exchanger 10d is typically installed in the oscillation chamber 10 for cooling the laser gas.

FIG. 49 shows a structure for varying the gas temperature by adjusting the flow rate of the cooling water flowing into the heat exchanger 10d. A valve 15b is provided on a cooling water supply passage 15a for supplying the heat exchanger 10d with cooling water.

More specifically, when the gas temperature is detected by the temperature sensor T1, a temperature detection signal is transmitted to the utility controller 5. In the interior of the utility controller 5, calculation processing is performed to convert the laser gas temperature into a feedback signal, calculate a cooling water flow rate required for achieving a target laser gas temperature using PID control or the like, and calculate a valve opening corresponding to the cooling water flow rate. The utility controller 5 then transmits a valve opening signal to the valve 15b of the cooling water supply unit 15. As a result, the valve opening of the valve 15b is adjusted and cooling water is supplied to the heat exchanger 10d at the required flow rate.

FIG. 50 shows a constitutional example in which a temperature regulator 93 is provided on the cooling water supply passage 15a. Similarly to the constitutional example shown in FIG. 49, in FIG. 50 the utility controller 5 executes calculation processing to calculate an operation amount of the temperature regulator 93 required to achieve the target laser gas temperature, and transmits an operation signal to the temperature regulator 93 of the cooling water supply unit 15. As a result, the temperature regulator 93 is operated and the temperature of the cooling water flowing through the cooling water supply passage 15a is adjusted. According to the constitutional example shown in FIG. 50, the responsiveness of control to align the laser gas temperature with the target value is improved.

FIGS. 51 and 52 show constitutional examples in which the laser gas temperature is varied by a heater attached to the oscillation chamber 10. In these cases, similarly to FIGS. 49 and 50, the laser gas temperature is controlled by transmitting an operation signal to the heater from the controller.

In FIG. 51, a heater 94 such as a mantle heater or a ceramic heater is attached to the outside of the partition wall 90 of the oscillation chamber 10, and the temperature of the laser gas in the interior of the chamber 10 is controlled by adjusting the power that is supplied to the heater 94.

More preferably, as shown in FIG. 52, a heater 95 is attached to the inside of the oscillation chamber 10. In FIG. 52, a heater 95 such as a cartridge heater is attached to the inside of the chamber partition wall 90 in the vicinity of the electrode 10a. Note that the heater 95 is preferably covered by a sheath to prevent reaction with the laser gas.

Next, a constitutional example of means for detecting the oscillation frequency will be described.

The laser oscillation frequency is usually determined by a stepper/scanner. More specifically, either the oscillation laser device 100 is informed of an oscillation frequency value by the aligner 3 (2100 Hz or the like, for example), or a laser oscillation trigger signal (a rectangular wave, for example) is transmitted to the interior of the oscillation laser device 100 and oscillation is performed at a corresponding timing.

In the former case, the actual oscillation frequency is indicated by the aligner 3, and therefore a controller in the interior of the oscillation laser device 100 can learn the current oscillation frequency. In the latter case, only a trigger signal is transmitted from the aligner 3, and therefore the controller in the interior of the oscillation laser device 100 cannot learn the current oscillation frequency.

Hence, in the latter case, the controller in the interior of the oscillation laser device 100 must be provided with a function for calculating the current oscillation frequency from the interval of the trigger signal period, the trigger signal count within a certain time period, and so on. However, when control is delayed and performed on the basis of a pre-modification oscillation frequency after the oscillation frequency has been modified, the spectral purity range E95 may deviate from the allowable range dE95, and therefore the post-modification oscillation frequency is preferably obtained before modification takes place.

FIG. 53 shows a processing sequence of the fifteenth embodiment, in which the spectral purity range E95 is subjected to stabilization control by adjusting the laser gas temperature. FIG. 53 corresponds to the "stabilization control using the E95 actuator" (step 104) subroutine in the main routine of FIG. 7.

As shown in FIG. 7, when the value of the spectral purity range E95 measured by the second monitor module 39 is wider than the second allowable range E950+dE95 (when the spectral purity range E95 is within the first allowable range E950+dE95(S)) in the main routine (an affirmative determination in the step 103), the subroutine shown in FIG. 53 is entered.

The processing of the subroutine shown in FIG. 53 is executed by E95, the wavelength controller 6, the utility controller 5, and the main controller 4, shown in FIG. 1.

When the subroutine shown in FIG. 53 begins, first an oscillation frequency f of the seed beam oscillated by the oscillation laser device 100 is detected (recognized) by the main controller 4. The oscillation frequency f is transmitted to E95 and the wavelength controller 6 (step 1510).

Next, a calculation is made by E95 and the wavelength controller 6 to determine whether the spectral purity range E95 has become wider or narrower than the target value, or in other words whether or not E95>E950 (step 1501).

If, as a result of the determination, E95>E950, this means that the spectral purity range is wider than the target value, and therefore a gas temperature T required to narrow the spectral purity range E95 is calculated. More specifically, the relationship between the gas temperature T and the spectral purity range E95 at each oscillation frequency, shown in FIG. 44, is stored in a database, and the gas temperature T required to achieve the target spectral purity range E950 at the current detected oscillation frequency f is read. Note that the correlative relationship between the gas temperature T and spectral purity range E95 is depicted by various curves, as shown by the characteristics L16 to L18 in FIG. 44. In the case of a gas temperature T that increases or decreases monotonously within a gas temperature control range, only one gas temperature T corresponds to the target spectral purity range E950, whereas in the case of a correlative relationship having a minimum value or a maximum value, two or more gas temperatures T correspond to the target spectral purity range E950. In such a case, either gas temperature T may be selected, but to reduce the control time, the gas temperature T closest to the currently detected gas temperature is preferably selected (step 1502).

When E95>E950 is not established as a result of the determination in the step 1501, this means that the spectral purity range is narrower than the target value, and therefore a gas temperature T required to widen the spectral purity range E95 is calculated similarly (step 1503).

Next, a determination is made as to whether or not the calculated gas temperature T has exceeded a controllable range (limit detected) (step 1504).

When the calculated gas temperature T has exceeded the controllable range (limit detected), it is determined that stabilization control of the spectral purity range E95 can no longer be performed by adjusting the laser gas temperature, and therefore the routine switches to another E95 control method or a control impossible signal is transmitted to the main controller 4 to halt laser oscillation (step 1505).

When the calculated gas temperature T has not exceeded the controllable range (limit not detected), stabilization control is possible, and therefore the routine advances to a following step 1506 with no further processing.

In the step 1506, a control command signal is transmitted to the utility controller 5 via the main controller 4, and the utility controller 5 controls the laser gas temperature via gas temperature varying means such as the cooling water supply unit 15. In other words, control is executed to match the current laser gas temperature, detected by the temperature sensor T1, to the target gas temperature T using the current laser gas temperature as a feedback amount (step 1506).

Next, in a step 1507, the routine enters the same "spectral purity range E95 measurement" subroutine (see FIGS. 6 and 10) as that of the step 101 in FIG. 7, where the actual spectral purity range E95 following variation of the gas temperature in the oscillation chamber 10 is measured (step 1507), and a determination is made as to whether or not the measured spectral purity range E95 is within the second allowable range (E950±dE95) (step 1508). If, as a result, the measured spectral purity range E95 is contained within the second allowable range (E950±dE95), the routine returns to the main routine of FIG. 7 (step 1509).

On the other hand, if it is determined as a result of the determination of the step 1508 that the measured spectral purity range E95 is not contained within the second allowable range (E950±dE95), the routine returns to the step 1510 and repeats the subroutine until the spectral purity range E95 is contained within the second allowable range. Once the spectral purity range E95 has been contained within the second allowable range, the routine returns to the main routine of FIG. 7 (step 1509).

Sixteenth and Seventeenth Embodiments

Stabilization Control of Spectral Purity Range E95 Through Control to Vary Spectral Purity Range of Seed Beam Output from Oscillation Laser Device 100 and Control to Vary Discharge Timing (Control Means 3)

In the first embodiment (FIG. 13) described above, the spectral purity range E95 of the laser beam is subjected to stabilization control by varying the discharge timing. In the third to seventh, ninth, and tenth embodiments described above, the spectral purity range E95 of the laser beam is subjected to stabilization control by varying the seed beam pulse waveform to alter the rise time of the seed beam pulse waveform such that the spectral purity range of the seed beam is varied. In the sixteenth and seventeenth embodiments, these two types of control are combined. According to these embodiments, a synergistic effect is obtained by combining the two types of control, and as a result, the control range (synchronization allowable range) of the discharge timing dt is enlarged, leading to a further improvement in controllability.

FIG. 56 is a timing chart illustrating the effects of combining control to vary the discharge timing and control to vary the pulse waveform (the pulse rise time). The abscissa shows time, and the ordinate shows the pulse waveform of the seed beam, indicating the seed beam output power (intensity).

FIG. 56A illustrates a case in which the spectral purity range E95 is reduced by retarding the discharge timing and retarding the seed beam pulse waveform, while FIG. 56B illustrates a case in which the spectral purity range E95 is increased by advancing the discharge timing and advancing the seed beam pulse waveform.

FIG. 56A shows effects obtained by combining the effect shown in FIG. 5 and the effect shown in FIG. 15. As shown by an arrow 3A, by retarding the discharge timing, a seed beam wavelength part to be amplified, from the seed beam pulse waveform L3, shifts from a part L31 at which the spectral purity range widens to a part L32 at which the spectral purity range narrows (the effect shown in FIG. 5). Further, as shown by an arrow 3B, by retarding the seed beam pulse waveform from L3 to L3', the spectral purity range shifts to a part L32' of the pulse waveform L3' at which the spectral purity range narrows further (the effect shown in FIG. 15).

The spectral purity range E95 is increased in a similar manner. As shown by an arrow 13A in FIG. 56B, by advancing the discharge timing, the seed beam wavelength part to be amplified, from the seed beam pulse waveform L3, shifts from the part L32 at which the spectral purity range narrows to the part L31 at which the spectral purity range widens (the effect shown in FIG. 5). Further, as shown by an arrow 13B, by advancing the seed beam pulse waveform from L3 to L3", the spectral purity range shifts to a part L31" of the pulse waveform L3" at which the spectral purity range widens further (the effect shown in FIG. 15).

As a result, the control range of the discharge timing dt, or in other words the synchronization allowable range in which the laser output power equals or exceeds an allowable level, is enlarged from 3C to 3D, leading to a dramatic improvement in controllability.

FIG. 58 shows a processing procedure of the sixteenth embodiment. FIG. 58 corresponds to the "stabilization control using the E95 actuator" subroutine (step 104) of the main routine shown in FIG. 7.

FIG. 58 shows the content of processing combining the first embodiment (discharge timing control) and the third to seventh, ninth, and tenth embodiments (pulse waveform control). Description of parts overlapping flowcharts already described has been omitted, and the corresponding locations thereof are indicated. The fourth embodiment (FIG. 18) is used to represent pulse waveform control.

Steps 1601, 1605, 1607, 1608, 1609 in FIG. 58 are similar to the steps 401, 405, 407, 408, 409 of the first embodiment (FIG. 13).

In a step 1602 of FIG. 58, the processing of the steps 502, 506 is executed to delay the rise of the seed beam pulse waveform, similarly to the flowchart of the fourth embodiment (FIG. 18). Alternatively, similar processing to that of other steps corresponding to the flowcharts of the fifth to seventh, ninth, and tenth embodiments is executed.

In a step 1603 of FIG. 58, the processing of the steps 503, 506 is executed to advance the rise of the seed beam pulse waveform, similarly to the flowchart of the fourth embodiment (FIG. 18). Alternatively, similar processing to that of other steps corresponding to the flowcharts of the fifth to seventh, ninth, and tenth embodiments is executed.

In a step 1612 of FIG. 58, the processing of the steps 402, 406 is executed to increase the discharge timing interval, similarly to the flowchart of the first embodiment (FIG. 13).

In a step 1613 of FIG. 58, the processing of the steps 403, 406 is executed to reduce the discharge timing interval, similarly to the flowchart of the first embodiment (FIG. 13).

In a step 1604 of FIG. 58, a determination is made as to whether or not the discharge timing limit has been detected (FIG. 13, step 404), and a determination is made as to whether or not a limit relating to the F2 concentration serving as a parameter for varying the pulse waveform (or another parameter corresponding to the fifth to seventh, ninth, and tenth embodiments) has been detected (FIG. 18, step 504 (or another step corresponding to the flowcharts of the fifth to seventh, ninth, and tenth embodiments)).

In the flowchart of the sixteenth embodiment, shown in FIG. 58, the limit detection determination processing (step 1604) is performed after the seed beam pulse and the discharge timing have been varied, and when the limit is detected, control impossible processing (step 1605) is performed. As shown in FIG. 60, however, the limit detection determination may be made after the seed beam pulse waveform has been varied, and the processing to vary the discharge timing may be performed thereafter. In so doing, the control impossible processing can be omitted.

FIG. 60 is a flowchart showing the seventeenth embodiment, which is a modification of the flowchart showing the sixteenth embodiment in FIG. 58.

In FIG. 60, the processing of a step 1701 and the processing of steps 1707, 1708, 1709 are executed in an identical sequence to the processing of the step 1601 and the processing of the steps 1607, 1608, 1609 in FIG. 58. However, the processing sequence performed between the step 1701 and the steps 1707 to 1709 differs from that shown in FIG. 58.

More specifically, in FIG. 60, processing to delay the rise of the seed beam pulse waveform is executed in a step 1702 following the processing of the step 1701, similarly to the step 1602 in FIG. 58. Next, however, a determination is made as to whether or not the limit relating to the F2 concentration serving as a parameter for varying the pulse waveform (or another parameter corresponding to the fifth to seventh, ninth, and tenth embodiments) has been detected (step 1704). If, as a result, the limit has been detected, processing is performed to increase the discharge timing interval (step 1712) similarly to the step 1612 of FIG. 58, without performing control impossible processing, whereupon the routine advances to the step 1707. If the limit has not been detected, the routine advances to the step 1707 without controlling the discharge timing.

Similarly, processing to advance the rise of the seed beam pulse waveform is executed in a step 1703 following the processing of the step 1701, similarly to the step 1603 in FIG. 58. Next, however, a determination is made as to whether or not the limit relating to the F2 concentration serving as a parameter for varying the pulse waveform (or another parameter corresponding to the fifth to seventh, ninth, and tenth embodiments) has been detected (step 1705). If, as a result, the limit has been detected, processing is performed to reduce the discharge timing interval (step 1713) similarly to the step 1613 of FIG. 58, without performing control impossible processing, whereupon the routine advances to the step 1707. If the limit has not been detected, the routine advances to the step 1707 without controlling the discharge timing.

In FIG. 60, the determination as to whether or not the limit has been detected (steps 1704, 1705) is made after the pulse waveform has been varied (steps 1702, 1703), and the discharge timing is varied (steps 1712, 1713) in accordance with the determination result. Conversely, however, the determination as to whether or not the limit has been detected may be made after the discharge timing has been varied such that the pulse waveform is varied in accordance with the determination result.

According to the sixteenth and seventeenth embodiments, control to vary the discharge timing and control to vary the pulse waveform (the pulse rise time) are implemented in combination, producing a synergistic effect that enables an expanding of the control range (synchronization allowable range) of the discharge timing dt and an improvement in controllability. The control of the second embodiment, i.e. the embodiment in which the seed beam is subjected to pulse stretching, may also be combined with the above control. As described with reference to FIG. 14, by pulse-stretching the seed beam to lengthen the pulse range of the seed beam, the synchronization allowable range can be increased further, enabling a further improvement in controllability.

Note that in the flowcharts such as that of the fourth embodiment (also the fifth to seventh, tenth, and eleventh embodiments), in which the pulse waveform is controlled by varying a parameter such as the fluorine concentration, control impossible processing such as halting laser oscillation is performed when the limit is detected (the step 505 of FIG. 18 in the case of the fourth embodiment). However, similarly to FIG. 60, the routine may switch to control for varying the discharge timing (steps 1712, 1713) when the limit is detected.

Eighteenth and Nineteenth Embodiments

Stabilization Control of Spectral Purity Range E95 Through Control to Vary Spectral Purity Range of Seed Beam Output From Oscillation Laser Device 100 (by Varying Spectrum-Narrowing Performance or Acoustic Wave Propagation Speed) and Control to Vary Discharge Timing (Control Means 3)

In the first embodiment (FIG. 13) described above, the spectral purity range E95 of the laser beam is subjected to stabilization control by varying the discharge timing. In the eleventh to fourteenth and fifteenth embodiments described above, the spectral purity range E95 of the laser beam is subjected to stabilization control by varying the spectrum-narrowing performance of the oscillation laser device 100 or varying the propagation speed of the acoustic wave generated upon discharge in the oscillation chamber 10 such that the spectral purity range of the seed beam is varied. In the eighteenth and nineteenth embodiments, these two types of control are combined. According to these embodiments, a synergistic effect is obtained by combining the two types of control, and as a result, the control range of the spectral purity range E95 is enlarged, leading to a further improvement in controllability.

FIG. 57 is a view illustrating the effects of combining control to vary the discharge timing and control to vary the spectral purity range of the seed beam (control to vary the spectrum-narrowing performance or control to vary the acoustic wave propagation speed). Similarly to FIG. 4, the abscissa shows the discharge timing dt, and the ordinate shows the spectral purity range E95.

The characteristic L1 in FIG. 57 corresponds to the characteristic L1 shown in FIG. 4.

When enlarging the spectral purity range E95 to align it with the target spectral purity range E950, first of all control is performed to increase the spectral purity range of the seed beam. As a result, the characteristic L1 shifts to a characteristic L1A having an increased spectral purity range. Control is then performed to increase the spectral purity range E95 by reducing the discharge timing dt. As a result, the discharge timing varies in a decreasing direction on the characteristic line L1A.

When reducing the spectral purity range E95 to align it with the target spectral purity range E950, first of all control is performed to reduce the spectral purity range of the seed beam. As a result, the characteristic L1 shifts to a characteristic L1B having a reduced spectral purity range. Control is then performed to reduce the spectral purity range E95 by increasing the discharge timing dt. As a result, the discharge timing varies in an increasing direction on the characteristic line L1B.

By comparing a control range 1A of the spectral purity range E95, obtained when control is only performed to vary the spectral purity range of the seed beam, with a control range 1B, obtained when control to vary the spectral purity range of the seed beam and control to vary the discharge timing dt are combined, it can be seen that an enlarged spectral purity range E95 control range (ordinate) is obtained with the control combination when the synchronization allowable range (abscissa) is constant.

Hence, by combining the two types of control, the range in which control of the spectral purity range E95 is possible within a constant synchronization allowable range is further increased, leading to a dramatic improvement in controllability.

FIG. 59 shows a processing procedure of the eighteenth embodiment. FIG. 58$^{vii}$ corresponds to the "stabilization control using the E95 actuator" subroutine (step 104) of the main routine shown in FIG. 7.

FIG. 59 shows the content of processing combining the first embodiment (discharge timing control) and the eleventh to fourteenth and fifteenth embodiments (control of the spectral purity range of the seed beam). Description of parts overlapping flowcharts already described has been omitted, and the corresponding locations thereof are indicated. The eleventh embodiment (FIG. 30) is used to represent control of the spectral purity range of the seed beam.

Steps 1801, 1805, 1807, 1808, 1809 in FIG. 59 are similar to the steps 401, 405, 407, 408, 409 of the first embodiment (FIG. 13).

In a step 1802 of FIG. 59, the processing of the steps 902, 906 is executed to reduce the spectral purity range of the seed beam, similarly to the flowchart of the eleventh embodiment (FIG. 30). Alternatively, similar processing to that of other steps corresponding to the flowcharts of the twelfth to fourteenth and fifteenth embodiments is executed.

In a step 1803 of FIG. 59, the processing of the steps 903, 906 is executed to increase the spectral purity range of the seed beam, similarly to the flowchart of the eleventh embodiment (FIG. 30). Alternatively, similar processing to that of other steps corresponding to the flowcharts of the twelfth to fourteenth and fifteenth embodiments is executed.

In a step 1812 of FIG. 59, the processing of the steps 402, 406 is executed to increase the discharge timing interval, similarly to the flowchart of the first embodiment (FIG. 13).

In a step 1813 of FIG. 59, the processing of the steps 403, 406 is executed to reduce the discharge timing interval, similarly to the flowchart of the first embodiment (FIG. 13).

In a step 1804 of FIG. 59, a determination is made as to whether or not the discharge timing limit has been detected (FIG. 13, step 404), and a determination is made as to whether or not a limit relating to the radius of curvature of the grating, serving as a parameter for varying the spectral purity range of the seed beam (or another parameter corresponding to the twelfth to fourteenth and fifteenth embodiments), has been detected (FIG. 30, step 904 (or another step corresponding to the flowcharts of the twelfth to fourteenth and fifteenth embodiments)).

In the flowchart of the eighteenth embodiment, shown in FIG. 59, the limit detection determination processing (step 1804) is performed after the spectral purity range of the seed beam and the discharge timing have been varied, and when the limit is detected, control impossible processing (step 1805) is performed. As shown in FIG. 61, however, the limit detection determination may be made after the spectral purity range of the seed beam has been varied, and the processing to vary the discharge timing may be performed thereafter. In so doing, the control impossible processing can be omitted.

FIG. 61 is a flowchart showing the nineteenth embodiment, which is a modification of the flowchart showing the eighteenth embodiment in FIG. 59.

In FIG. 61, the processing of a step 1901 and the processing of steps 1907, 1908, 1909 are executed in an identical sequence to the processing of the step 1801 and the processing of the steps 1807, 1808, 1809 in FIG. 59. However, the processing sequence performed between the step 1901 and the steps 1907 to 1909 differs from that shown in FIG. 59.

More specifically, in FIG. 61, processing to reduce the spectral purity range of the seed beam is executed in a step 1902 following the processing of the step 1901, similarly to the step 1802 in FIG. 59. Next, however, a determination is made as to whether or not the limit relating to the radius of curvature of the grating, serving as a parameter for varying the spectral purity range of the seed beam (or another parameter corresponding to the twelfth to fourteenth and fifteenth embodiments), has been detected (step 1904). If, as a result, the limit has been detected, processing is performed to increase the discharge timing interval (step 1912) similarly to the step 1812 of FIG. 59, without performing control impossible processing, whereupon the routine advances to the step 1907. If the limit has not been detected, the routine advances to the step 1907 without controlling the discharge timing.

Similarly, processing to increase the spectral purity range of the seed beam is executed in a step 1903 following the processing of the step 1901, similarly to the step 1803 in FIG. 59. Next, however, a determination is made as to whether or not the limit relating to the radius of curvature of the grating, serving as a parameter for varying the spectral purity range of the seed beam (or another parameter corresponding to the twelfth to fourteenth and fifteenth embodiments), has been detected (step 1905). If, as a result, the limit has been detected, processing is performed to reduce the discharge timing interval (step 1913) similarly to the step 1813 of FIG. 59, without performing control impossible processing, whereupon the routine advances to the step 1907. If the limit has not been detected, the routine advances to the step 1907 without controlling the discharge timing.

In FIG. 61, the determination as to whether or not the limit has been detected (steps 1904, 1905) is made after the spectral purity range of the seed beam has been varied (steps 1902, 1903), and the discharge timing is varied (steps 1912, 1913) in accordance with the determination result. Conversely, however, the determination as to whether or not the limit has been detected may be made after the discharge timing has been varied such that the spectral purity range of the seed beam is varied in accordance with the determination result.

According to the eighteenth and nineteenth embodiments, control to vary the discharge timing and control to vary the spectral purity range of the seed beam (control to vary the spectrum-narrowing performance or control to vary the acoustic wave propagation speed) are implemented in combination, producing a synergistic effect that enables an expanding of the range for controlling the spectral purity range E95 at a constant synchronization allowable range, and accordingly a dramatic improvement in controllability.

Note that in the flowcharts such as that of the eleventh embodiment (also the twelfth to fourteenth and fifteenth embodiments), in which the spectral purity range of the seed beam is controlled by varying a parameter such as the radius of curvature of the grating, control impossible processing, such as halting laser oscillation, is performed when the limit is detected (the step 905 of FIG. 30 in the case of the eleventh embodiment). However, similarly to FIG. 61, the routine may switch to control for varying the discharge timing (steps 1912, 1913) when the limit is detected.

INDUSTRIAL APPLICABILITY

The present invention is based on the two-stage laser device 2, but the various types of control in the embodiments may be applied to a one-stage laser device.

BRIEF DESCRIPTION OF THE DRAWINGS

FIGS. 25A, 25B, and 25C are views illustrating effects obtained when the discharge timing is fixed in relation to variation in the pulse waveform of the seed beam;

FIGS. 26A, 26B, and 26C are views illustrating effects obtained when the discharge timing is varied in accordance with variation in the pulse waveform of the seed beam;

FIGS. 56A and 56B are views illustrating the effects of combining discharge timing control and pulse waveform control;

FIGS. 62A, 62B, and 62C are views illustrating amplification using a MOPA system;

FIGS. 63A, 63B, and 63C are views illustrating amplification using a MOPO system.

Figure 1:
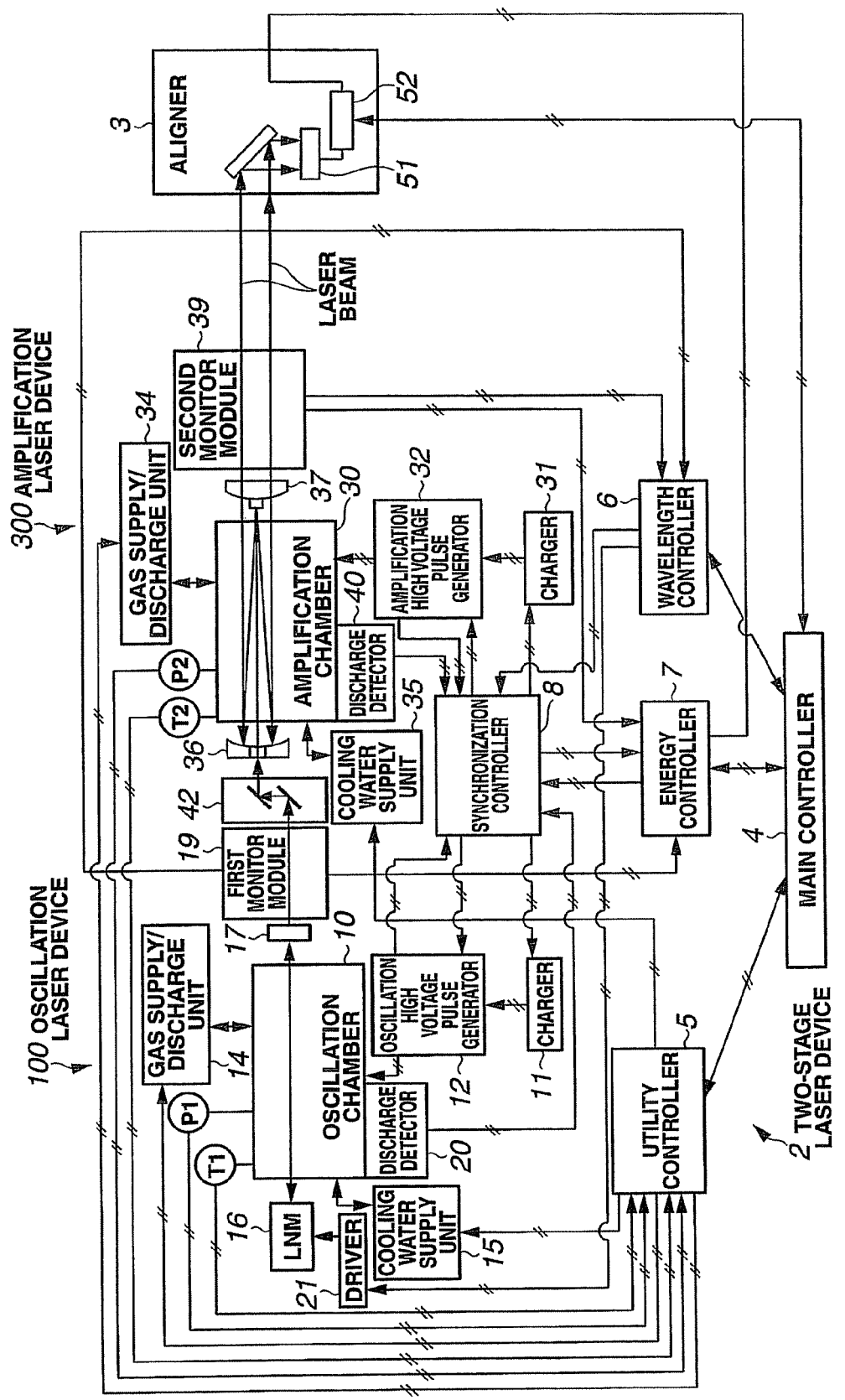
FIG. 1 is a block diagram of a laser system according to an embodiment.
Figure 2A:
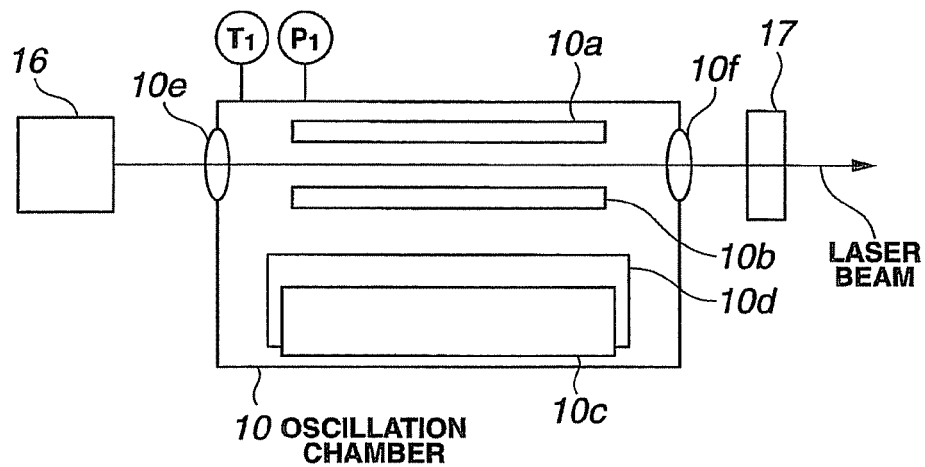
FIGS. 2A and 2B are block diagrams of chambers and the vicinity thereof.
Figure 2B:
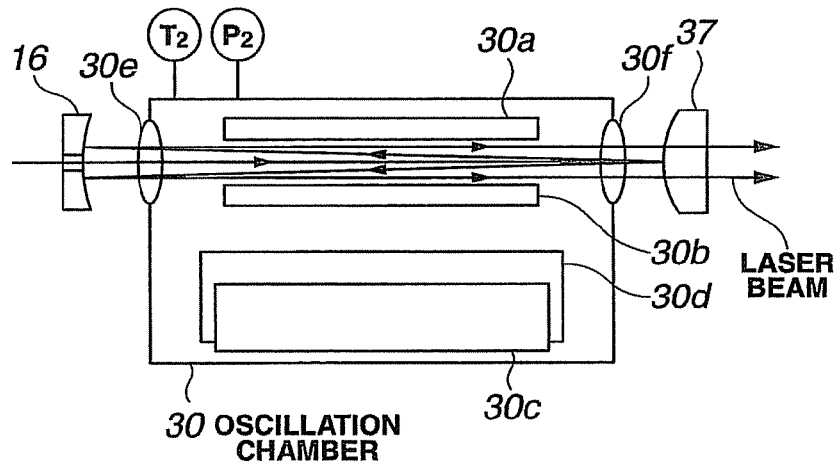
Figure 3A:
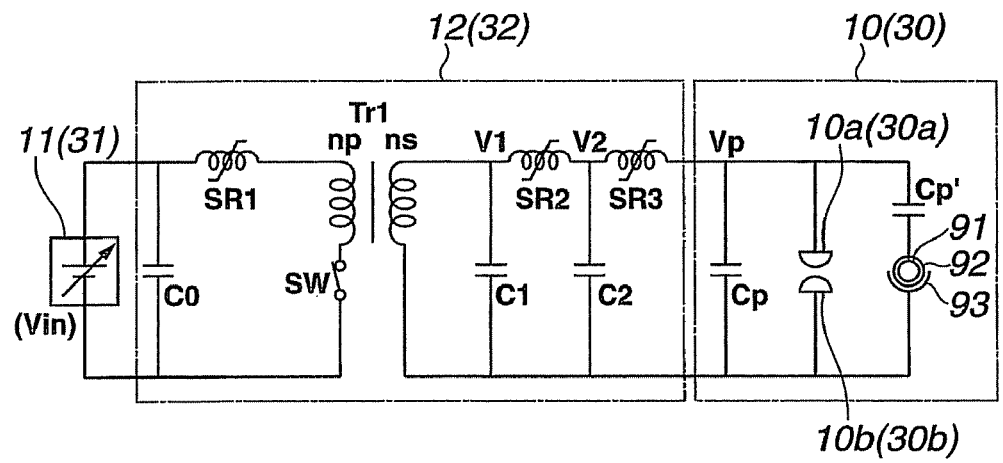
FIGS. 3A and 3B are views showing the constitution of a power source as electric circuits.
Figure 3B:
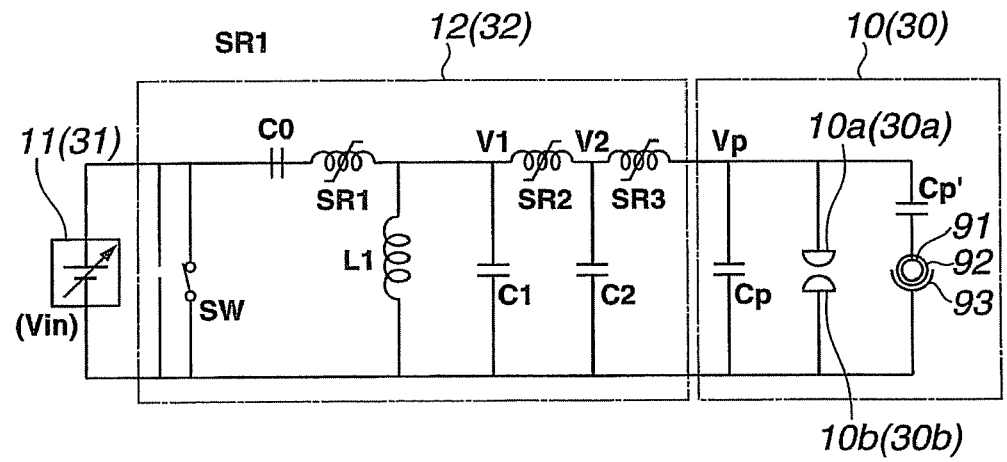
Figure 4:
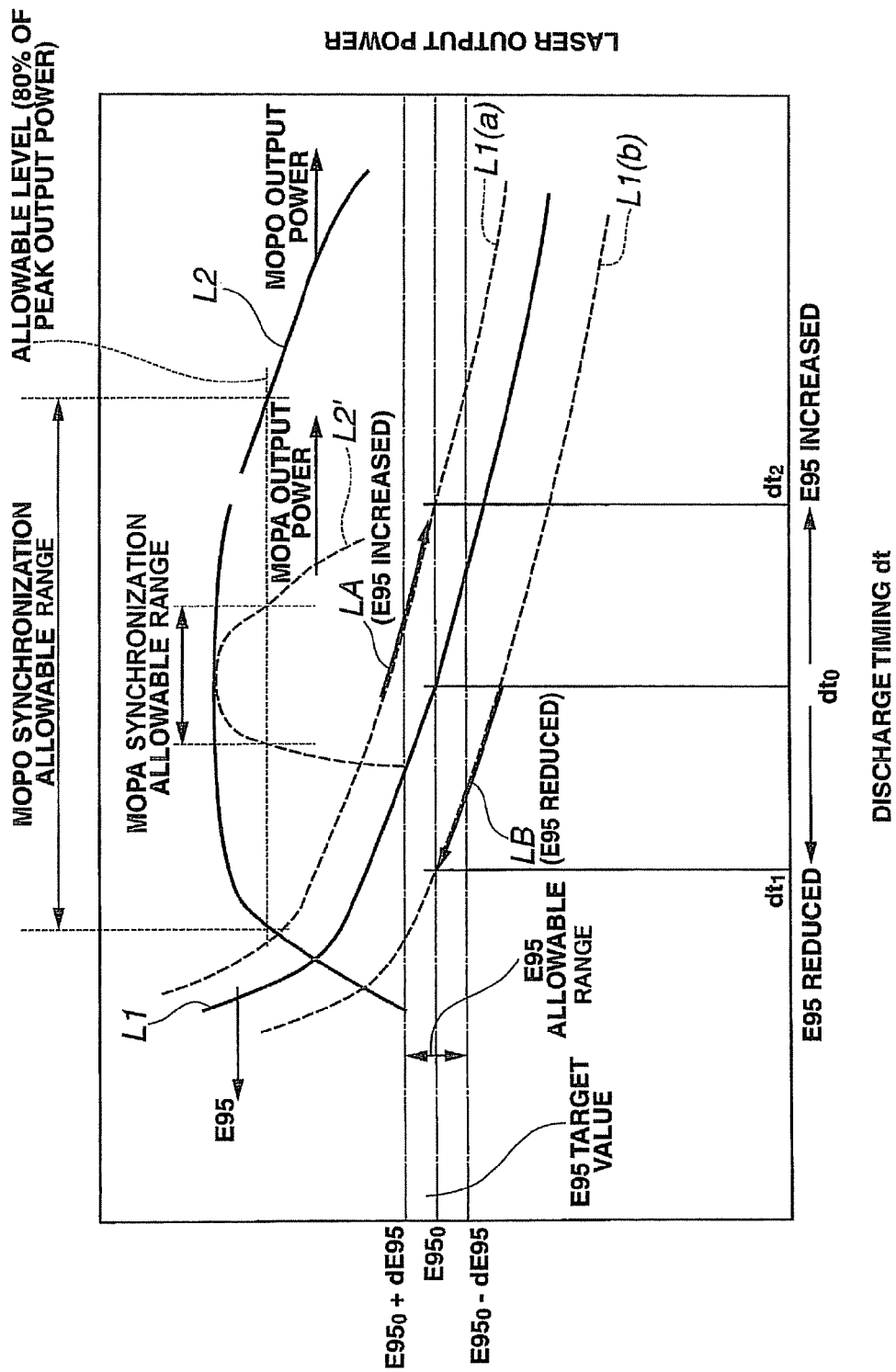
FIG. 4 is a view showing the relationship between a discharge timing and a spectral purity range.
Figure 5:
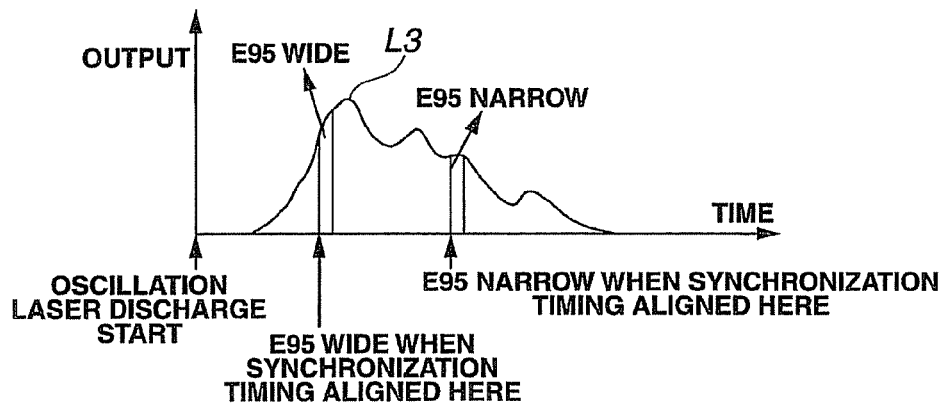
FIG. 5 is a view illustrating determination of the spectral purity range according to the pulse waveform of a seed beam and a synchronization timing.
Figure 6:
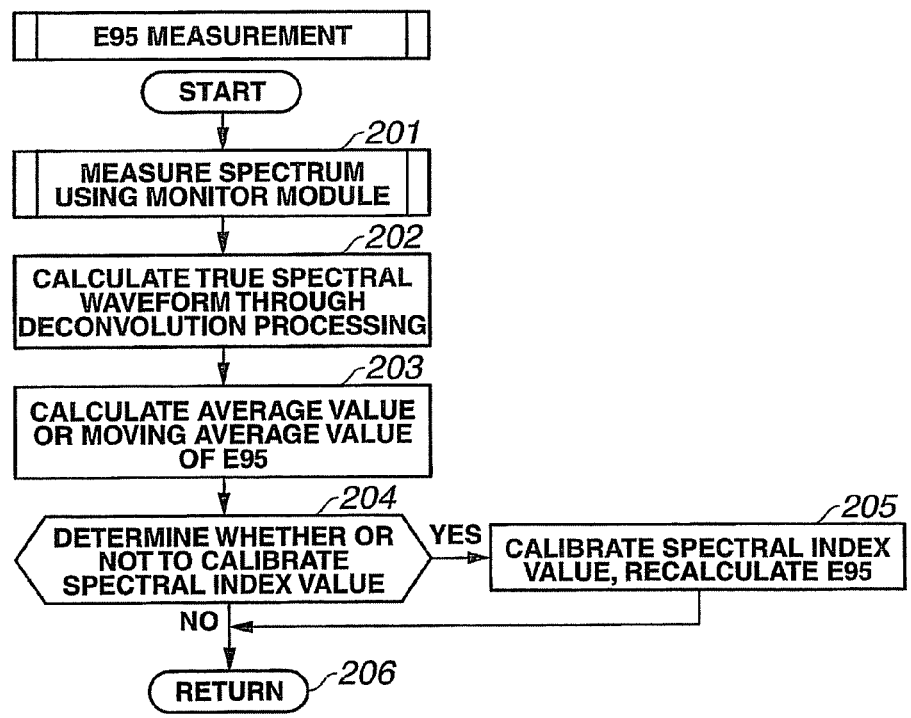
FIG. 6 is a flowchart showing a subroutine for measuring the spectral purity range.
Figure 7:
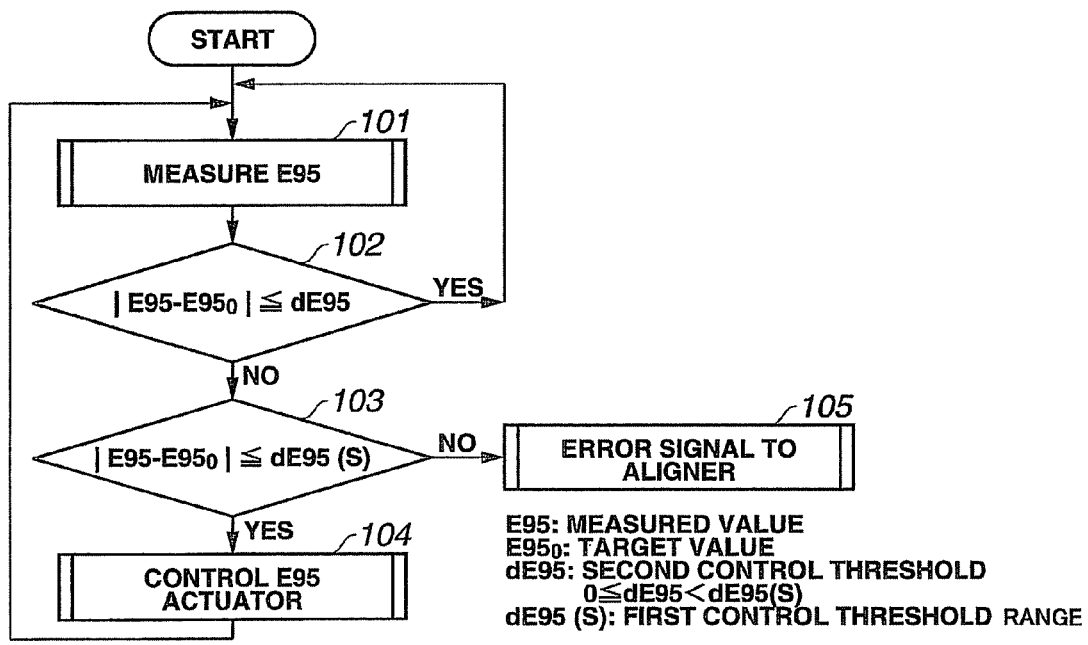
FIG. 7 is a flowchart showing a main routine for stabilization control of the spectral purity range.
Figure 8:
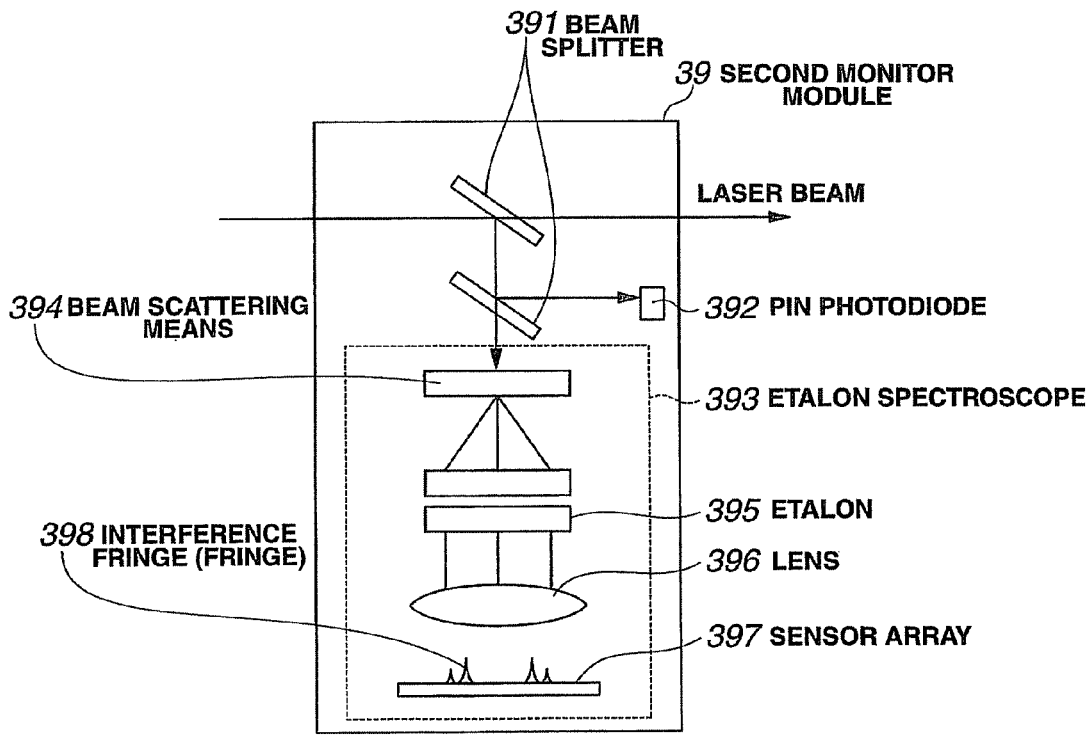
FIG. 8 is a block diagram of a monitor module.
Figure 9:
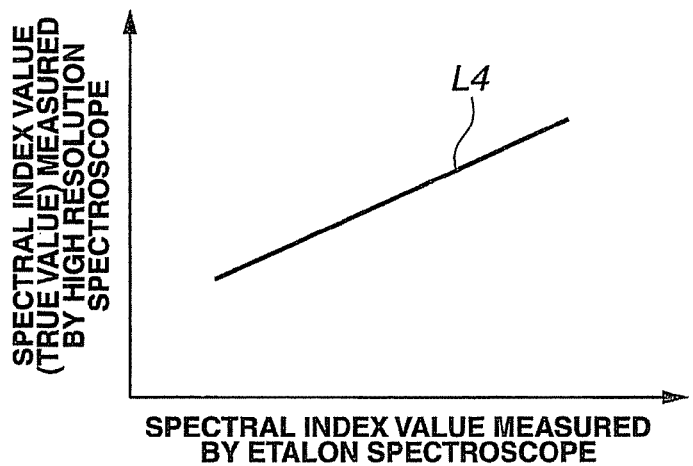
FIG. 9 is a view showing a correlative relationship between a measured spectral index value and a true value.
Figure 10:
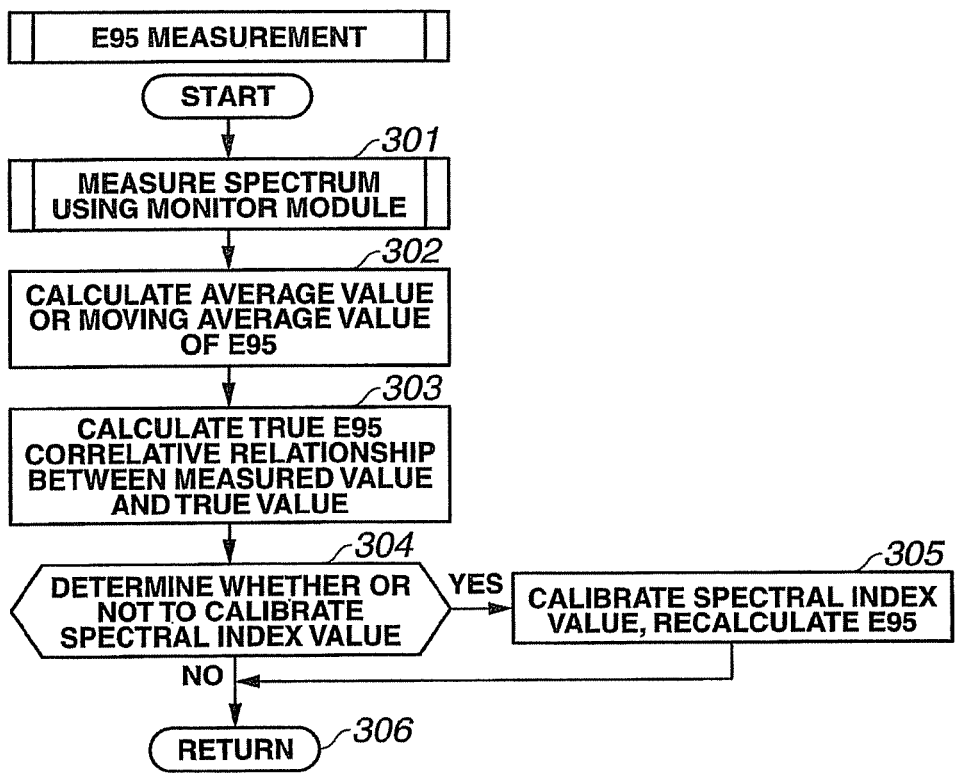
FIG. 10 is a flowchart showing a subroutine for measuring the spectral purity range.
Figure 11K:
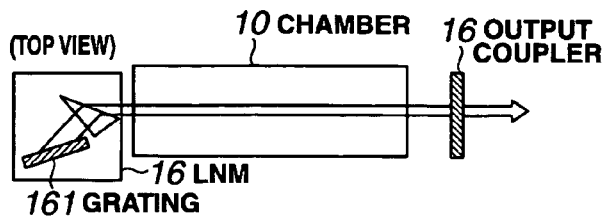
FIGS. 11A to 11K are views illustrating the relationship of a round-trip frequency with a laser pulse waveform and spectral purity range.
Figure 11A:
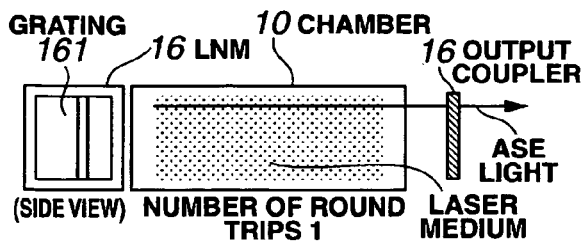
Figure 11B:
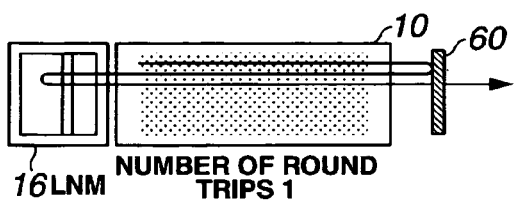
Figure 11C:
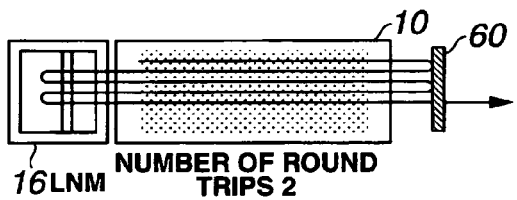
Figure 11D:
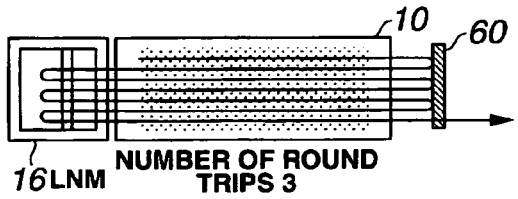
Figure 11E:
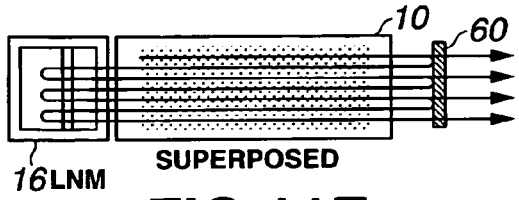
Figure 11F:
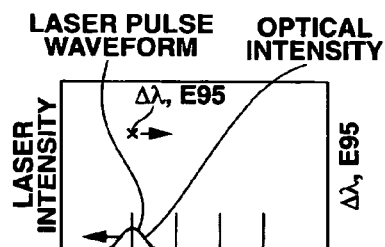
Figure 11G:
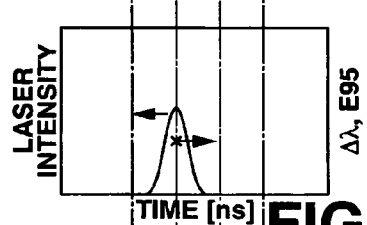
Figure 11H:
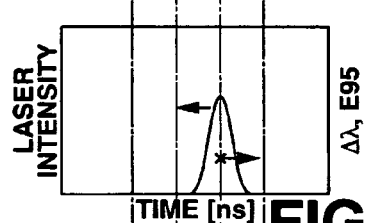
Figure 11I:
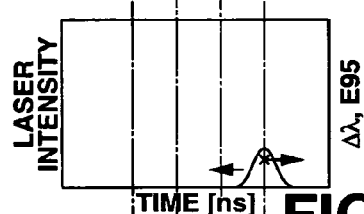
Figure 11J:
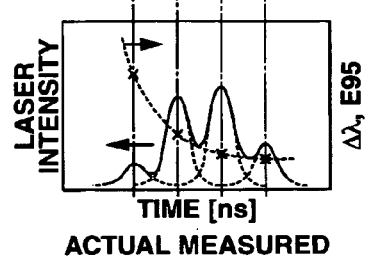
Figure 12:
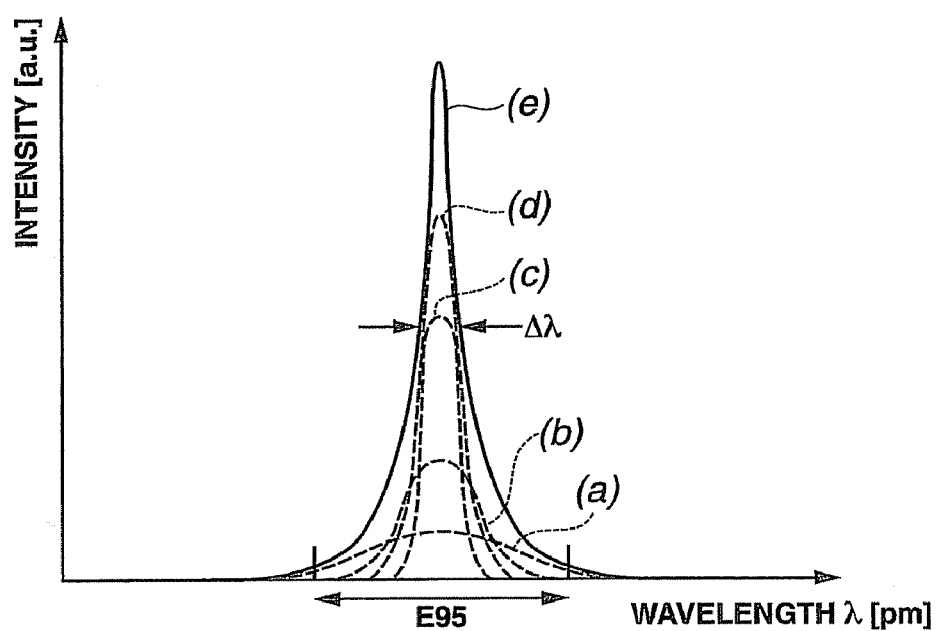
FIG. 12 is a view illustrating the relationship between the round trip frequency and a spectral waveform.
Figure 13:
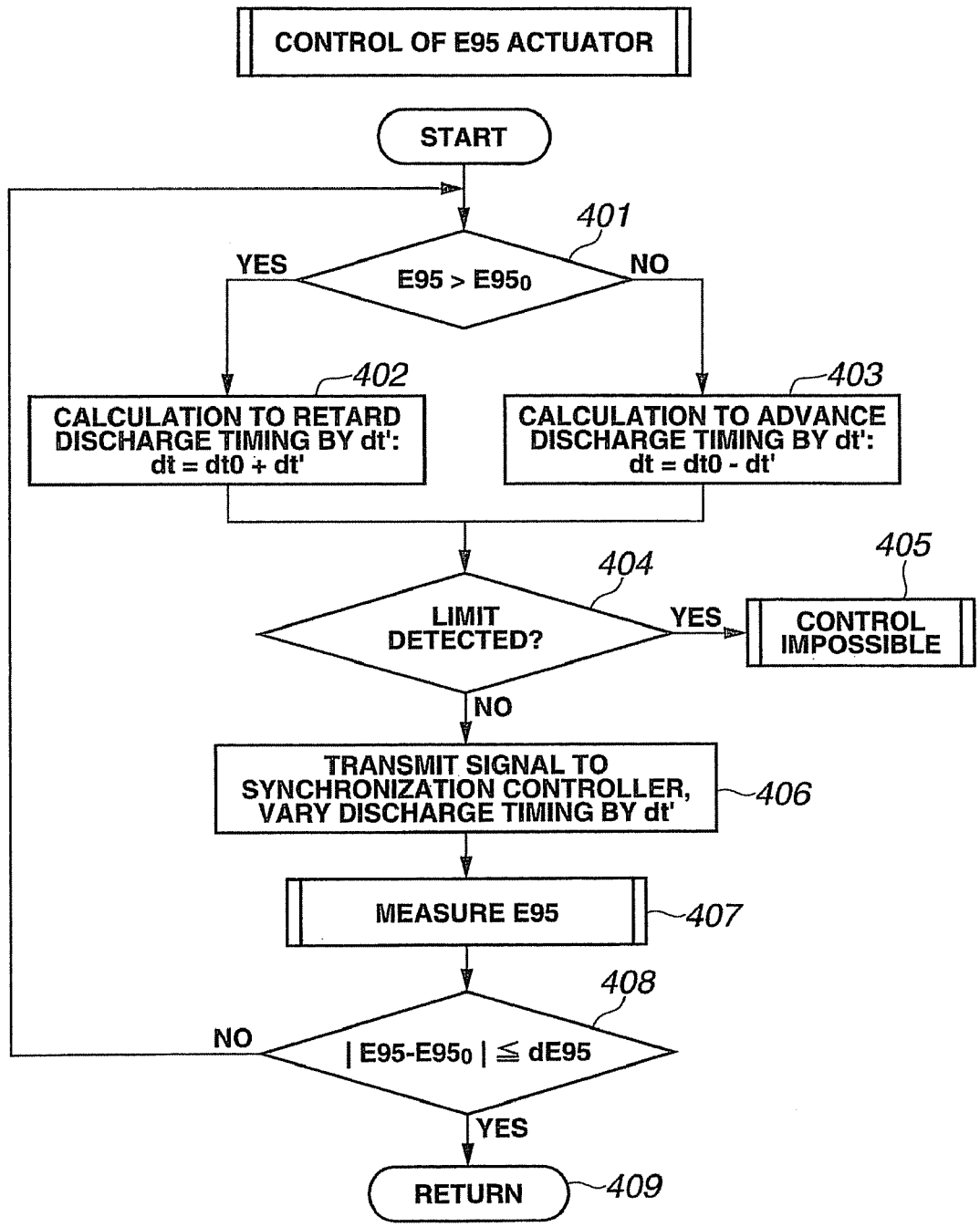
FIG. 13 is a flowchart showing a subroutine (first embodiment) for controlling the discharge timing.
Figure 14:
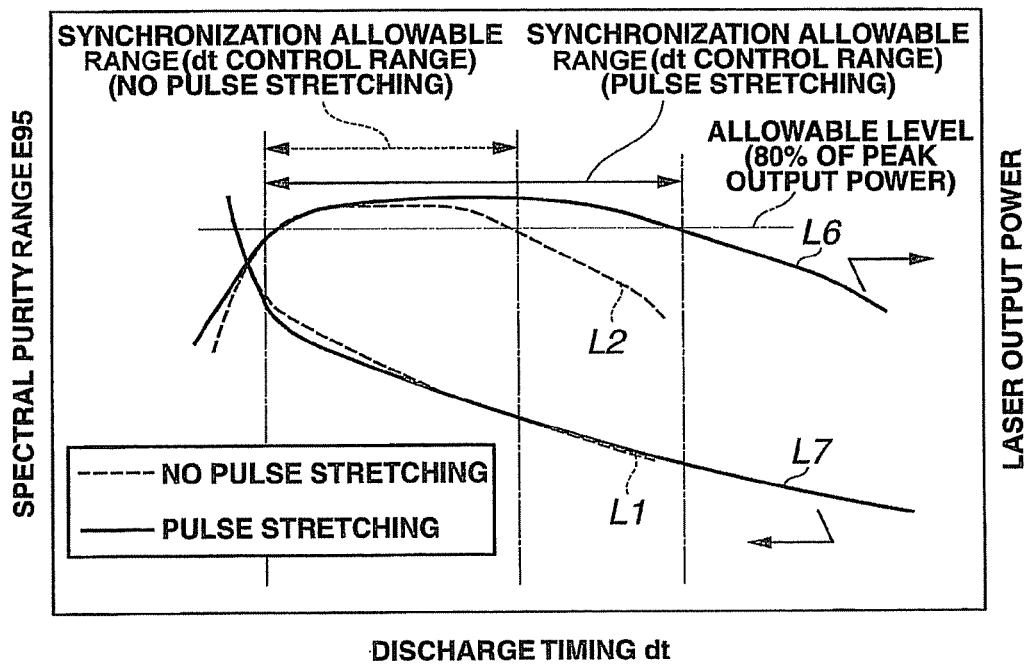
FIG. 14 is a view illustrating the effects of pulse stretching.
Figure 15:
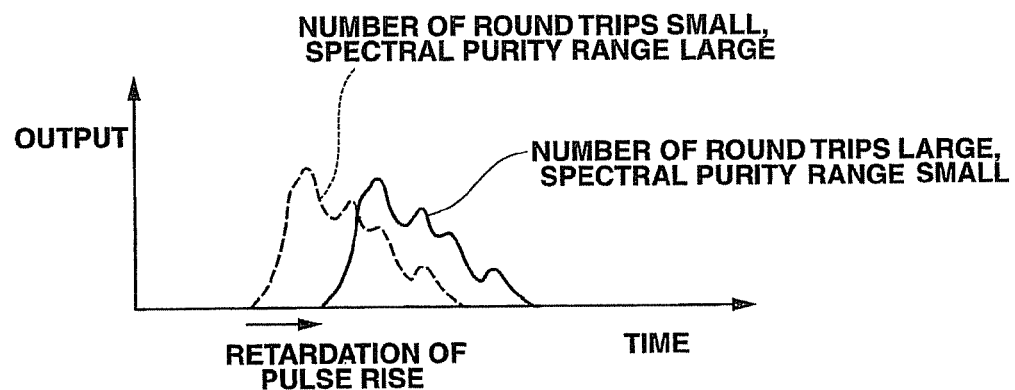
FIG. 15 is a view illustrating spectral variation caused by pulse waveform control.
Figure 16:
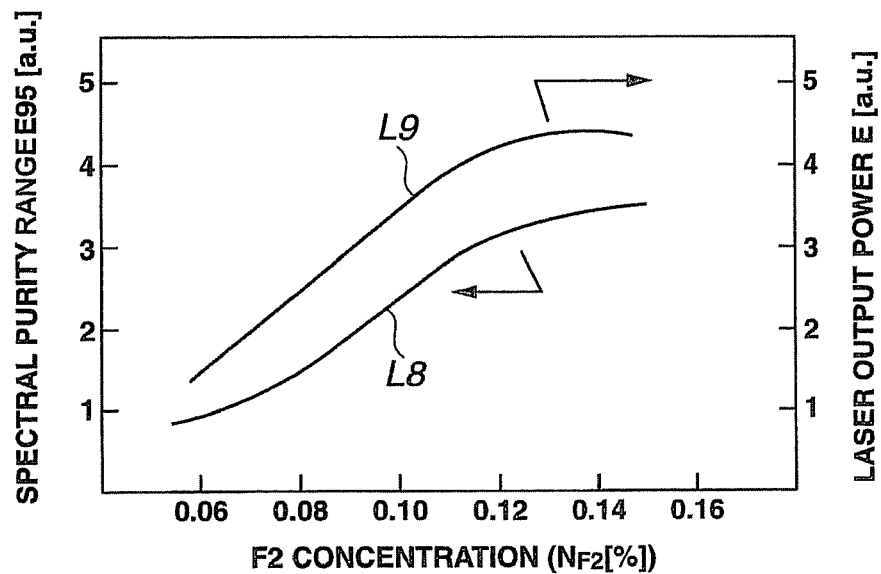
FIG. 16 is a view showing the relationship of a fluorine concentration and the spectral purity range with a laser output power.
Figure 17:
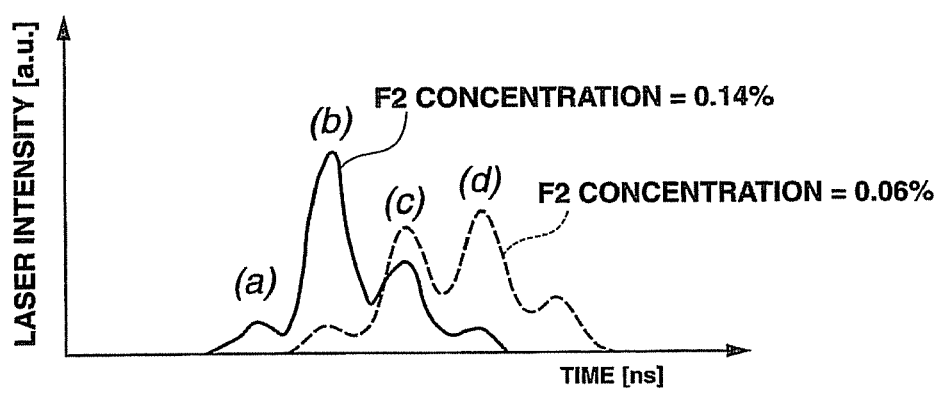
FIG. 17 is a view showing the relationship between the fluorine concentration and the laser pulse waveform.
Figure 18:
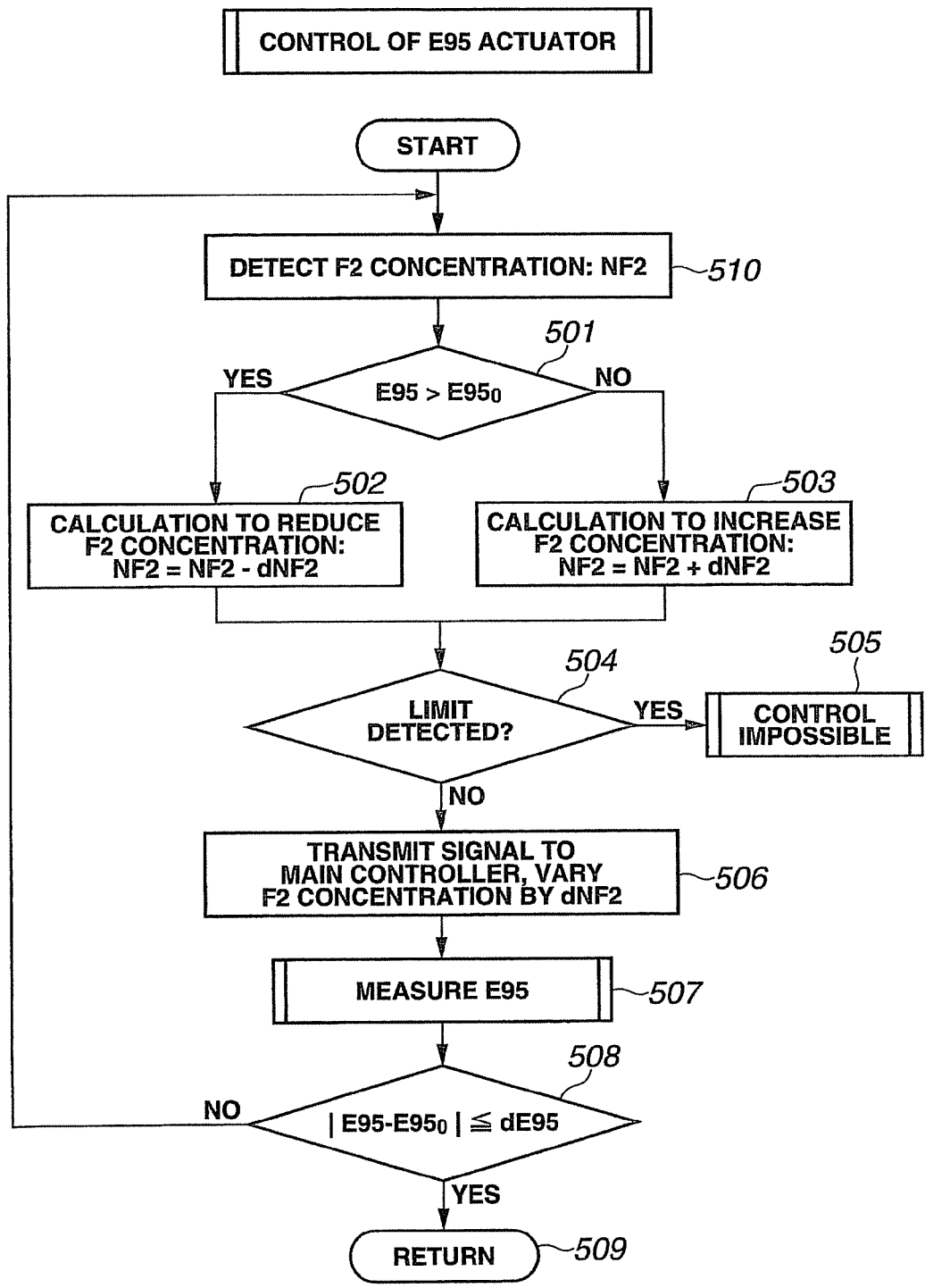
FIG. 18 is a flowchart showing a subroutine (fourth embodiment) for controlling the fluorine concentration.
Figure 19:
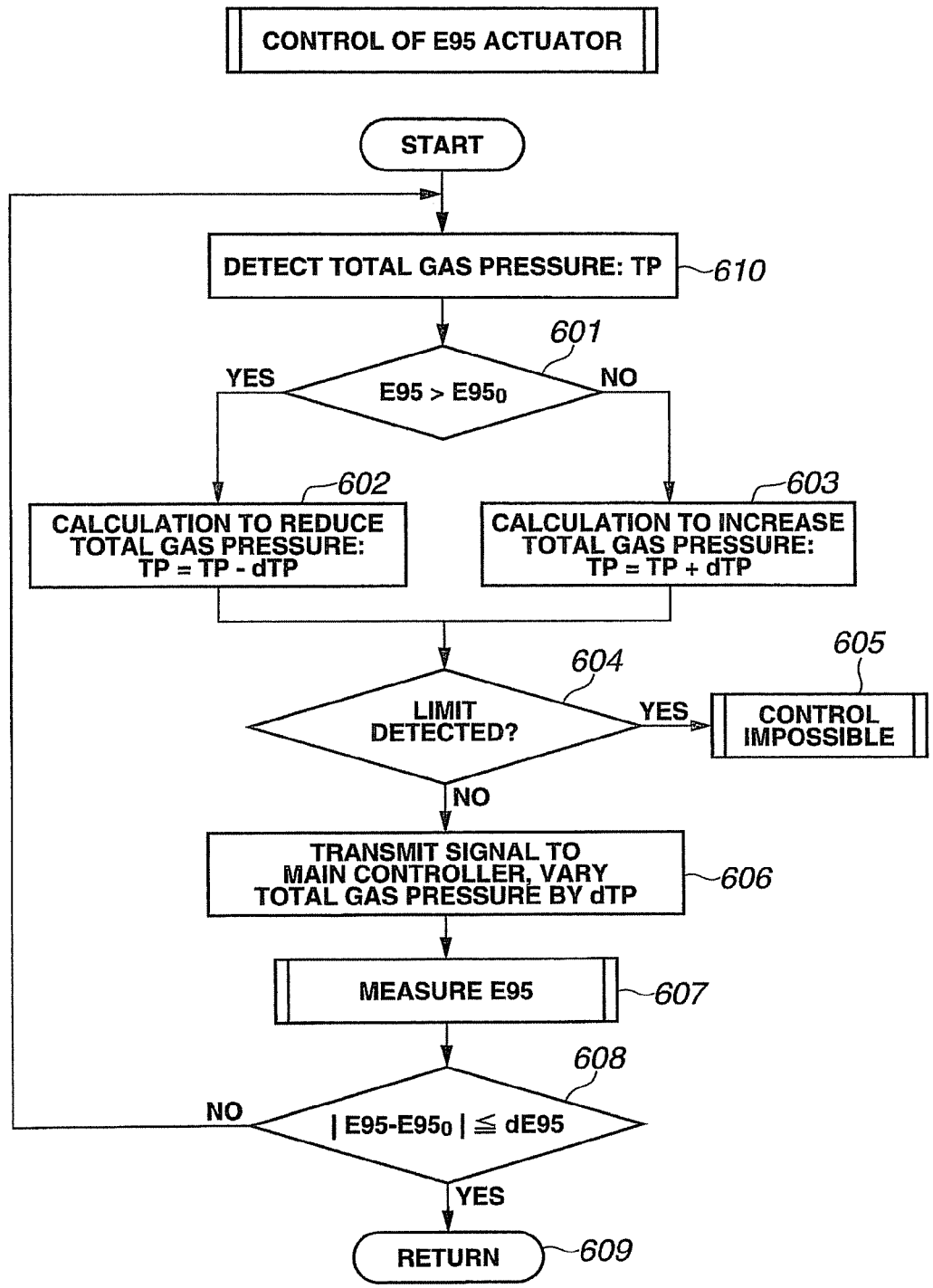
FIG. 19 is a flowchart showing a subroutine (fifth embodiment) for controlling a total gas pressure.
Figure 20:
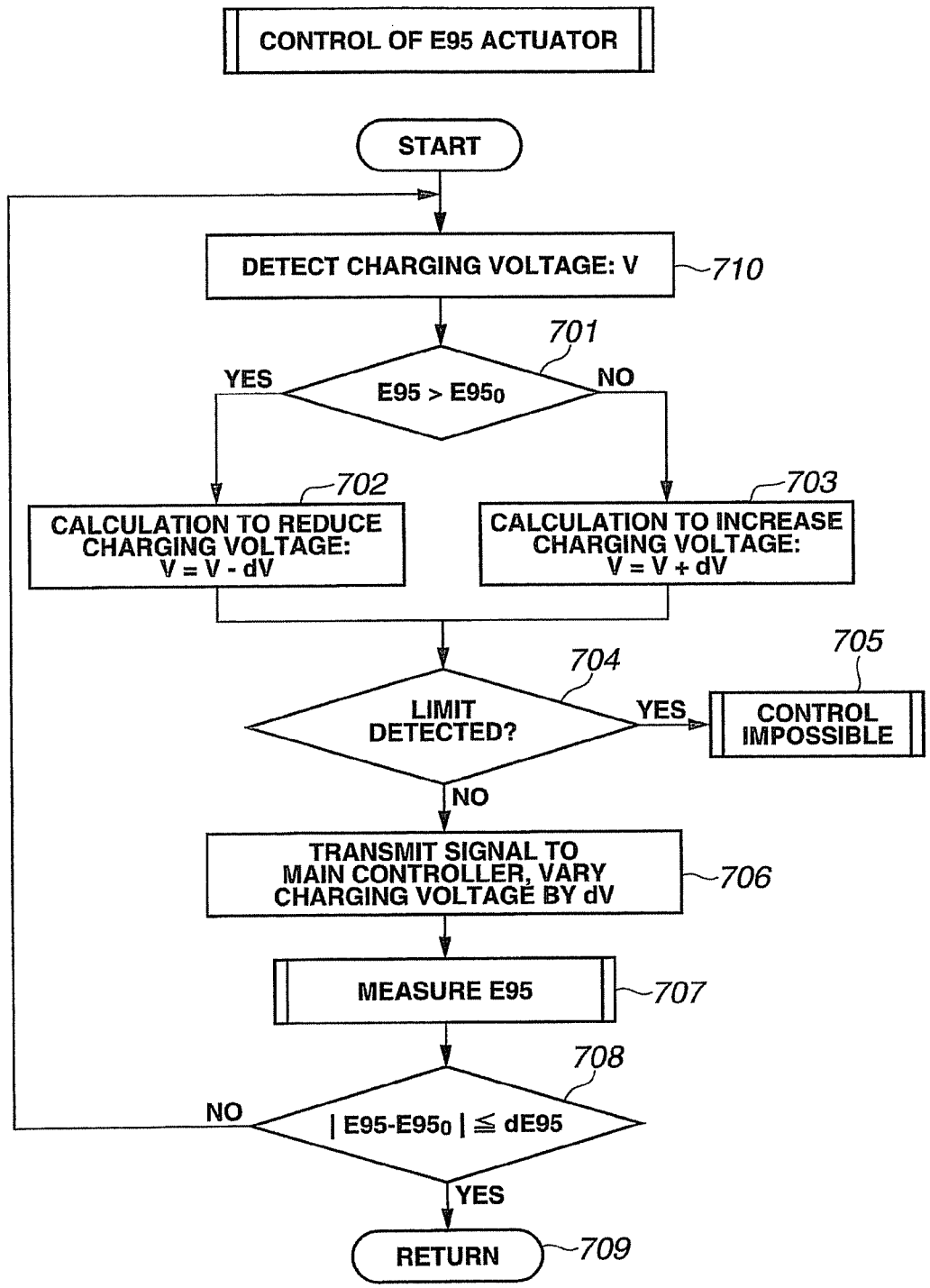
FIG. 20 is a flowchart showing a subroutine (sixth embodiment) for controlling a charging voltage.
Figure 21B:
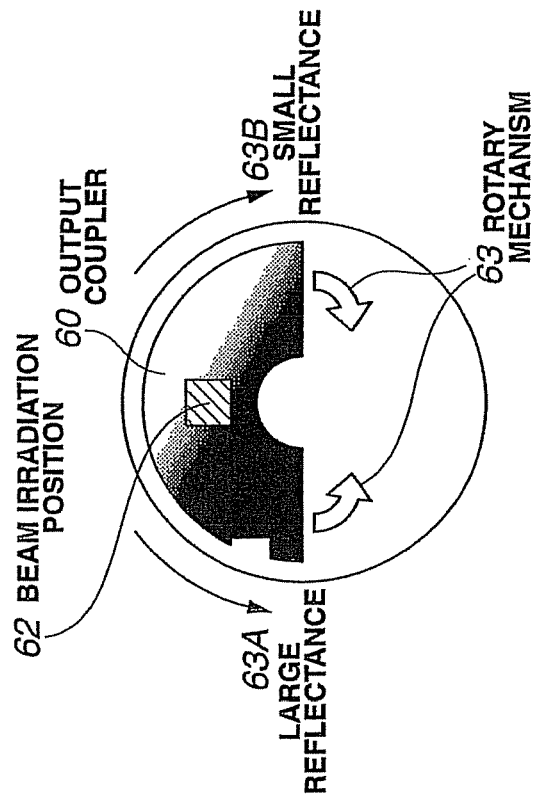
FIGS. 21A and 21B are views illustrating a method of varying the reflectance of an output coupler.
Figure 21A:
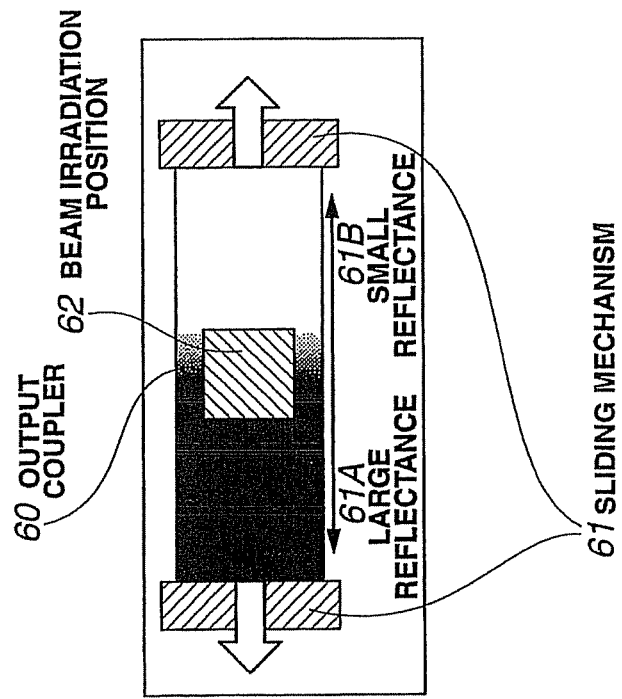
Figure 22A:
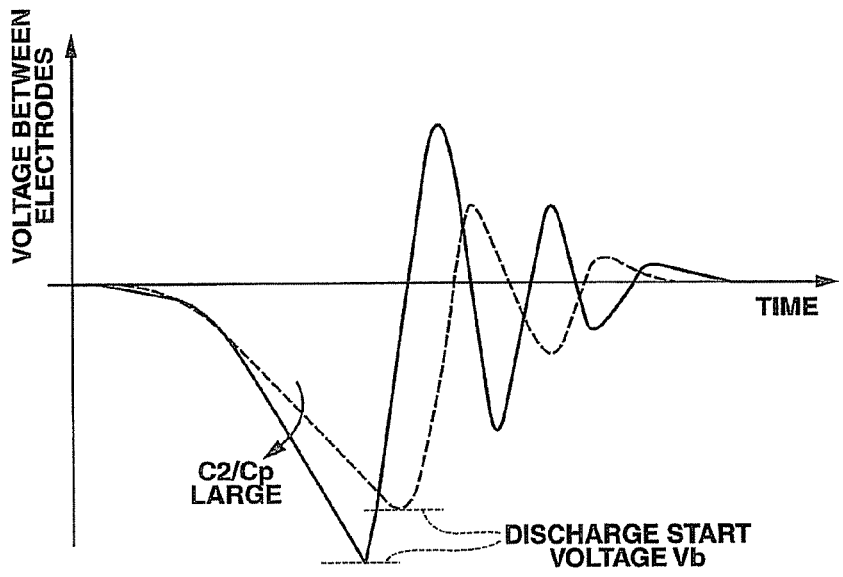
FIGS. 22A, 22B, and 22C are views showing variation in each pulse waveform according to a capacitor capacitance.
Figure 22B:
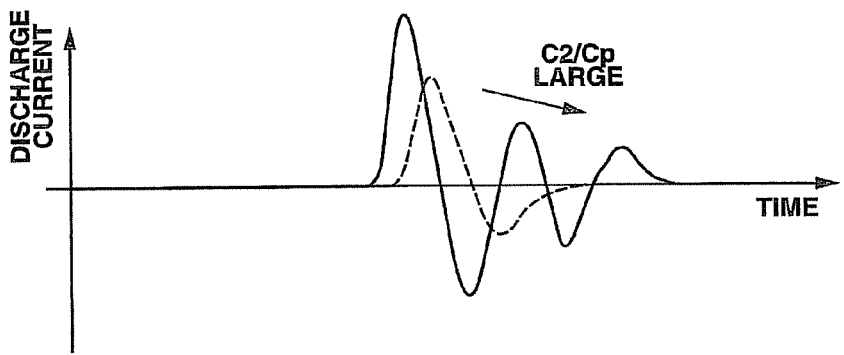
Figure 22C:
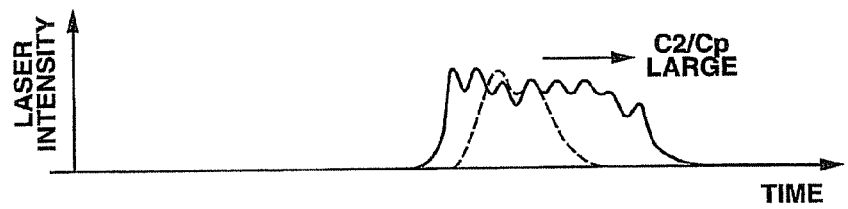
Figure 23:
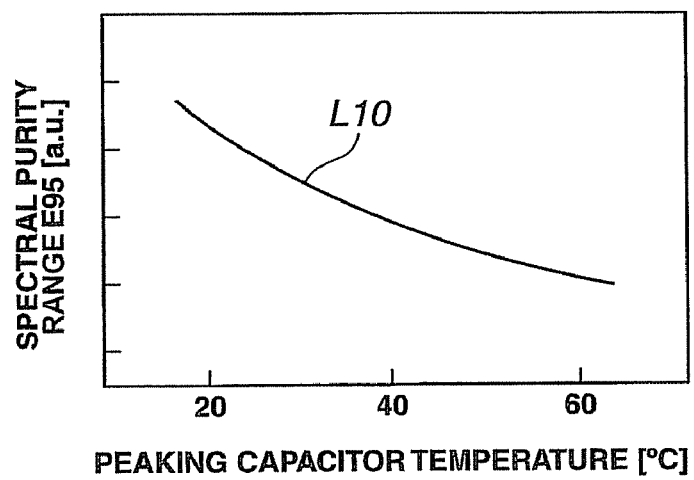
FIG. 23 is a view showing the relationship between a peaking capacitor capacitance and the spectral purity range.
Figure 24:
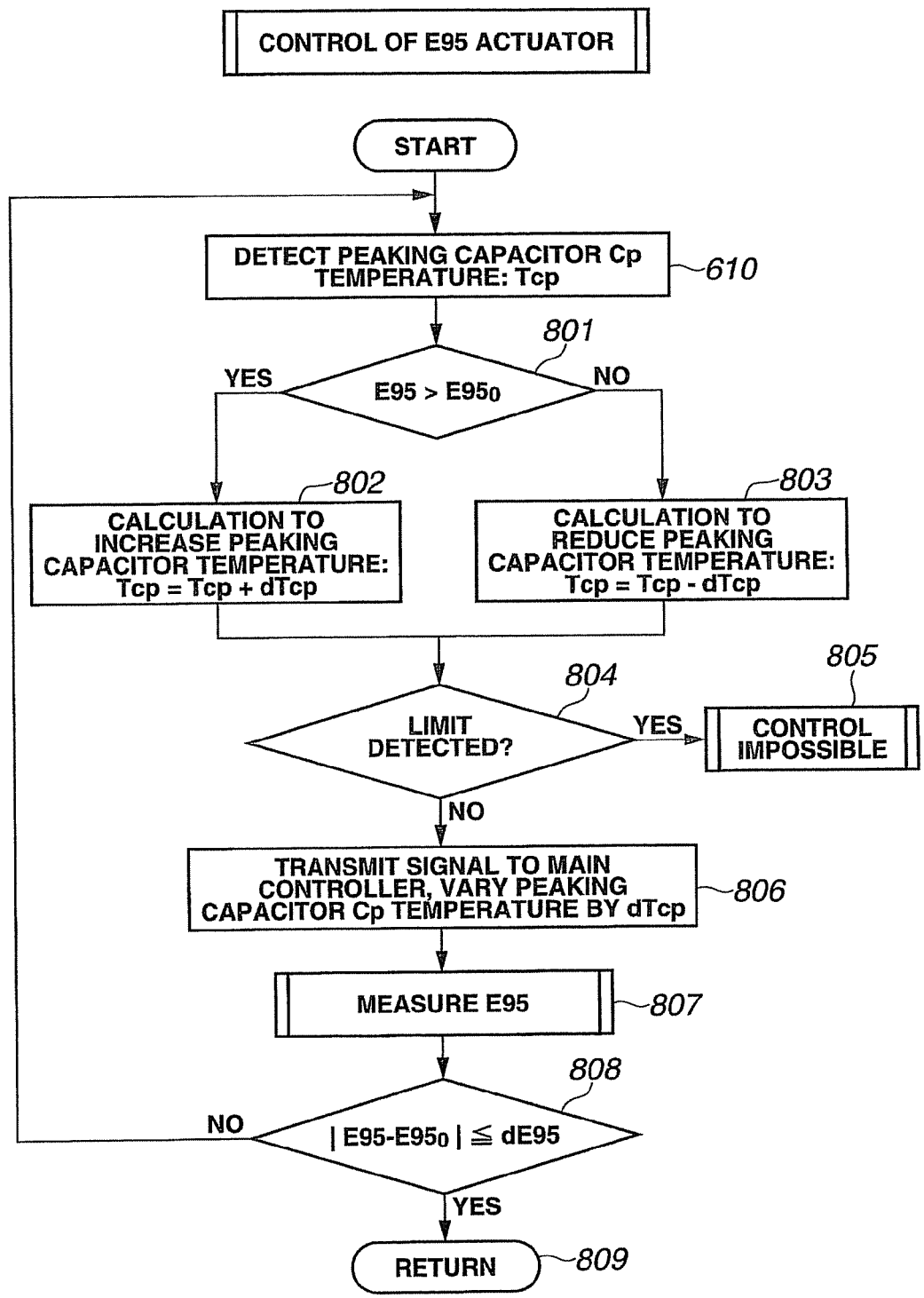
FIG. 24 is a flowchart showing a subroutine (ninth embodiment) for controlling the temperature of the peaking capacitor.
Figure 27:
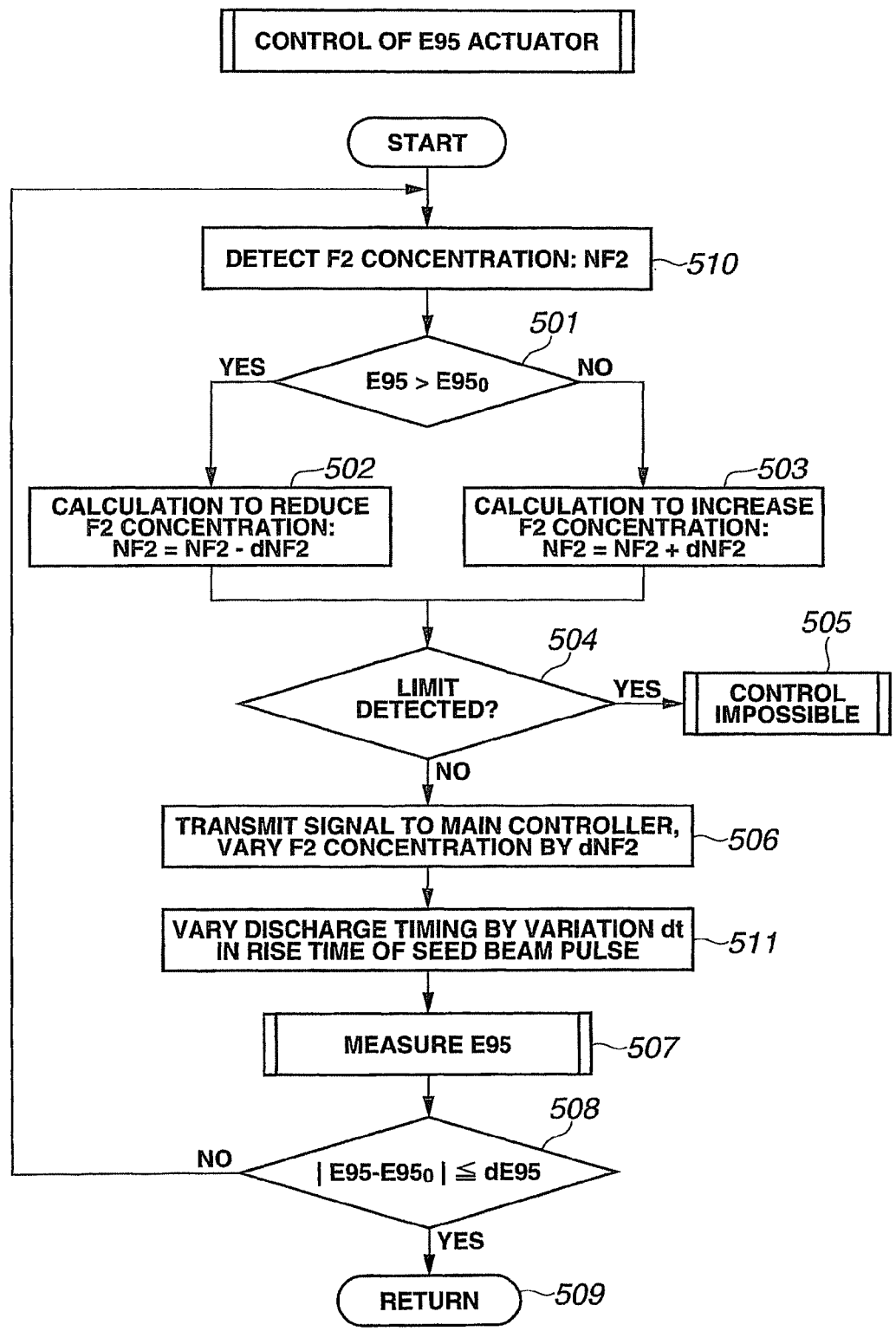
FIG. 27 is a flowchart showing a subroutine (eighth embodiment) of control for varying the discharge timing in accordance with variation in the pulse waveform of the seed beam.
Figure 28:
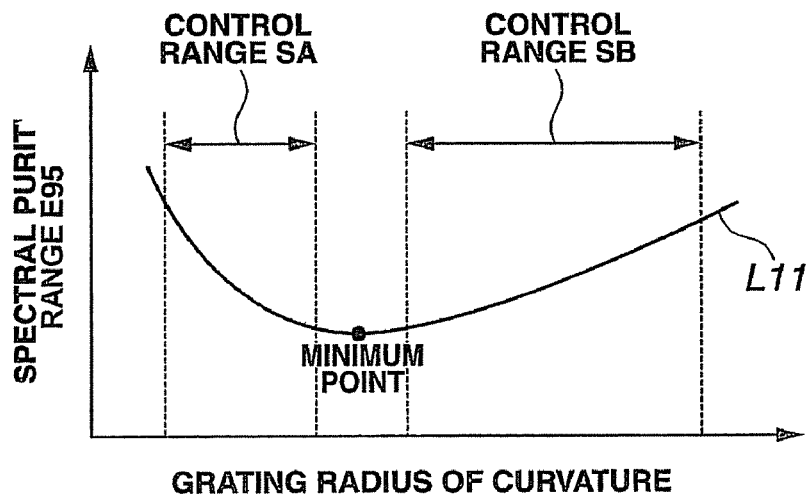
FIG. 28 is a view showing the relationship between the radius of curvature of a grating and the spectral purity range.
Figure 29:
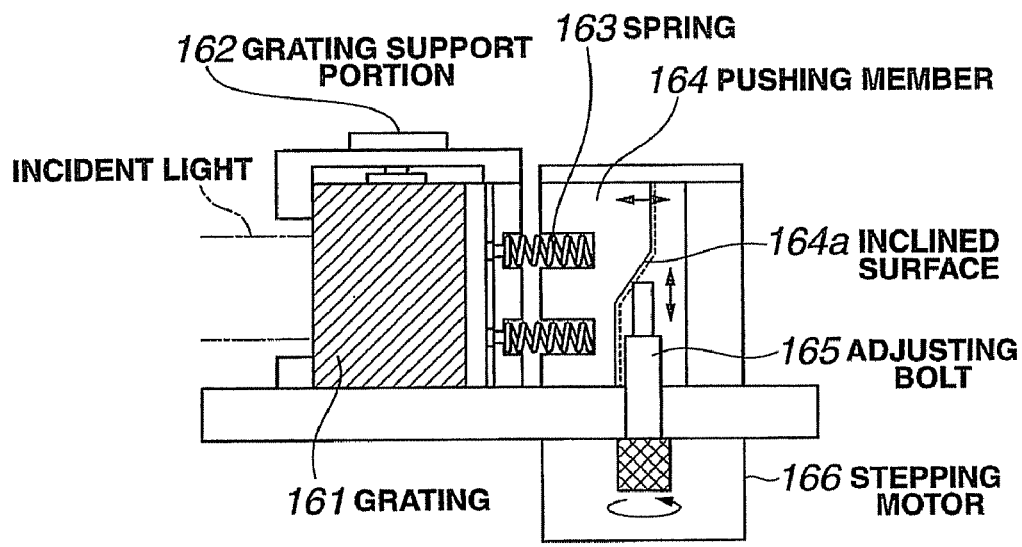
FIG. 29 is a view showing a grating bending mechanism.
Figure 30:
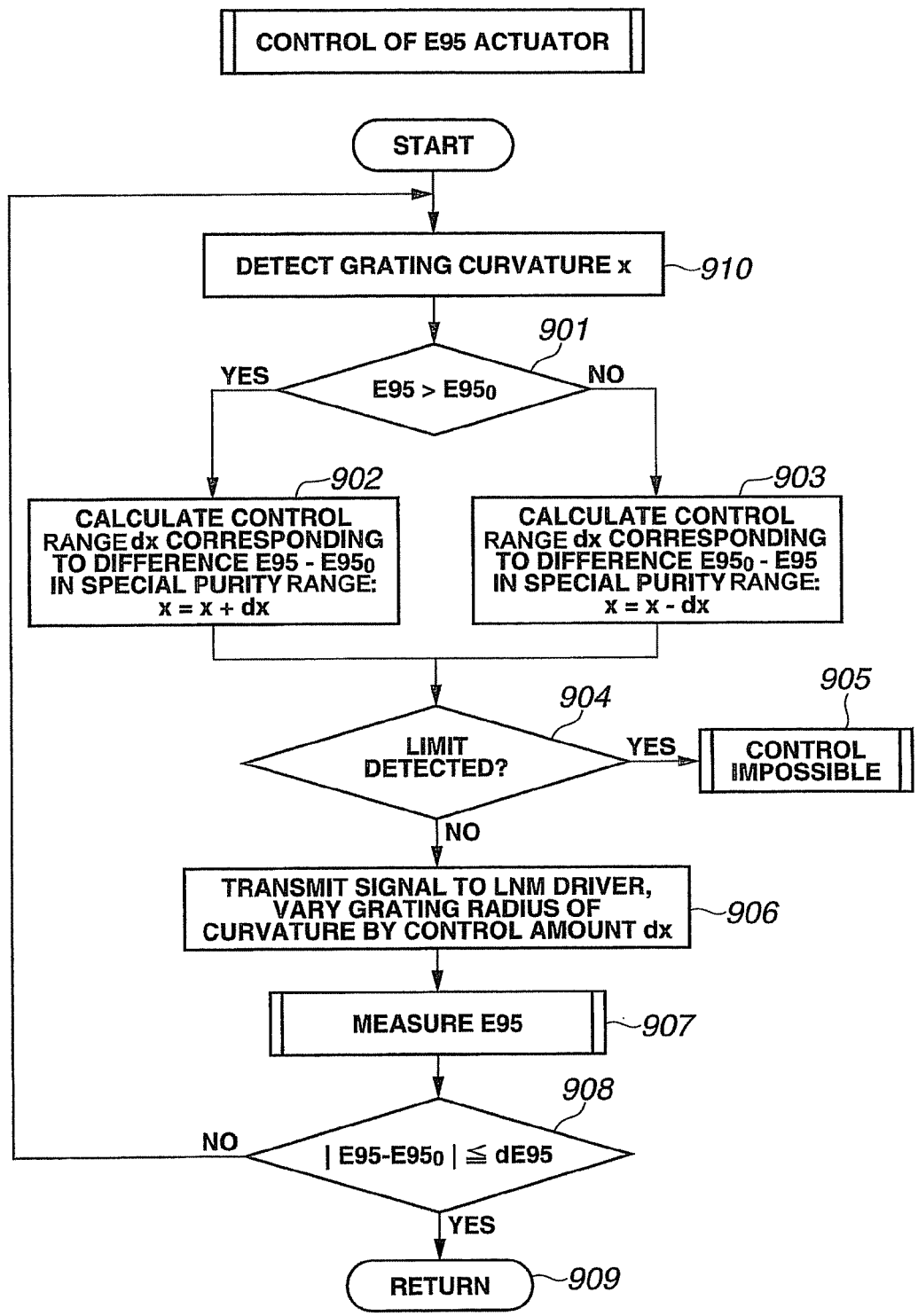
FIG. 30 is a flowchart showing a subroutine (eleventh embodiment) for controlling the spectral purity range through wavefront correction.
Figure 31:
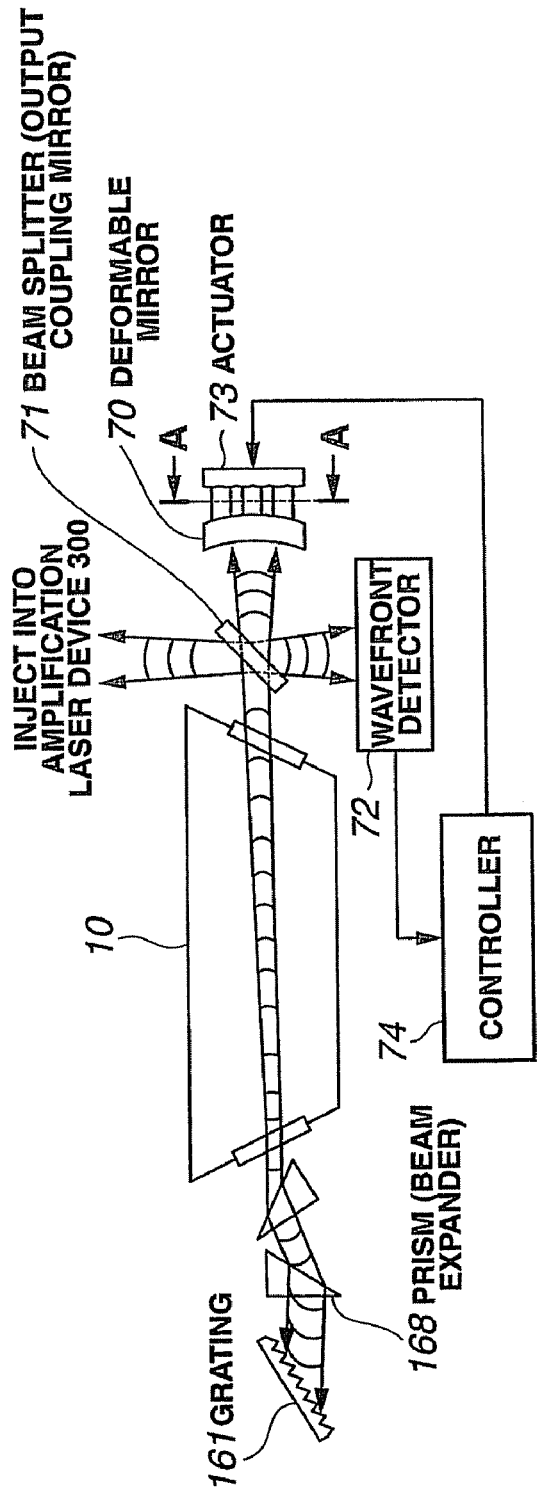
FIG. 31 is a view showing an example of a laser wavefront control system using a deformable mirror.
Figure 32:
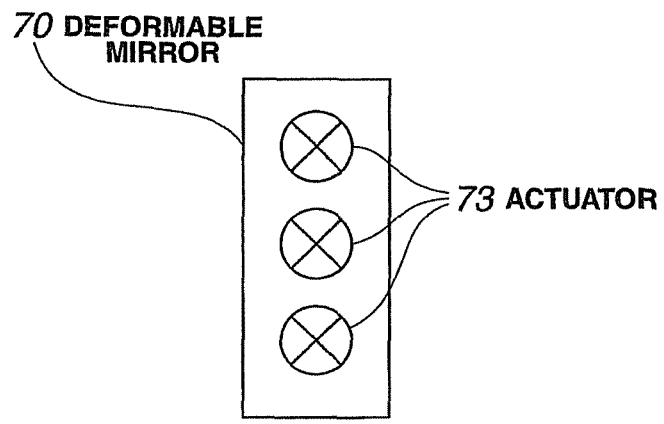
FIG. 32 is a view showing a line type deformable mirror.
Figure 33:
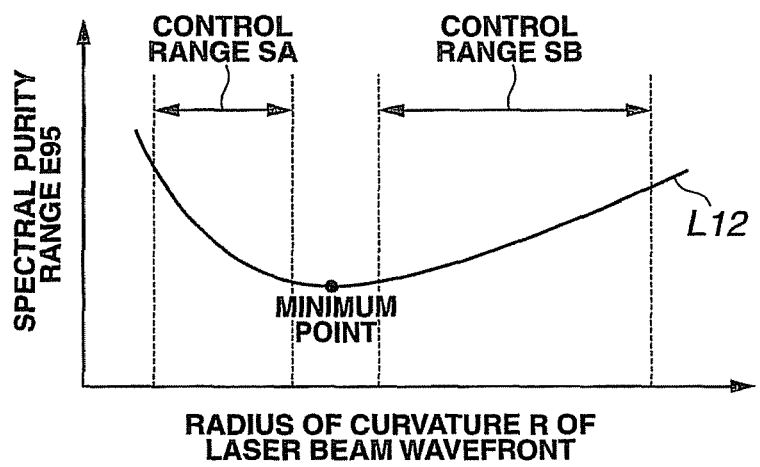
FIG. 33 is a view showing the relationship between the radius of curvature of a laser beam wavefront and the spectral purity range.
Figure 34:
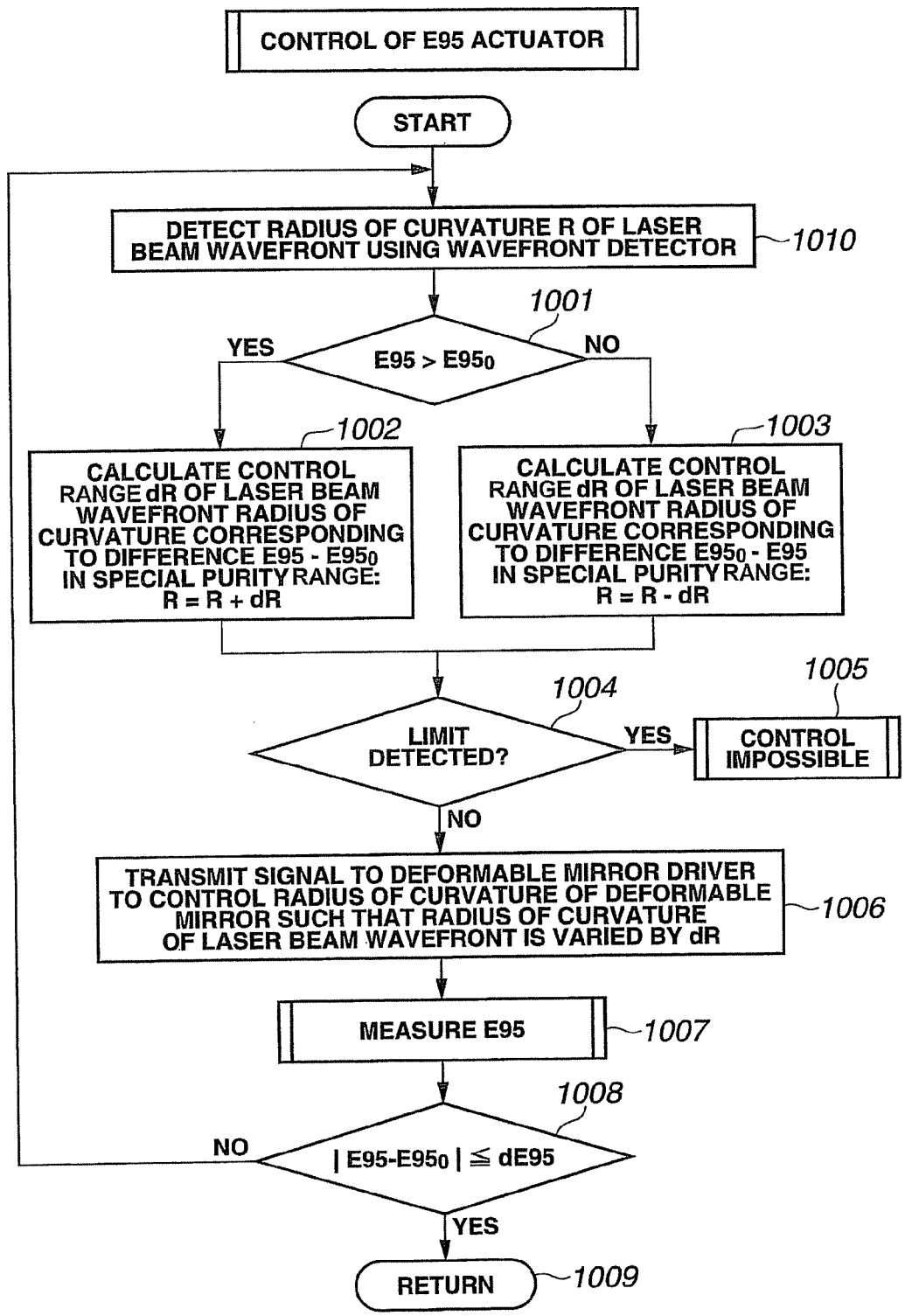
FIG. 34 is a flowchart showing a subroutine (twelfth embodiment) for controlling the spectral purity range through wavefront correction.
Figure 35A:
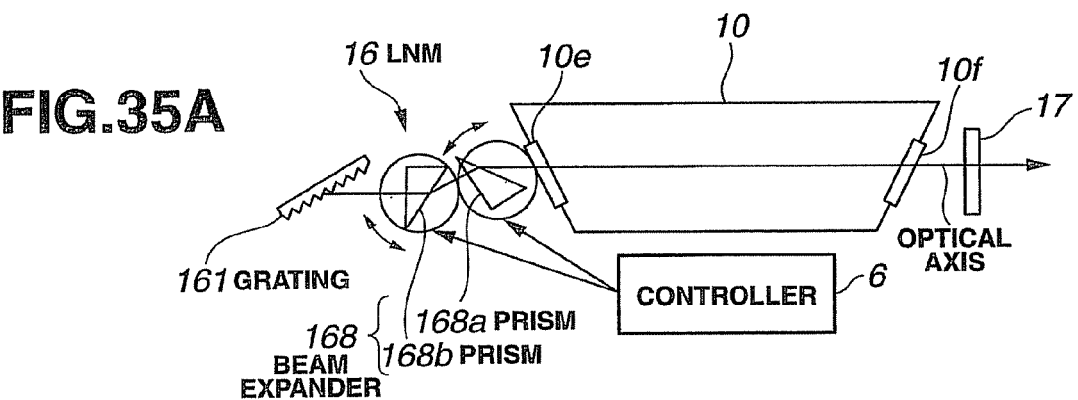
FIGS. 35A and 35B are views illustrating spectral purity range control through modification of an expanding ratio (magnification)
Figure 35B:
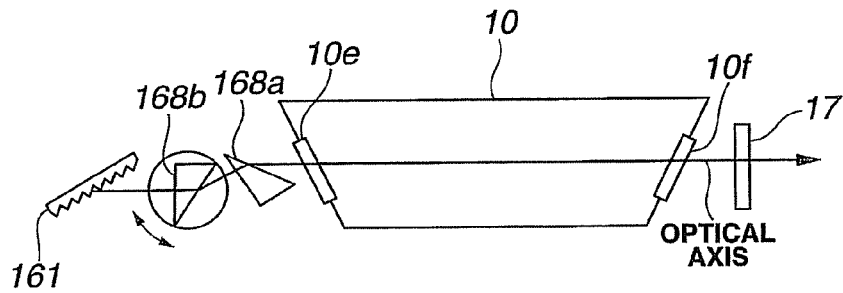
Figure 36:
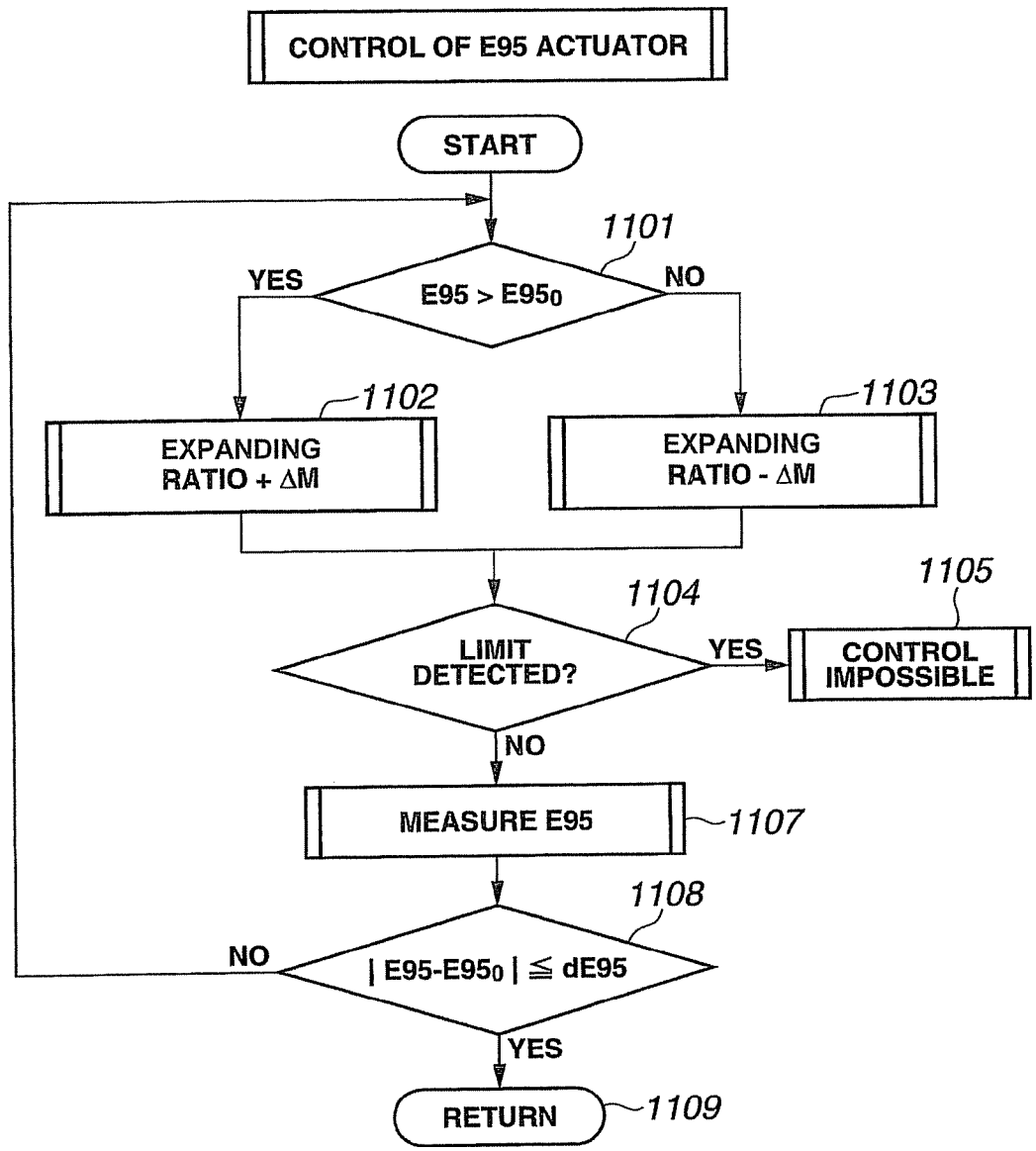
FIG. 36 is a flowchart showing a subroutine (thirteenth embodiment) for controlling the spectral purity range through modification of the expanding ratio (magnification)
Figure 37:
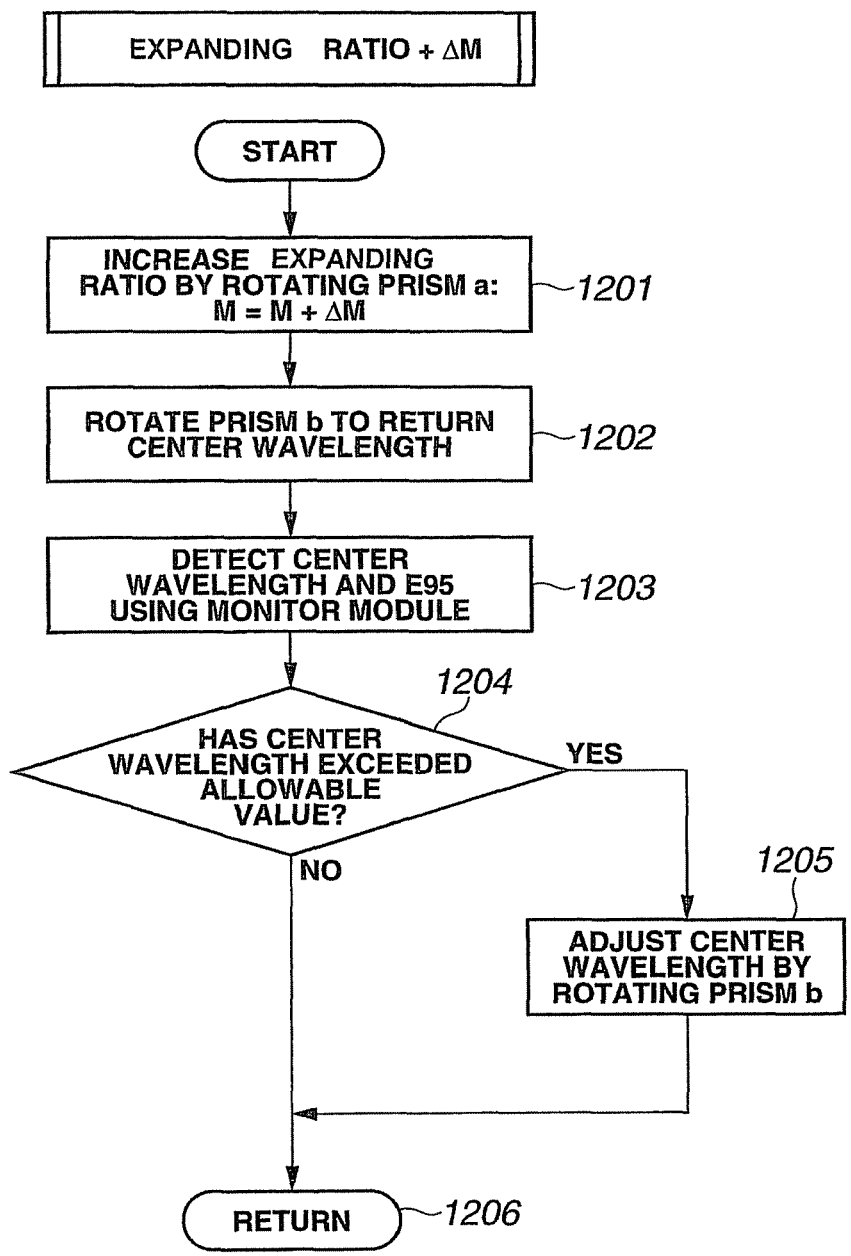
FIG. 37 is a flowchart showing a subroutine of control for increasing the expanding ratio.
Figure 38:
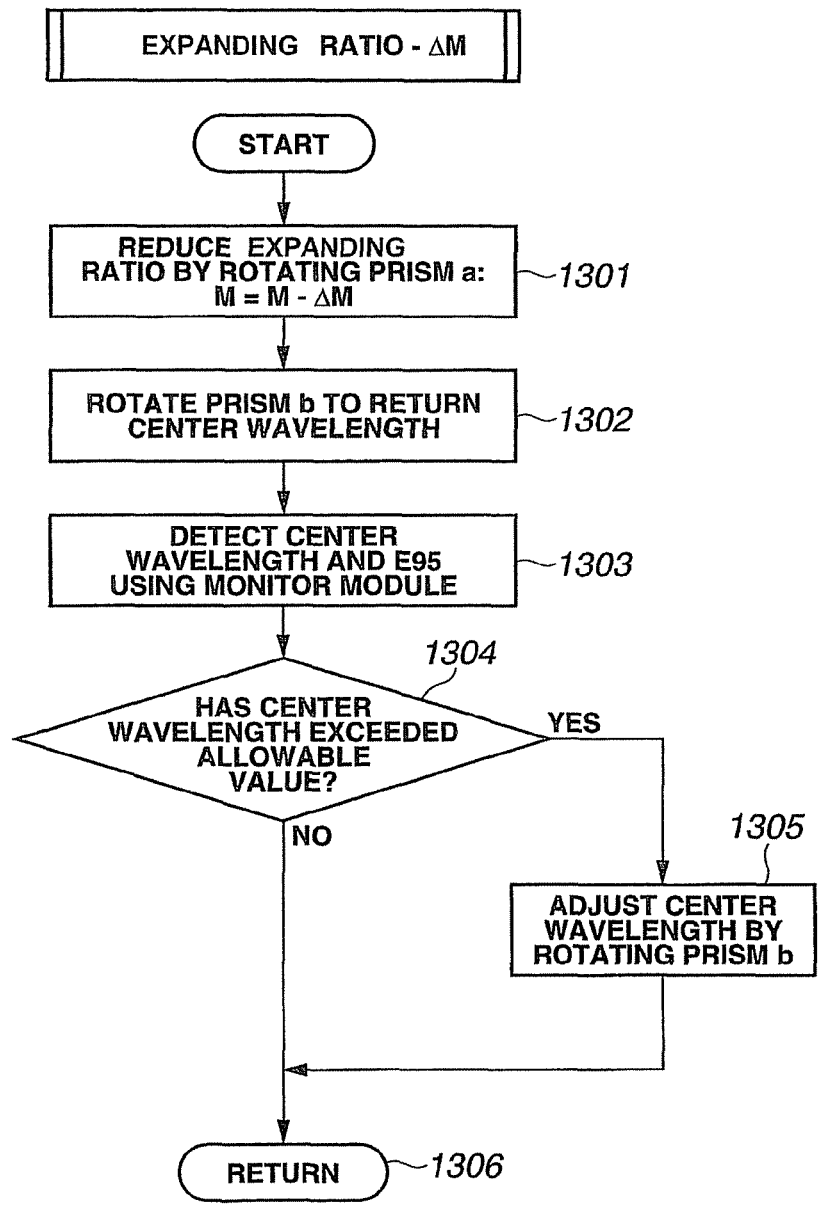
FIG. 38 is a flowchart showing a subroutine of control for reducing the expanding ratio.
Figure 39A:
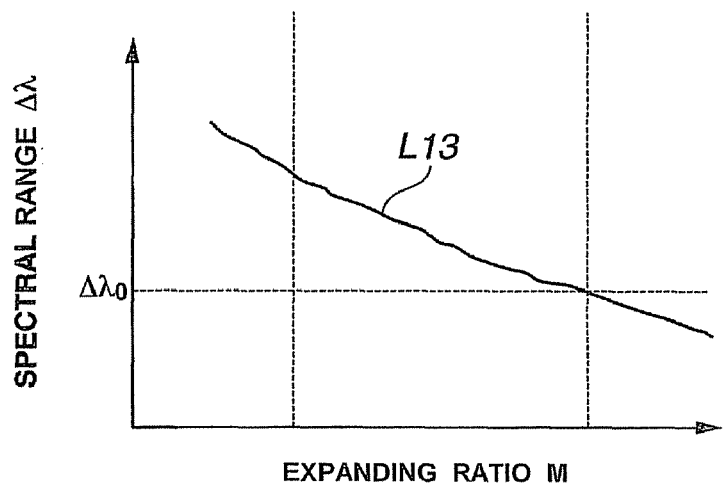
FIGS. 39A and 39B are views showing the relationship of the expanding ratio and the spectral range with the output power of an oscillation laser device.
Figure 39B:
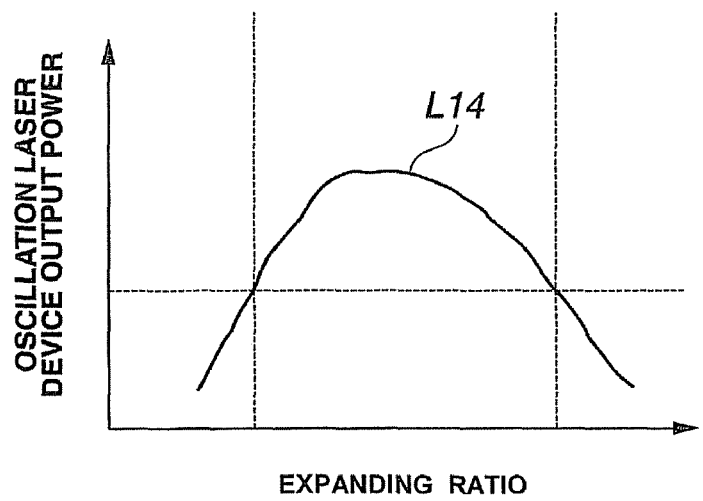
Figure 40:
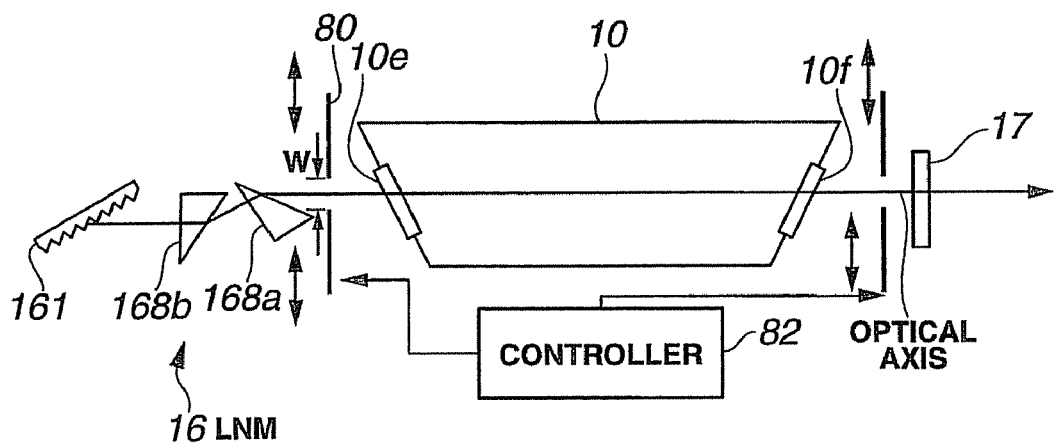
FIG. 40 is a view illustrating spectral range control corresponding to a slit width.
Figure 41:
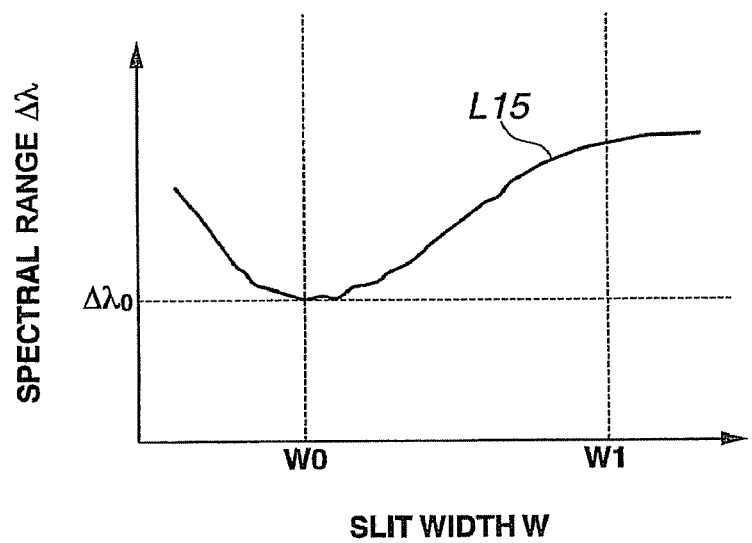
FIG. 41 is a view showing the relationship between the slit width and the spectral range.
Figure 42:
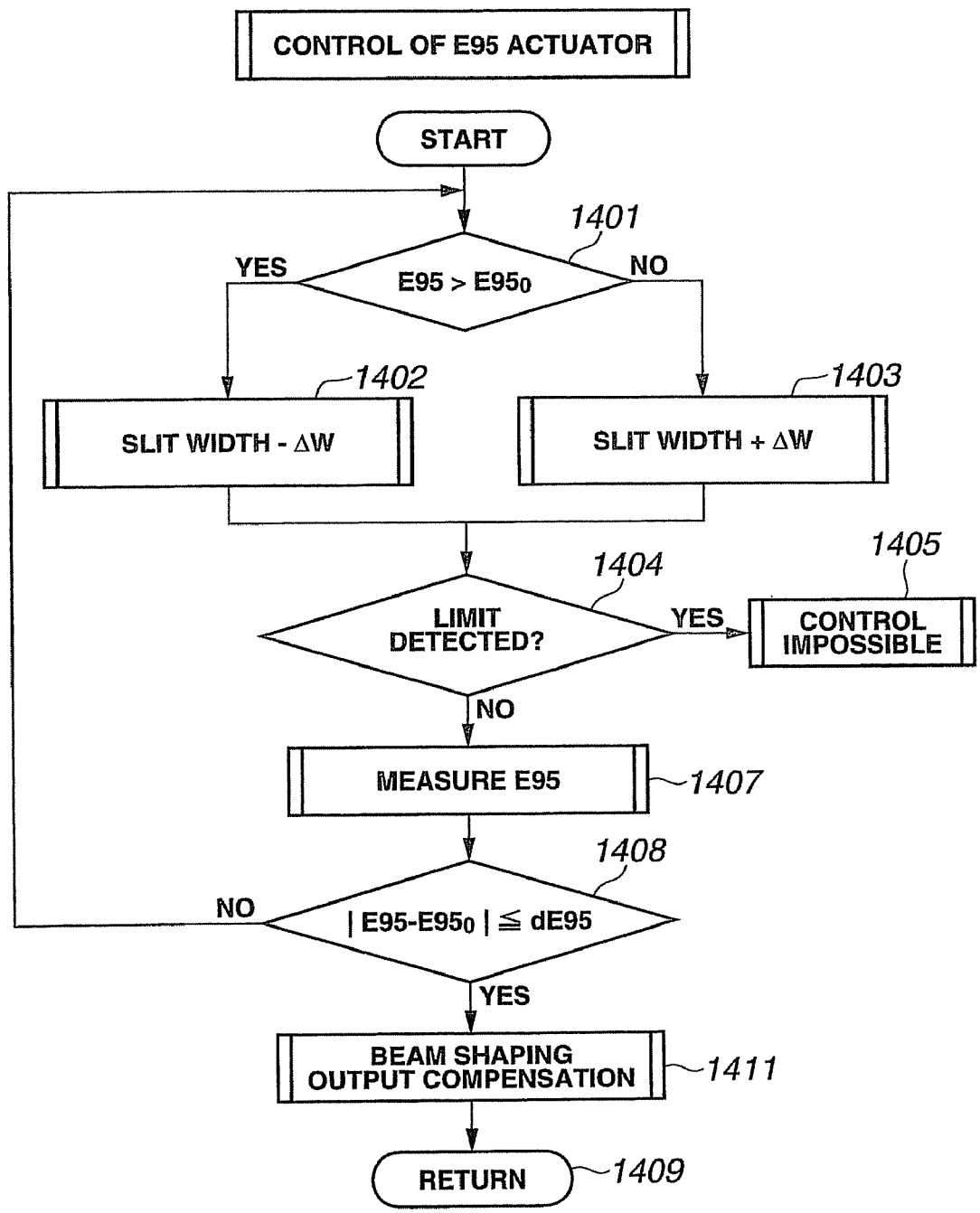
FIG. 42 is a flowchart showing a subroutine (fourteenth embodiment) for controlling the spectral purity range through slit control.
Figure 43:
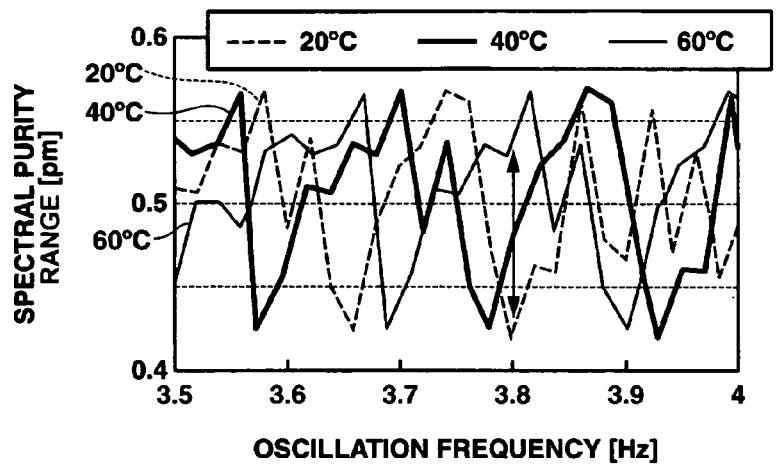
FIG. 43 is a view showing the manner in which an oscillation frequency and the spectral purity range vary in accordance with a gas temperature.
Figure 44:
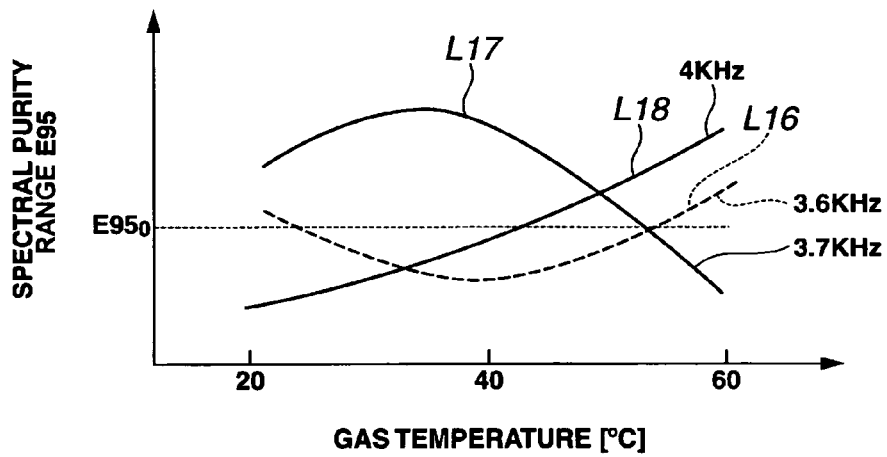
FIG. 44 is a view showing the relationship between the gas temperature and the spectral purity range.
Figure 45:
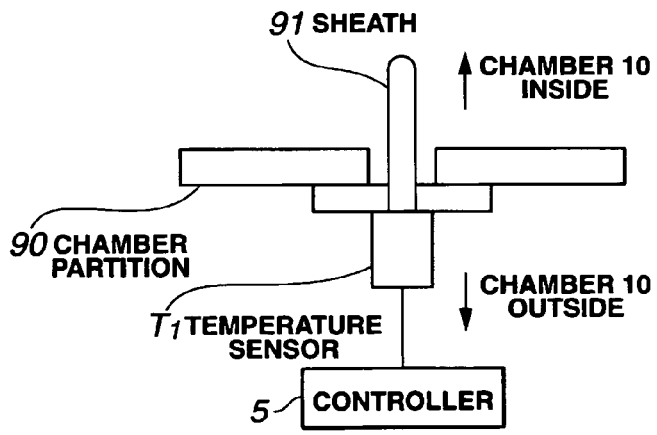
FIG. 45 is a view showing a constitutional example of a temperature sensor.
Figure 46:
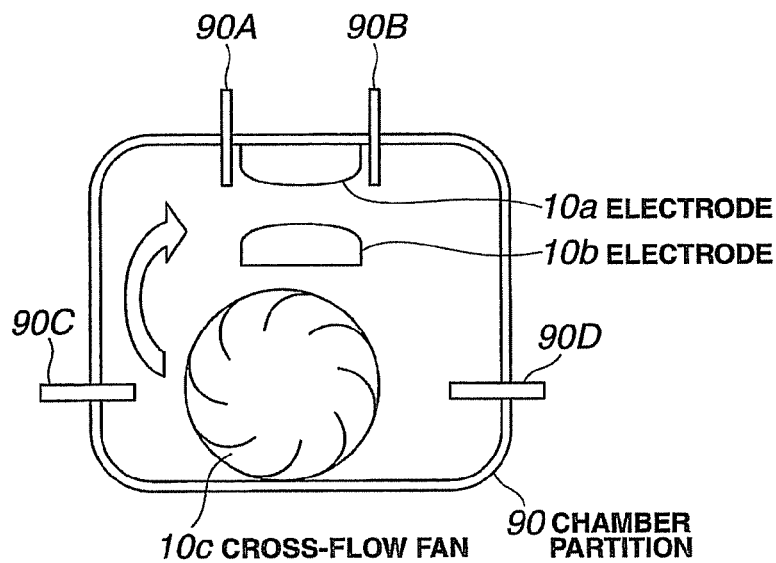
FIG. 46 is a view showing a constitutional example of a temperature sensor.
Figure 47:
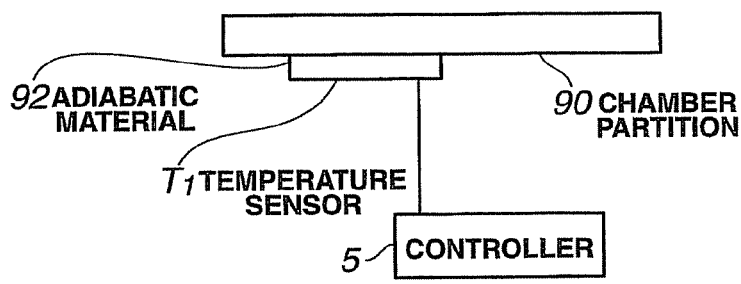
FIG. 47 is a view showing a constitutional example of a temperature sensor.
Figure 48:
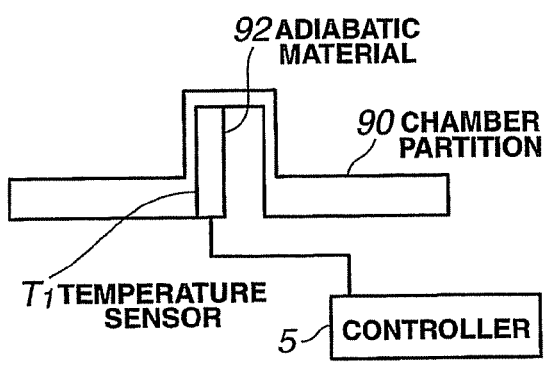
FIG. 48 is a view showing a constitutional example of a temperature sensor.
Figure 49:
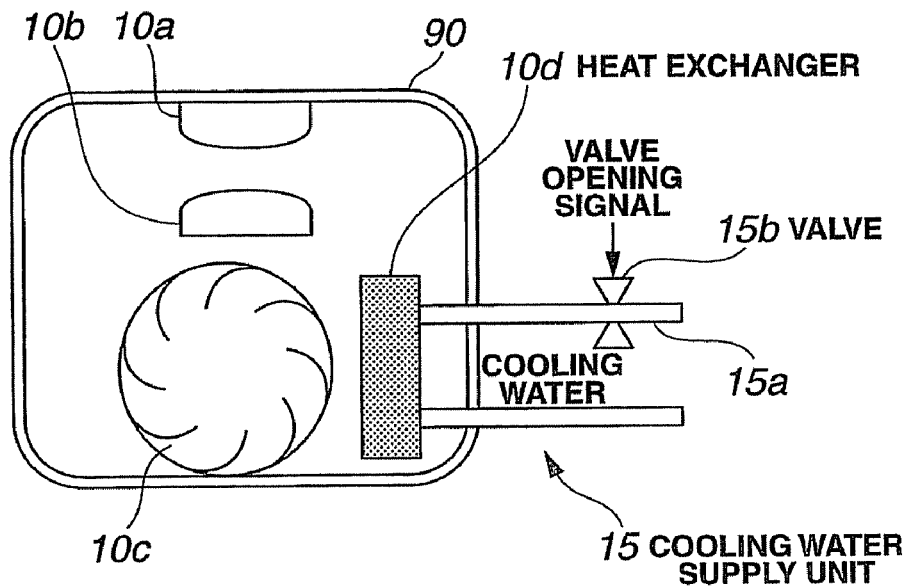
FIG. 49 is a view showing an example of a constitution for varying the gas temperature.
Figure 50:
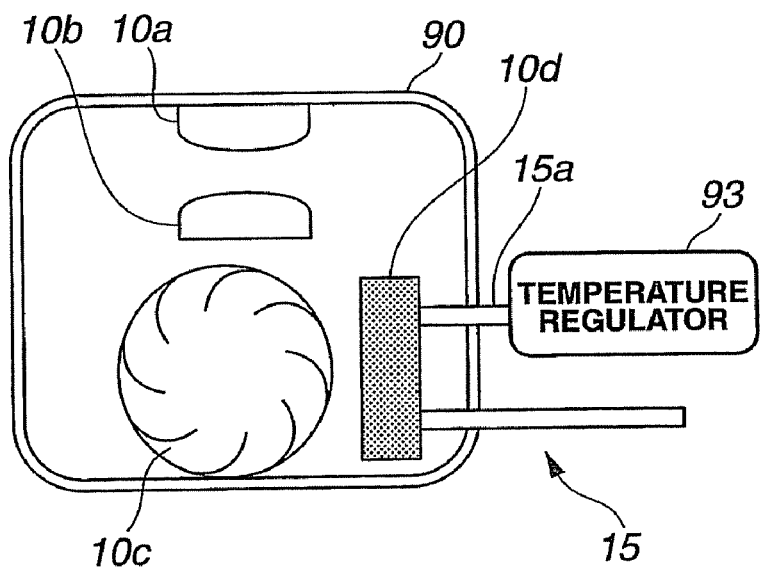
FIG. 50 is a view showing an example of a constitution for varying the gas temperature.
Figure 51:
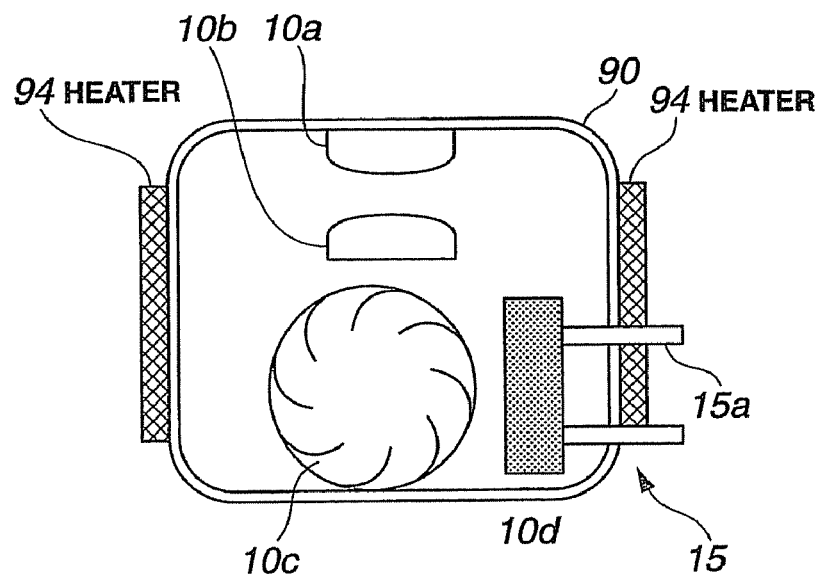
FIG. 51 is a view showing an example of a constitution for varying the gas temperature.
Figure 52:
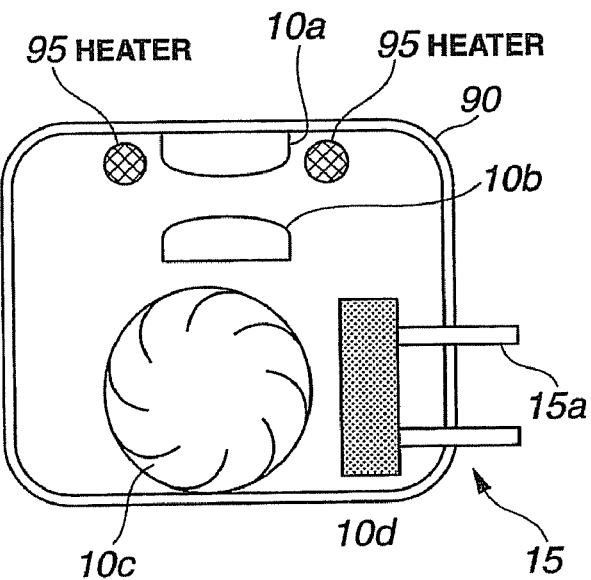
FIG. 52 is a view showing an example of a constitution for varying the gas temperature.
Figure 53:
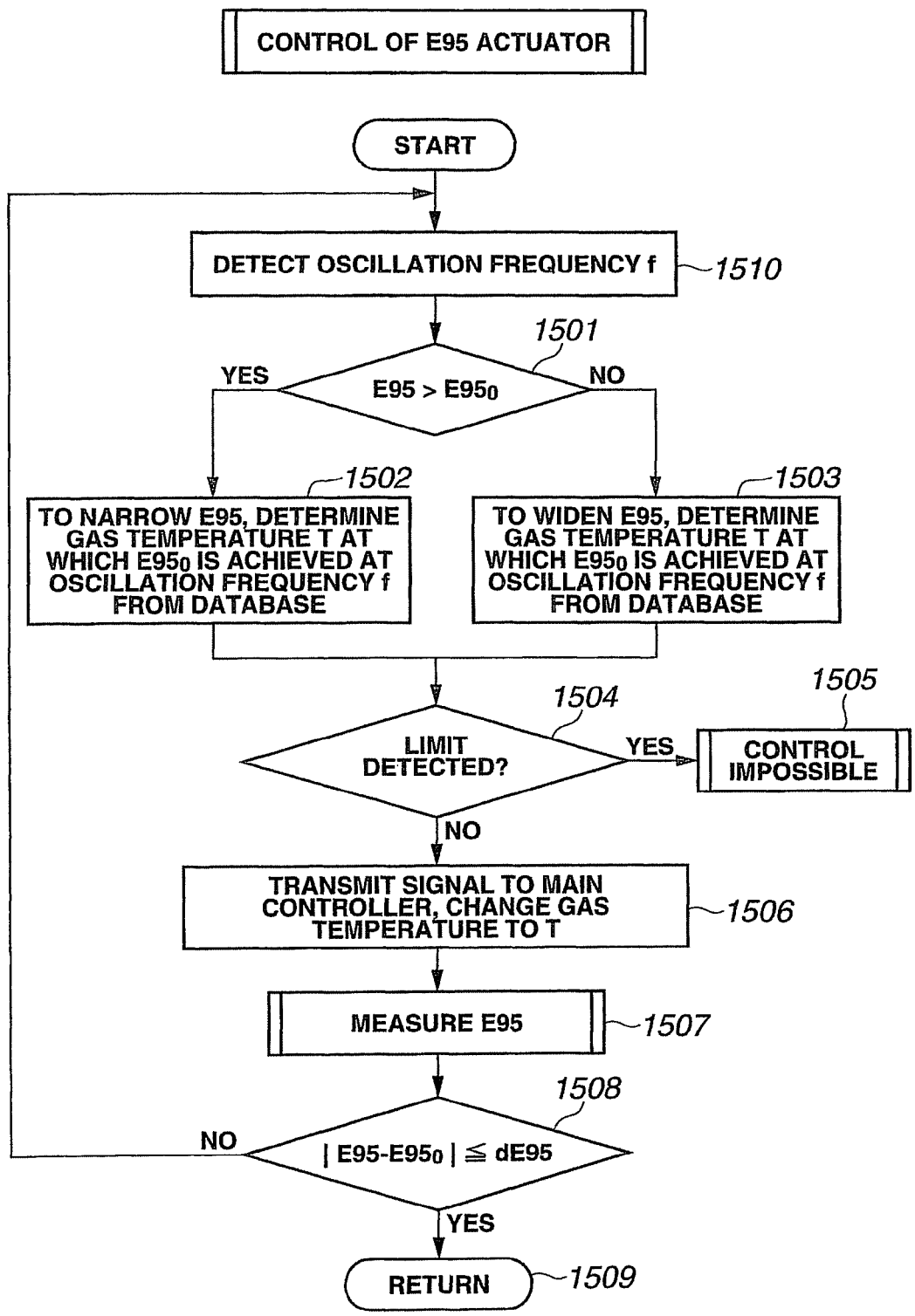
FIG. 53 is a flowchart showing a subroutine (fifteenth embodiment) for controlling the spectral purity range through control of the gas temperature.
Figure 54:
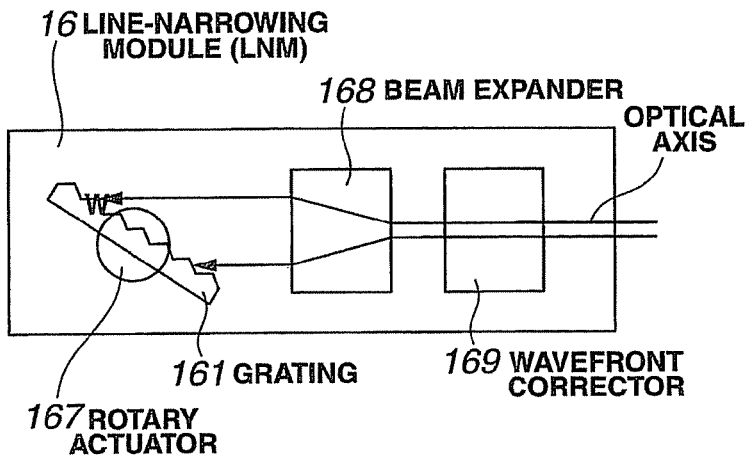
FIG. 54 is a view showing a constitutional example of a spectrum-narrowing module using a wavefront corrector.
Figure 55A:
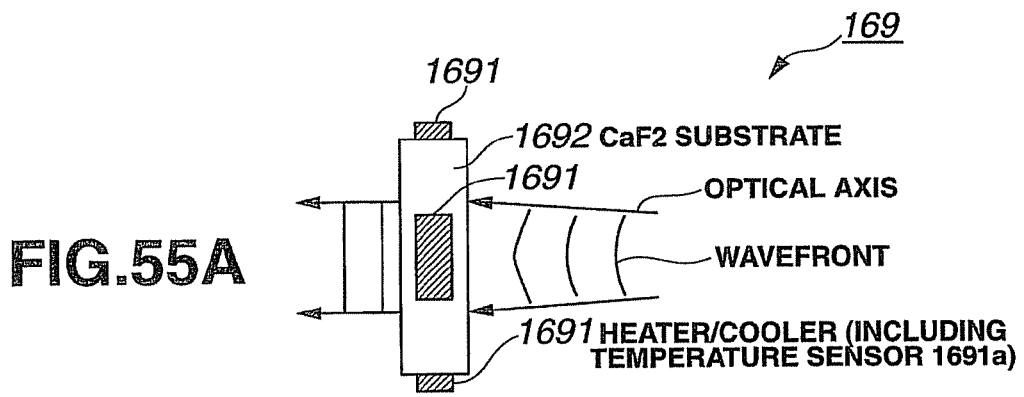
FIGS. 55A and 55B are views showing constitutional examples of the wavefront corrector.
Figure 55B:
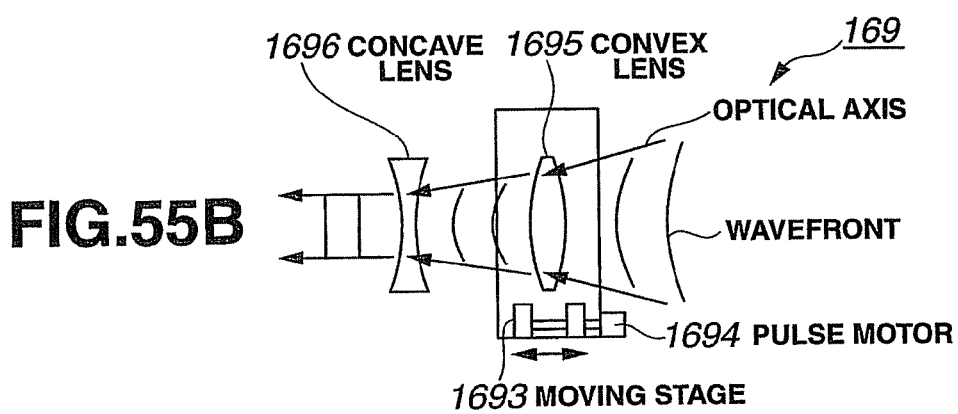
Figure 57:
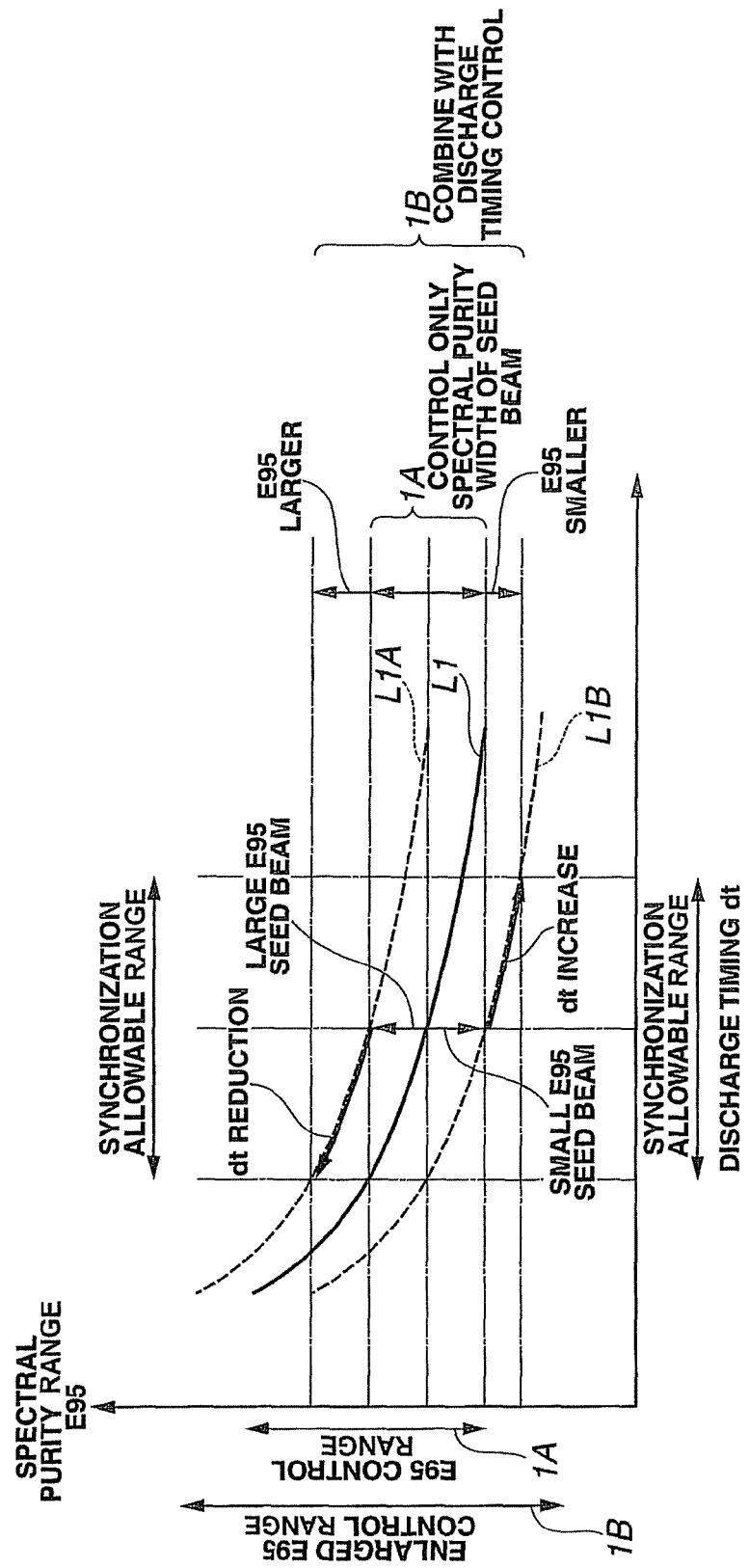
FIG. 57 is a view illustrating the effects of combining discharge timing control and control of the spectral purity range of the seed beam.
Figure 58:
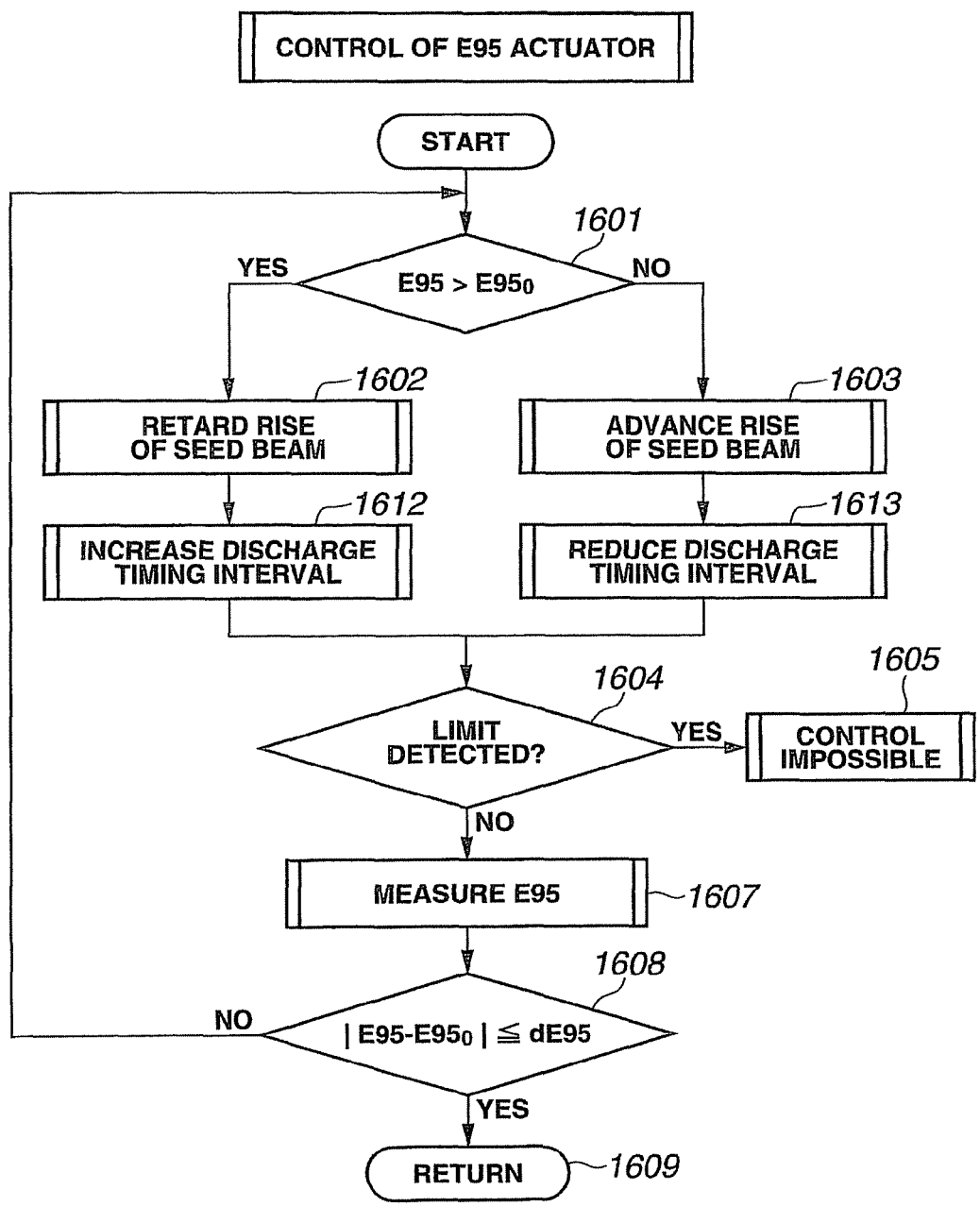
FIG. 58 is a flowchart showing a subroutine (sixteenth embodiment) of spectral purity range control combining pulse waveform control and discharge timing control.
Figure 59:
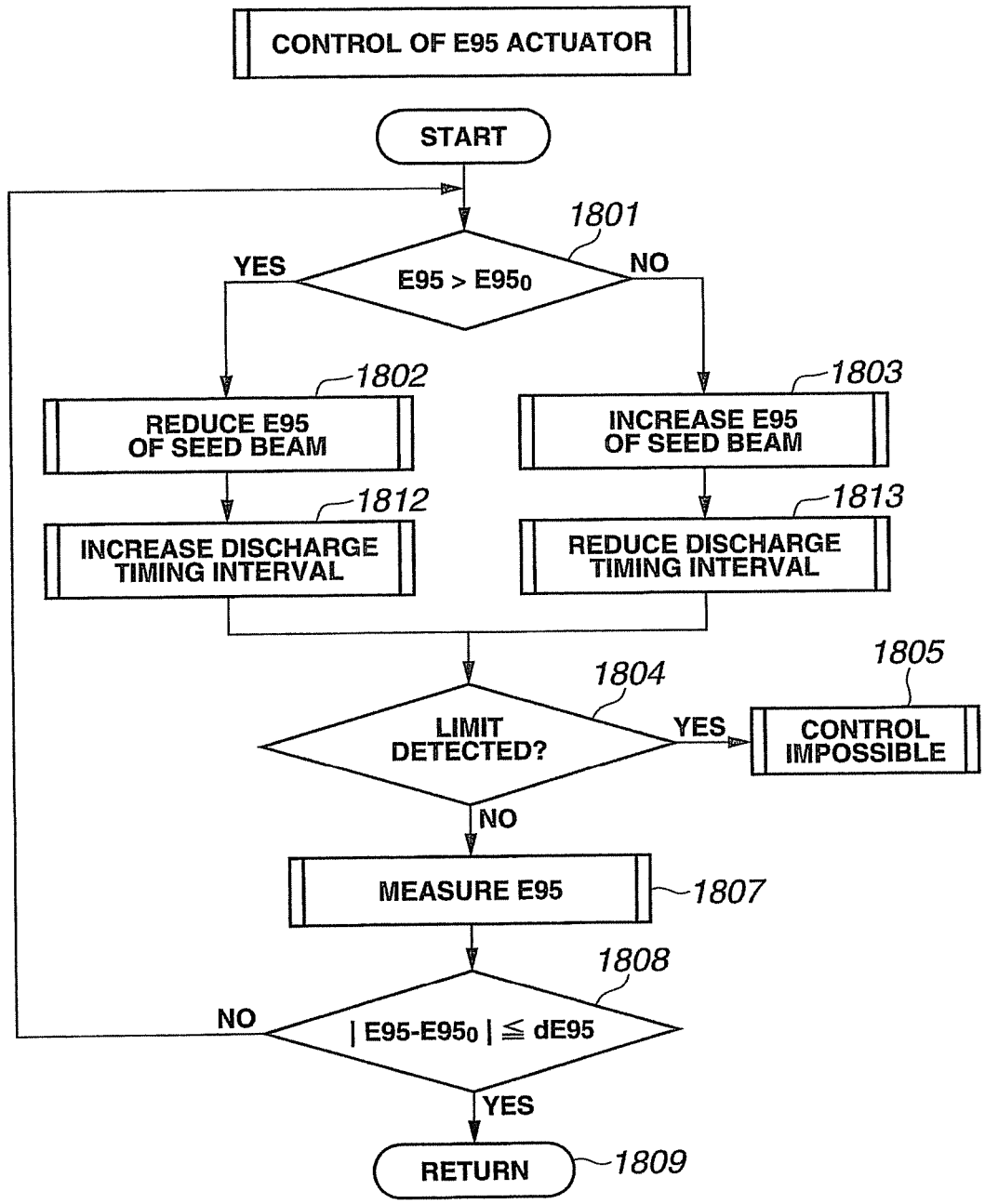
FIG. 59 is a flowchart showing a subroutine (eighteenth embodiment) of spectral purity range control combining control of the spectral purity range of the seed beam and discharge timing control.
Figure 60:
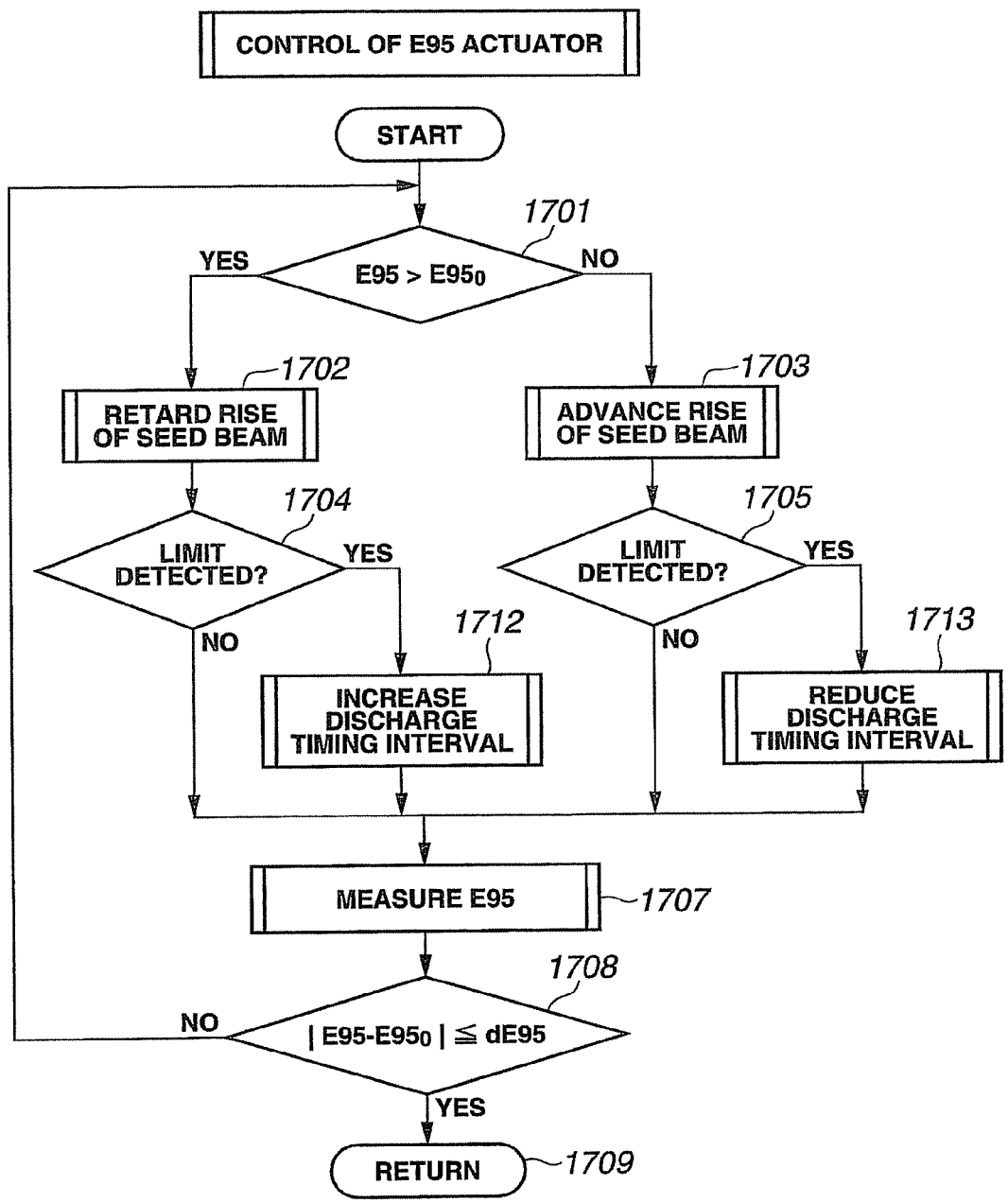
FIG. 60 is a flowchart showing a subroutine (seventeenth embodiment) of spectral purity range control combining pulse waveform control and discharge timing control.
Figure 61:
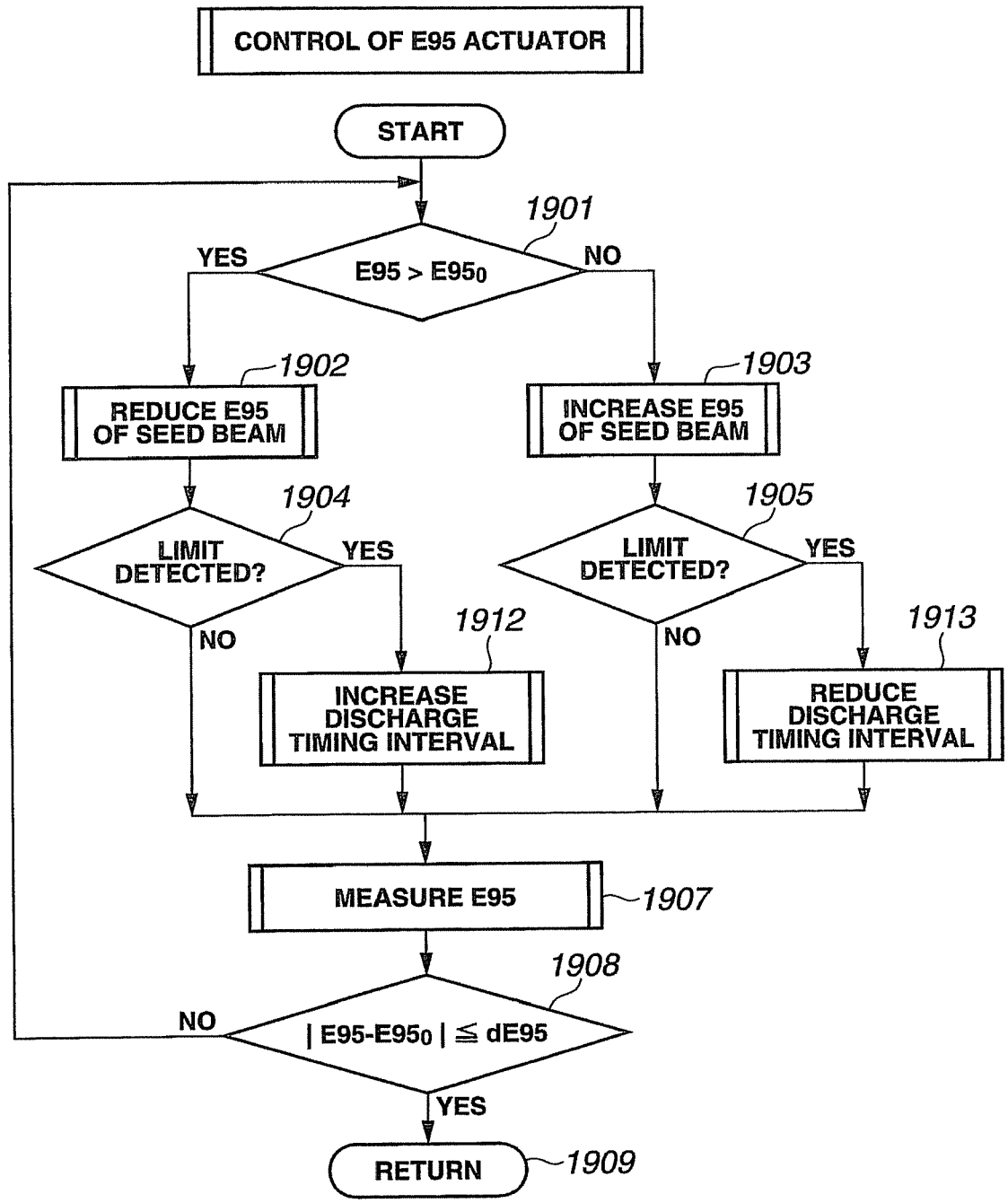
FIG. 61 is a flowchart showing a subroutine (nineteenth embodiment) of spectral purity range control combining control of the spectral purity range of the seed beam and discharge timing control.
Figure 64:
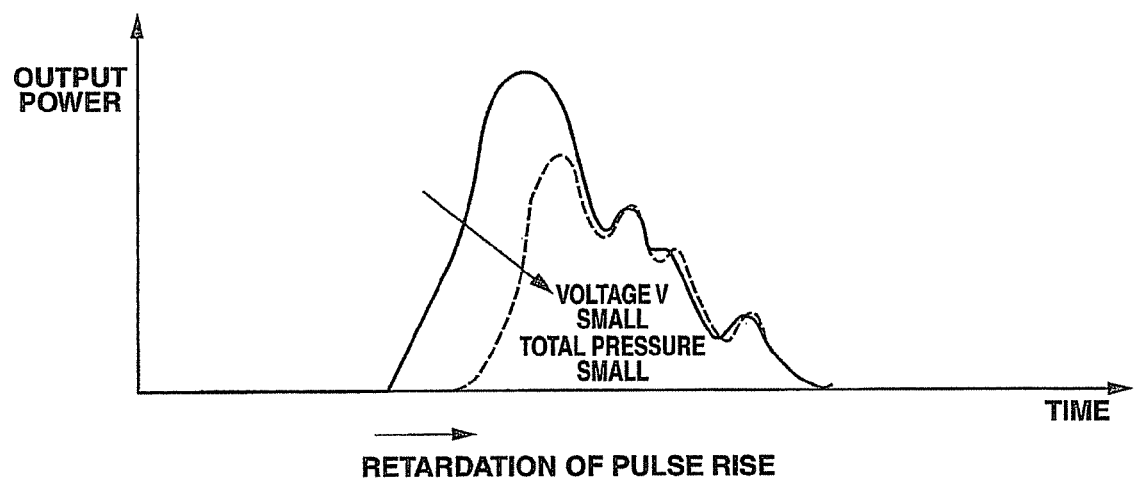
FIG. 64 is a view showing the relationship of the charging voltage and an overall laser gas pressure with the laser pulse waveform.

EXPLANATION OF REFERENCE NUMERALS 4 main controller
10 oscillation chamber
30 amplification chamber
100 oscillation laser device
300 amplification laser device

The invention claimed is:

1. A narrow-spectrum laser device having an oscillation laser device that outputs a narrow-spectrum seed beam by causing a laser beam to pass through a wavelength dispersion element several times, and an amplification laser device or an amplifying device that amplifies the seed beam by discharging a laser gas within an amplification chamber, and outputs an amplified laser beam, the narrow-spectrum laser device comprising:

spectral purity range measuring means for measuring a spectral purity range of a laser beam output from the amplification laser device or the amplifying device; and control means for controlling, while maintaining operations of the oscillation laser device, a measured spectral purity range of said laser beam output to be held within an allowable range of a target spectral purity range by retarding a discharge timing from a start of discharge by the oscillation laser device to a start of discharge by the amplification laser device or the amplifying device if the measured spectral purity range of said laser beam output is wider than the target spectral purity range, and by advancing the discharge timing if the measured spectral purity range of said laser beam output is narrower than the target spectral purity.

2. The narrow-spectrum laser device according to claim 1, wherein the control by the control means is executed within a synchronization allowable range of the allowable range of the target spectral purity range, in which an energy of the laser beam output from the amplification laser device or the amplifying device equals or exceeds an allowable level.

3. The narrow-spectrum laser device according to claim 1, further comprising pulse stretching means for extending a laser pulse waveform of the seed beam, wherein a synchronization allowable range in which an energy of the laser beam output from the amplification laser device or the amplifying device equals or exceeds an allowable level is enlarged by extending the pulse waveform of the seed beam using the pulse stretching means.

* * * * *

UNITED STATES PATENT AND TRADEMARK OFFICE
CERTIFICATE OF CORRECTION

PATENT NO. : 7,903,700 B2  
APPLICATION NO. : 11/631463  
DATED : March 8, 2011  
INVENTOR(S) : Nagai et al.

Page 1 of 1

It is certified that error appears in the above-identified patent and that said Letters Patent is hereby corrected as shown below:

Title Page  
Please Insert in the Data Field (73) for Assignee:  
--Komatsu Ltd., Tokyo (JP)  
Ushio Inc., Tokyo (JP)--

Signed and Sealed this  
Second Day of August, 2011

David J. Kappos  
*Director of the United States Patent and Trademark Office*